(12) United States Patent
Venkataraman et al.

(10) Patent No.: US 9,743,051 B2
(45) Date of Patent: *Aug. 22, 2017

(54) THIN FORM FACTOR COMPUTATIONAL ARRAY CAMERAS AND MODULAR ARRAY CAMERAS

(71) Applicant: FotoNation Cayman Limited, San Jose, CA (US)

(72) Inventors: Kartik Venkataraman, San Jose, CA (US); Paul Gallagher, San Jose, CA (US); Dan Lelescu, Morgan Hill, CA (US); Andrew Kenneth John McMahon, San Carlos, CA (US); Jacques Duparre, Jena (DE); Bedabrata Pain, Los Angeles, CA (US)

(73) Assignee: FotoNation Cayman Limited, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/012,044

(22) Filed: Feb. 1, 2016

(65) Prior Publication Data
US 2016/0269651 A1 Sep. 15, 2016

Related U.S. Application Data

(63) Continuation of application No. 14/188,524, filed on Feb. 24, 2014, now Pat. No. 9,253,380.
(Continued)

(51) Int. Cl.
*H04N 5/225* (2006.01)
*H04N 9/09* (2006.01)
(Continued)

(52) U.S. Cl.
CPC ............ *H04N 9/09* (2013.01); *H04N 5/2252* (2013.01); *H04N 5/2254* (2013.01);
(Continued)

(58) Field of Classification Search
CPC ........... H04N 5/23232; H04N 5/23238; H04N 5/3415; H04N 5/247; H04N 3/1593; H04N 2013/0088
See application file for complete search history.

(56) References Cited

U.S. PATENT DOCUMENTS 4,124,798 A 11/1978 Thompson
4,198,646 A 4/1980 Alexander et al.
(Continued)

FOREIGN PATENT DOCUMENTS

CN 1669332 A 9/2005
CN 1839394 A 9/2006
(Continued)

OTHER PUBLICATIONS

US 8,957,977, 02/2015, Venkataraman et al. (withdrawn)
(Continued)

*Primary Examiner* — Nicholas Giles
(74) *Attorney, Agent, or Firm* — KPPB LLP

(57) ABSTRACT

Systems and methods in accordance with embodiments of the invention implement modular array cameras using sub-array modules. In one embodiment, an X×Y sub-array module includes: an X×Y arrangement of focal planes, where X and Y are each greater than or equal to 1; and an X×Y arrangement of lens stacks, the X×Y arrangement of lens stacks being disposed relative to the X×Y arrangement of focal planes so as to form an X×Y arrangement of cameras, where each lens stack has a field of view that is shifted with respect to the field-of-views of each other lens stack so that each shift includes a sub-pixel shifted view of the scene; and image data output circuitry that is configured to output image data from the X×Y sub-array module that can be aggregated with image data from other sub-array modules so that an image of the scene can be constructed.

20 Claims, 24 Drawing Sheets

Related U.S. Application Data

(60) Provisional application No. 61/768,523, filed on Feb. 24, 2013.

(51) Int. Cl.
  *H04N 5/232* (2006.01)
  *H04N 5/247* (2006.01)
  *H04N 5/33* (2006.01)
  *H04N 5/349* (2011.01)
  *H04N 5/369* (2011.01)
  *H04N 5/378* (2011.01)

(52) U.S. Cl.
  CPC ......... *H04N 5/23232* (2013.01); *H04N 5/247* (2013.01); *H04N 5/332* (2013.01); *H04N 5/349* (2013.01); *H04N 5/3692* (2013.01); *H04N 5/378* (2013.01)

(56) References Cited

U.S. PATENT DOCUMENTS

| | | |
|---|---|---|
| 4,323,925 A | 4/1982 | Abell et al. |
| 4,460,449 A | 7/1984 | Montalbano |
| 4,467,365 A | 8/1984 | Murayama et al. |
| 4,652,909 A | 3/1987 | Glenn |
| 4,899,060 A | 2/1990 | Lischke |
| 5,005,083 A | 4/1991 | Grage |
| 5,070,414 A | 12/1991 | Tsutsumi |
| 5,144,448 A | 9/1992 | Hornbaker |
| 5,157,499 A | 10/1992 | Oguma et al. |
| 5,325,449 A | 6/1994 | Burt |
| 5,327,125 A | 7/1994 | Iwase et al. |
| 5,488,674 A | 1/1996 | Burt |
| 5,629,524 A | 5/1997 | Stettner et al. |
| 5,808,350 A | 9/1998 | Jack et al. |
| 5,832,312 A | 11/1998 | Rieger et al. |
| 5,880,691 A | 3/1999 | Fossum et al. |
| 5,911,008 A | 6/1999 | Hamada et al. |
| 5,933,190 A | 8/1999 | Dierickx et al. |
| 5,973,844 A | 10/1999 | Burger et al. |
| 6,002,743 A | 12/1999 | Telymonde |
| 6,005,607 A | 12/1999 | Uomori et al. |
| 6,034,690 A | 3/2000 | Gallery et al. |
| 6,069,351 A | 5/2000 | Mack |
| 6,069,365 A | 5/2000 | Chow et al. |
| 6,097,394 A | 8/2000 | Levoy et al. |
| 6,124,974 A | 9/2000 | Burger |
| 6,130,786 A | 10/2000 | Osawa et al. |
| 6,137,100 A | 10/2000 | Fossum et al. |
| 6,137,535 A | 10/2000 | Meyers |
| 6,141,048 A | 10/2000 | Meyers |
| 6,160,909 A | 12/2000 | Melen |
| 6,163,414 A | 12/2000 | Kikuchi et al. |
| 6,172,352 B1 | 1/2001 | Liu |
| 6,175,379 B1 | 1/2001 | Uomori et al. |
| 6,205,241 B1 | 3/2001 | Melen |
| 6,239,909 B1 | 5/2001 | Hayashi et al. |
| 6,340,994 B1 | 1/2002 | Margulis et al. |
| 6,358,862 B1 | 3/2002 | Ireland et al. |
| 6,443,579 B1 | 9/2002 | Myers et al. |
| 6,476,805 B1 | 11/2002 | Shum et al. |
| 6,477,260 B1 | 11/2002 | Shimomura |
| 6,502,097 B1 | 12/2002 | Chan et al. |
| 6,525,302 B2 | 2/2003 | Dowski, Jr. et al. |
| 6,563,537 B1 | 5/2003 | Kawamura et al. |
| 6,571,466 B1 | 6/2003 | Glenn et al. |
| 6,603,513 B1 | 8/2003 | Berezin |
| 6,611,289 B1 | 8/2003 | Yu |
| 6,627,896 B1 | 9/2003 | Hashimoto et al. |
| 6,628,330 B1 | 9/2003 | Lin |
| 6,635,941 B2 | 10/2003 | Suda |
| 6,639,596 B1 | 10/2003 | Shum et al. |
| 6,647,142 B1 | 11/2003 | Beardsley |
| 6,657,218 B2 | 12/2003 | Noda |
| 6,671,399 B1 | 12/2003 | Berestov |
| 6,750,904 B1 | 6/2004 | Lambert |
| 6,765,617 B1 | 7/2004 | Tangen et al. |
| 6,771,833 B1 | 8/2004 | Edgar |
| 6,774,941 B1 | 8/2004 | Boisvert et al. |
| 6,788,338 B1 | 9/2004 | Dinev |
| 6,795,253 B2 | 9/2004 | Shinohara |
| 6,819,328 B1 | 11/2004 | Moriwaki et al. |
| 6,819,358 B1 | 11/2004 | Kagle et al. |
| 6,879,735 B1 | 4/2005 | Portniaguine et al. |
| 6,897,454 B2 | 5/2005 | Sasaki et al. |
| 6,903,770 B1 | 6/2005 | Kobayashi et al. |
| 6,909,121 B2 | 6/2005 | Nishikawa |
| 6,927,922 B2 | 8/2005 | George et al. |
| 6,958,862 B1 | 10/2005 | Joseph |
| 7,015,954 B1 | 3/2006 | Foote et al. |
| 7,085,409 B2 | 8/2006 | Sawhney |
| 7,161,614 B1 | 1/2007 | Yamashita et al. |
| 7,199,348 B2 | 4/2007 | Olsen et al. |
| 7,206,449 B2 | 4/2007 | Raskar et al. |
| 7,235,785 B2 | 6/2007 | Hornback et al. |
| 7,262,799 B2 | 8/2007 | Suda |
| 7,292,735 B2 | 11/2007 | Blake et al. |
| 7,295,697 B1 | 11/2007 | Satoh |
| 7,369,165 B2 | 5/2008 | Bosco et al. |
| 7,391,572 B2 | 6/2008 | Jacobowitz et al. |
| 7,408,725 B2 | 8/2008 | Sato |
| 7,425,984 B2 | 9/2008 | Chen |
| 7,496,293 B2 | 2/2009 | Shamir et al. |
| 7,564,019 B2 | 7/2009 | Olsen |
| 7,606,484 B1 | 10/2009 | Richards et al. |
| 7,620,265 B1 | 11/2009 | Wolff |
| 7,633,511 B2 | 12/2009 | Shum et al. |
| 7,639,435 B2 | 12/2009 | Chiang |
| 7,646,549 B2 | 1/2010 | Zalevsky et al. |
| 7,657,090 B2 | 2/2010 | Omatsu et al. |
| 7,675,080 B2 | 3/2010 | Boettiger |
| 7,675,681 B2 | 3/2010 | Tomikawa et al. |
| 7,706,634 B2 | 4/2010 | Schmitt et al. |
| 7,723,662 B2 | 5/2010 | Levoy et al. |
| 7,738,013 B2 | 6/2010 | Galambos et al. |
| 7,741,620 B2 | 6/2010 | Doering et al. |
| 7,782,364 B2 | 8/2010 | Smith |
| 7,826,153 B2 | 11/2010 | Hong |
| 7,840,067 B2 | 11/2010 | Shen et al. |
| 7,912,673 B2 | 3/2011 | Hébert et al. |
| 7,973,834 B2 | 7/2011 | Yang |
| 7,986,018 B2 | 7/2011 | Rennie |
| 7,990,447 B2 | 8/2011 | Honda et al. |
| 8,000,498 B2 | 8/2011 | Shih et al. |
| 8,013,904 B2 | 9/2011 | Tan et al. |
| 8,027,531 B2 | 9/2011 | Wilburn et al. |
| 8,044,994 B2 | 10/2011 | Vetro et al. |
| 8,077,245 B2 | 12/2011 | Adamo et al. |
| 8,098,297 B2 | 1/2012 | Crisan et al. |
| 8,098,304 B2 | 1/2012 | Pinto et al. |
| 8,106,949 B2 | 1/2012 | Tan et al. |
| 8,126,279 B2 | 2/2012 | Marcellin et al. |
| 8,130,120 B2 | 3/2012 | Kawabata et al. |
| 8,131,097 B2 | 3/2012 | Lelescu et al. |
| 8,149,323 B2 | 4/2012 | Li |
| 8,164,629 B1 | 4/2012 | Zhang |
| 8,169,486 B2 | 5/2012 | Corcoran et al. |
| 8,180,145 B2 | 5/2012 | Wu et al. |
| 8,189,065 B2 | 5/2012 | Georgiev et al. |
| 8,189,089 B1 | 5/2012 | Georgiev |
| 8,194,296 B2 | 6/2012 | Compton |
| 8,212,914 B2 | 7/2012 | Chiu |
| 8,213,711 B2 | 7/2012 | Tam |
| 8,231,814 B2 | 7/2012 | Duparre |
| 8,242,426 B2 | 8/2012 | Ward et al. |
| 8,244,027 B2 | 8/2012 | Takahashi |
| 8,244,058 B1 | 8/2012 | Intwala et al. |
| 8,254,668 B2 | 8/2012 | Mashitani et al. |
| 8,279,325 B2 | 10/2012 | Pitts et al. |
| 8,280,194 B2 | 10/2012 | Wong et al. |
| 8,289,409 B2 | 10/2012 | Chang |
| 8,289,440 B2 | 10/2012 | Pitts et al. |
| 8,290,358 B1 | 10/2012 | Georgiev |
| 8,294,099 B2 | 10/2012 | Blackwell, Jr. |

(56) References Cited

U.S. PATENT DOCUMENTS

| | | |
|---|---|---|
| 8,305,456 B1 | 11/2012 | McMahon |
| 8,315,476 B1 | 11/2012 | Georgiev et al. |
| 8,345,144 B1 | 1/2013 | Georgiev et al. |
| 8,360,574 B2 | 1/2013 | Ishak et al. |
| 8,400,555 B1 | 3/2013 | Georgiev |
| 8,406,562 B2 | 3/2013 | Bassi et al. |
| 8,411,146 B2 | 4/2013 | Twede |
| 8,446,492 B2 | 5/2013 | Nakano et al. |
| 8,456,517 B2 | 6/2013 | Mor et al. |
| 8,493,496 B2 | 7/2013 | Freedman et al. |
| 8,514,491 B2 | 8/2013 | Duparre |
| 8,541,730 B2 | 9/2013 | Inuiya |
| 8,542,933 B2 | 9/2013 | Venkataraman |
| 8,553,093 B2 | 10/2013 | Wong et al. |
| 8,559,756 B2 | 10/2013 | Georgiev et al. |
| 8,565,547 B2 | 10/2013 | Strandemar |
| 8,576,302 B2 | 11/2013 | Yoshikawa |
| 8,577,183 B2 | 11/2013 | Robinson |
| 8,581,995 B2 * | 11/2013 | Lin ............... G06T 7/0065 348/218.1 |
| 8,619,082 B1 | 12/2013 | Ciurea |
| 8,648,918 B2 | 2/2014 | Kauker et al. |
| 8,655,052 B2 | 2/2014 | Spooner et al. |
| 8,682,107 B2 | 3/2014 | Yoon et al. |
| 8,687,087 B2 | 4/2014 | Pertsel et al. |
| 8,692,893 B2 | 4/2014 | McMahon |
| 8,773,536 B1 | 7/2014 | Zhang |
| 8,780,113 B1 | 7/2014 | Ciurea et al. |
| 8,804,255 B2 | 8/2014 | Duparre |
| 8,830,375 B2 | 9/2014 | Ludwig |
| 8,831,367 B2 | 9/2014 | Venkataraman |
| 8,842,201 B2 | 9/2014 | Tajiri |
| 8,854,462 B2 | 10/2014 | Herbin et al. |
| 8,861,089 B2 | 10/2014 | Duparre |
| 8,866,912 B2 | 10/2014 | Mullis |
| 8,866,920 B2 * | 10/2014 | Venkataraman ..... H04N 5/2253 348/218.1 |
| 8,866,951 B2 * | 10/2014 | Keelan ................ H04N 5/2254 348/294 |
| 8,878,950 B2 | 11/2014 | Lelescu et al. |
| 8,885,059 B1 | 11/2014 | Venkataraman et al. |
| 8,885,922 B2 | 11/2014 | Kobayashi et al. |
| 8,896,594 B2 | 11/2014 | Xiong et al. |
| 8,896,719 B1 | 11/2014 | Venkataraman et al. |
| 8,902,321 B2 * | 12/2014 | Venkataraman .. H01L 27/14618 348/218.1 |
| 8,928,793 B2 | 1/2015 | McMahon |
| 8,977,038 B2 | 3/2015 | Tian et al. |
| 9,001,226 B1 | 4/2015 | Ng et al. |
| 9,019,426 B2 | 4/2015 | Han et al. |
| 9,025,894 B2 | 5/2015 | Venkataraman |
| 9,025,895 B2 | 5/2015 | Venkataraman |
| 9,030,528 B2 | 5/2015 | Pesach et al. |
| 9,031,335 B2 | 5/2015 | Venkataraman |
| 9,031,342 B2 | 5/2015 | Venkataraman |
| 9,031,343 B2 | 5/2015 | Venkataraman |
| 9,036,928 B2 | 5/2015 | Venkataraman |
| 9,036,931 B2 | 5/2015 | Venkataraman |
| 9,041,823 B2 | 5/2015 | Venkataraman et al. |
| 9,041,824 B2 | 5/2015 | Lelescu |
| 9,041,829 B2 | 5/2015 | Venkataraman et al. |
| 9,042,667 B2 | 5/2015 | Venkataraman |
| 9,049,367 B2 | 6/2015 | Venkataraman et al. |
| 9,055,233 B2 | 6/2015 | Venkataraman et al. |
| 9,060,124 B2 | 6/2015 | Venkataraman et al. |
| 9,077,893 B2 | 7/2015 | Venkataraman et al. |
| 9,094,661 B2 | 7/2015 | Venkataraman et al. |
| 9,123,117 B2 | 9/2015 | Ciurea et al. |
| 9,123,118 B2 | 9/2015 | Ciurea et al. |
| 9,124,815 B2 | 9/2015 | Venkataraman et al. |
| 9,124,831 B2 | 9/2015 | Mullis |
| 9,124,864 B2 | 9/2015 | Mullis |
| 9,128,228 B2 | 9/2015 | Duparre |
| 9,129,183 B2 | 9/2015 | Venkataraman et al. |
| 9,129,377 B2 | 9/2015 | Ciurea et al. |
| 9,143,711 B2 | 9/2015 | McMahon |
| 9,147,254 B2 | 9/2015 | Ciurea et al. |
| 9,185,276 B2 | 11/2015 | Roda et al. |
| 9,188,765 B2 | 11/2015 | Venkataraman et al. |
| 9,191,580 B2 | 11/2015 | Venkataraman et al. |
| 9,197,821 B2 | 11/2015 | McMahon |
| 9,210,392 B2 | 12/2015 | Nisenzon et al. |
| 9,214,013 B2 | 12/2015 | Venkataraman et al. |
| 9,235,898 B2 | 1/2016 | Venkataraman et al. |
| 9,235,900 B2 | 1/2016 | Ciurea et al. |
| 9,240,049 B2 | 1/2016 | Ciurea et al. |
| 9,253,380 B2 | 2/2016 | Venkataraman et al. |
| 9,256,974 B1 | 2/2016 | Hines |
| 9,264,592 B2 | 2/2016 | Rodda et al. |
| 9,264,610 B2 | 2/2016 | Duparre |
| 9,361,662 B2 | 6/2016 | Lelescu et al. |
| 9,412,206 B2 | 8/2016 | McMahon et al. |
| 9,413,953 B2 | 8/2016 | Maeda |
| 9,426,343 B2 | 8/2016 | Rodda et al. |
| 9,426,361 B2 | 8/2016 | Venkataraman et al. |
| 9,445,003 B1 | 9/2016 | Lelescu et al. |
| 9,456,196 B2 | 9/2016 | Kim et al. |
| 9,462,164 B2 | 10/2016 | Venkataraman et al. |
| 9,485,496 B2 | 11/2016 | Venkataraman et al. |
| 9,497,370 B2 | 11/2016 | Venkataraman et al. |
| 9,497,429 B2 | 11/2016 | Mullis et al. |
| 9,516,222 B2 | 12/2016 | Duparre et al. |
| 9,519,972 B2 | 12/2016 | Venkataraman et al. |
| 9,521,319 B2 | 12/2016 | Rodda et al. |
| 9,521,416 B1 | 12/2016 | McMahon et al. |
| 9,536,166 B2 | 1/2017 | Venkataraman et al. |
| 9,576,369 B2 | 2/2017 | Venkataraman et al. |
| 2001/0005225 A1 | 6/2001 | Clark et al. |
| 2001/0019621 A1 | 9/2001 | Hanna et al. |
| 2001/0028038 A1 | 10/2001 | Hamaguchi et al. |
| 2001/0038387 A1 | 11/2001 | Tomooka et al. |
| 2002/0012056 A1 | 1/2002 | Trevino |
| 2002/0015536 A1 | 2/2002 | Warren |
| 2002/0027608 A1 | 3/2002 | Johnson |
| 2002/0039438 A1 | 4/2002 | Mori et al. |
| 2002/0057845 A1 | 5/2002 | Fossum |
| 2002/0063807 A1 | 5/2002 | Margulis |
| 2002/0075450 A1 | 6/2002 | Aratani |
| 2002/0087403 A1 | 7/2002 | Meyers et al. |
| 2002/0089596 A1 | 7/2002 | Suda |
| 2002/0094027 A1 | 7/2002 | Sato et al. |
| 2002/0101528 A1 | 8/2002 | Lee |
| 2002/0113867 A1 | 8/2002 | Takigawa et al. |
| 2002/0113888 A1 | 8/2002 | Sonoda et al. |
| 2002/0122113 A1 | 9/2002 | Foote et al. |
| 2002/0163054 A1 | 11/2002 | Suda |
| 2002/0167537 A1 | 11/2002 | Trajkovic |
| 2002/0177054 A1 | 11/2002 | Saitoh et al. |
| 2003/0025227 A1 | 2/2003 | Daniell |
| 2003/0086079 A1 | 5/2003 | Barth et al. |
| 2003/0124763 A1 | 7/2003 | Fan et al. |
| 2003/0140347 A1 | 7/2003 | Varsa |
| 2003/0179418 A1 | 9/2003 | Wengender et al. |
| 2003/0188659 A1 | 10/2003 | Merry et al. |
| 2003/0190072 A1 | 10/2003 | Adkins et al. |
| 2003/0198377 A1 | 10/2003 | Ng et al. |
| 2003/0211405 A1 | 11/2003 | Venkataraman |
| 2004/0008271 A1 | 1/2004 | Hagimori et al. |
| 2004/0012689 A1 | 1/2004 | Tinnerino |
| 2004/0027358 A1 | 2/2004 | Nakao |
| 2004/0047274 A1 | 3/2004 | Amanai |
| 2004/0050104 A1 | 3/2004 | Ghosh et al. |
| 2004/0056966 A1 | 3/2004 | Schechner et al. |
| 2004/0061787 A1 | 4/2004 | Liu et al. |
| 2004/0066454 A1 | 4/2004 | Otani et al. |
| 2004/0071367 A1 | 4/2004 | Irani et al. |
| 2004/0096119 A1 | 5/2004 | Williams |
| 2004/0100570 A1 | 5/2004 | Shizukuishi |
| 2004/0105021 A1 | 6/2004 | Hu et al. |
| 2004/0114807 A1 | 6/2004 | Lelescu et al. |
| 2004/0151401 A1 | 8/2004 | Sawhney et al. |
| 2004/0165090 A1 | 8/2004 | Ning |
| 2004/0169617 A1 | 9/2004 | Yelton et al. |
| 2004/0170340 A1 | 9/2004 | Tipping et al. |

(56) References Cited

U.S. PATENT DOCUMENTS

| | | |
|---|---|---|
| 2004/0174439 A1 | 9/2004 | Upton |
| 2004/0179834 A1 | 9/2004 | Szajewski |
| 2004/0207836 A1 | 10/2004 | Chhibber et al. |
| 2004/0213449 A1 | 10/2004 | Safaee-Rad et al. |
| 2004/0218809 A1 | 11/2004 | Blake et al. |
| 2004/0234873 A1 | 11/2004 | Venkataraman |
| 2004/0239885 A1 | 12/2004 | Jaynes et al. |
| 2004/0240052 A1 | 12/2004 | Minefuji et al. |
| 2004/0251509 A1 | 12/2004 | Choi |
| 2004/0264806 A1 | 12/2004 | Herley |
| 2005/0006477 A1 | 1/2005 | Patel |
| 2005/0007461 A1 | 1/2005 | Chou |
| 2005/0009313 A1* | 1/2005 | Suzuki ............... H01L 23/3114 438/611 |
| 2005/0010621 A1 | 1/2005 | Pinto et al. |
| 2005/0012035 A1 | 1/2005 | Miller |
| 2005/0036778 A1 | 2/2005 | DeMonte |
| 2005/0047678 A1 | 3/2005 | Jones et al. |
| 2005/0048690 A1 | 3/2005 | Yamamoto |
| 2005/0068436 A1 | 3/2005 | Fraenkel et al. |
| 2005/0128509 A1 | 6/2005 | Tokkonen et al. |
| 2005/0128595 A1 | 6/2005 | Shimizu |
| 2005/0132098 A1 | 6/2005 | Sonoda et al. |
| 2005/0134698 A1 | 6/2005 | Schroeder |
| 2005/0134699 A1 | 6/2005 | Nagashima |
| 2005/0134712 A1 | 6/2005 | Gruhlke et al. |
| 2005/0147277 A1 | 7/2005 | Higaki et al. |
| 2005/0151759 A1 | 7/2005 | Gonzalez-Banos et al. |
| 2005/0175257 A1 | 8/2005 | Kuroki |
| 2005/0185711 A1 | 8/2005 | Pfister et al. |
| 2005/0205785 A1 | 9/2005 | Hornback et al. |
| 2005/0219363 A1 | 10/2005 | Kohler |
| 2005/0224843 A1 | 10/2005 | Boemler |
| 2005/0225654 A1 | 10/2005 | Feldman et al. |
| 2005/0265633 A1 | 12/2005 | Piacentino |
| 2005/0275946 A1 | 12/2005 | Choo et al. |
| 2005/0286612 A1 | 12/2005 | Takanashi |
| 2005/0286756 A1 | 12/2005 | Hong et al. |
| 2006/0002635 A1 | 1/2006 | Nestares et al. |
| 2006/0007331 A1 | 1/2006 | Izumi et al. |
| 2006/0018509 A1 | 1/2006 | Miyoshi |
| 2006/0023197 A1 | 2/2006 | Joel |
| 2006/0023314 A1 | 2/2006 | Boettiger et al. |
| 2006/0028476 A1 | 2/2006 | Sobel et al. |
| 2006/0033005 A1 | 2/2006 | Jerdev et al. |
| 2006/0034003 A1 | 2/2006 | Zalevsky |
| 2006/0034531 A1 | 2/2006 | Poon et al. |
| 2006/0035415 A1 | 2/2006 | Wood |
| 2006/0038891 A1 | 2/2006 | Okutomi et al. |
| 2006/0039611 A1 | 2/2006 | Rother |
| 2006/0046204 A1 | 3/2006 | Ono et al. |
| 2006/0049930 A1 | 3/2006 | Zruya et al. |
| 2006/0054780 A1 | 3/2006 | Garrood et al. |
| 2006/0054782 A1 | 3/2006 | Olsen |
| 2006/0055811 A1 | 3/2006 | Frtiz et al. |
| 2006/0069478 A1 | 3/2006 | Iwama |
| 2006/0072029 A1 | 4/2006 | Miyatake et al. |
| 2006/0087747 A1 | 4/2006 | Ohzawa et al. |
| 2006/0098888 A1 | 5/2006 | Morishita |
| 2006/0103754 A1 | 5/2006 | Wenstrand et al. |
| 2006/0125936 A1 | 6/2006 | Gruhike et al. |
| 2006/0138322 A1 | 6/2006 | Costello et al. |
| 2006/0152803 A1 | 7/2006 | Provitola |
| 2006/0157640 A1 | 7/2006 | Perlman et al. |
| 2006/0159369 A1 | 7/2006 | Young |
| 2006/0176566 A1 | 8/2006 | Boettiger et al. |
| 2006/0187338 A1 | 8/2006 | May et al. |
| 2006/0197937 A1 | 9/2006 | Bamji et al. |
| 2006/0203113 A1 | 9/2006 | Wada et al. |
| 2006/0210186 A1 | 9/2006 | Berkner |
| 2006/0214085 A1 | 9/2006 | Olsen |
| 2006/0239549 A1 | 10/2006 | Kelly et al. |
| 2006/0243889 A1 | 11/2006 | Farnworth et al. |
| 2006/0251410 A1 | 11/2006 | Trutna |
| 2006/0274174 A1 | 12/2006 | Tewinkle |
| 2006/0278948 A1 | 12/2006 | Yamaguchi et al. |
| 2006/0279648 A1 | 12/2006 | Senba et al. |
| 2007/0002159 A1 | 1/2007 | Olsen |
| 2007/0008575 A1 | 1/2007 | Yu et al. |
| 2007/0009150 A1 | 1/2007 | Suwa |
| 2007/0024614 A1 | 2/2007 | Tam |
| 2007/0035707 A1 | 2/2007 | Margulis |
| 2007/0036427 A1 | 2/2007 | Nakamura et al. |
| 2007/0040828 A1 | 2/2007 | Zalevsky et al. |
| 2007/0040922 A1 | 2/2007 | McKee et al. |
| 2007/0041391 A1 | 2/2007 | Lin et al. |
| 2007/0052825 A1 | 3/2007 | Cho |
| 2007/0083114 A1 | 4/2007 | Yang et al. |
| 2007/0085917 A1 | 4/2007 | Kobayashi |
| 2007/0092245 A1 | 4/2007 | Bazakos et al. |
| 2007/0102622 A1 | 5/2007 | Olsen et al. |
| 2007/0126898 A1 | 6/2007 | Feldman |
| 2007/0127831 A1 | 6/2007 | Venkataraman |
| 2007/0139333 A1 | 6/2007 | Sato et al. |
| 2007/0146503 A1 | 6/2007 | Shiraki |
| 2007/0146511 A1 | 6/2007 | Kinoshita et al. |
| 2007/0153335 A1 | 7/2007 | Hosaka |
| 2007/0158427 A1 | 7/2007 | Zhu et al. |
| 2007/0159541 A1 | 7/2007 | Sparks et al. |
| 2007/0160310 A1 | 7/2007 | Tanida et al. |
| 2007/0165931 A1 | 7/2007 | Higaki |
| 2007/0171290 A1 | 7/2007 | Kroger |
| 2007/0182843 A1 | 8/2007 | Shimamura et al. |
| 2007/0206241 A1 | 9/2007 | Smith et al. |
| 2007/0211164 A1 | 9/2007 | Olsen et al. |
| 2007/0216765 A1 | 9/2007 | Wong et al. |
| 2007/0228256 A1 | 10/2007 | Mentzer |
| 2007/0247517 A1 | 10/2007 | Zhang et al. |
| 2007/0257184 A1 | 11/2007 | Olsen et al. |
| 2007/0258006 A1 | 11/2007 | Olsen et al. |
| 2007/0258706 A1 | 11/2007 | Raskar et al. |
| 2007/0263113 A1 | 11/2007 | Baek et al. |
| 2007/0263114 A1 | 11/2007 | Gurevich et al. |
| 2007/0268374 A1 | 11/2007 | Robinson |
| 2007/0296832 A1 | 12/2007 | Ota et al. |
| 2007/0296835 A1 | 12/2007 | Olsen |
| 2007/0296847 A1 | 12/2007 | Chang et al. |
| 2007/0297696 A1 | 12/2007 | Hamza |
| 2008/0006859 A1 | 1/2008 | Mionetto |
| 2008/0019611 A1 | 1/2008 | Larkin |
| 2008/0024683 A1 | 1/2008 | Damera-Venkata et al. |
| 2008/0025649 A1 | 1/2008 | Liu et al. |
| 2008/0030597 A1 | 2/2008 | Olsen et al. |
| 2008/0043095 A1 | 2/2008 | Vetro et al. |
| 2008/0043096 A1 | 2/2008 | Vetro et al. |
| 2008/0054518 A1 | 3/2008 | Ra et al. |
| 2008/0056302 A1 | 3/2008 | Erdal et al. |
| 2008/0062164 A1 | 3/2008 | Bassi et al. |
| 2008/0079805 A1 | 4/2008 | Takagi et al. |
| 2008/0080028 A1 | 4/2008 | Bakin et al. |
| 2008/0084486 A1 | 4/2008 | Enge et al. |
| 2008/0088793 A1 | 4/2008 | Sverdrup et al. |
| 2008/0095523 A1 | 4/2008 | Schilling-Benz et al. |
| 2008/0099804 A1 | 5/2008 | Venezia et al. |
| 2008/0112059 A1 | 5/2008 | Choi et al. |
| 2008/0112635 A1 | 5/2008 | Kondo et al. |
| 2008/0118241 A1 | 5/2008 | Tekolste et al. |
| 2008/0131019 A1 | 6/2008 | Ng |
| 2008/0131107 A1 | 6/2008 | Ueno |
| 2008/0151097 A1 | 6/2008 | Chen et al. |
| 2008/0152215 A1 | 6/2008 | Horie et al. |
| 2008/0152296 A1 | 6/2008 | Oh et al. |
| 2008/0156991 A1 | 7/2008 | Hu et al. |
| 2008/0158259 A1 | 7/2008 | Kempf et al. |
| 2008/0158375 A1 | 7/2008 | Kakkori et al. |
| 2008/0158698 A1 | 7/2008 | Chang et al. |
| 2008/0174670 A1 | 7/2008 | Olsen |
| 2008/0187305 A1 | 8/2008 | Raskar et al. |
| 2008/0193026 A1 | 8/2008 | Horie et al. |
| 2008/0211737 A1 | 9/2008 | Kim et al. |
| 2008/0218610 A1 | 9/2008 | Chapman et al. |
| 2008/0219654 A1 | 9/2008 | Border et al. |
| 2008/0239116 A1 | 10/2008 | Smith |
| 2008/0240598 A1 | 10/2008 | Hasegawa |

(56) References Cited

U.S. PATENT DOCUMENTS

| | | |
|---|---|---|
| 2008/0247638 A1 | 10/2008 | Tanida et al. |
| 2008/0247653 A1 | 10/2008 | Moussavi et al. |
| 2008/0272416 A1 | 11/2008 | Yun |
| 2008/0273751 A1 | 11/2008 | Yuan et al. |
| 2008/0278591 A1 | 11/2008 | Barna et al. |
| 2008/0284880 A1 | 11/2008 | Numata |
| 2008/0291295 A1 | 11/2008 | Kato et al. |
| 2008/0298674 A1 | 12/2008 | Baker et al. |
| 2008/0310501 A1 | 12/2008 | Ward et al. |
| 2009/0050946 A1 | 2/2009 | Duparre et al. |
| 2009/0052743 A1 | 2/2009 | Techmer |
| 2009/0060281 A1 | 3/2009 | Tanida et al. |
| 2009/0086074 A1 | 4/2009 | Li et al. |
| 2009/0091645 A1 | 4/2009 | Trimeche et al. |
| 2009/0091806 A1 | 4/2009 | Inuiya |
| 2009/0096050 A1 | 4/2009 | Park |
| 2009/0102956 A1 | 4/2009 | Georgiev |
| 2009/0109306 A1 | 4/2009 | Shan |
| 2009/0128833 A1 | 5/2009 | Yahav |
| 2009/0129667 A1 | 5/2009 | Ho |
| 2009/0140131 A1* | 6/2009 | Utagawa ............ G02B 3/0056 250/226 |
| 2009/0147919 A1 | 6/2009 | Goto et al. |
| 2009/0152664 A1 | 6/2009 | Klem et al. |
| 2009/0167922 A1 | 7/2009 | Perlman et al. |
| 2009/0179142 A1 | 7/2009 | Duparre et al. |
| 2009/0180021 A1 | 7/2009 | Kikuchi et al. |
| 2009/0200622 A1 | 8/2009 | Tai et al. |
| 2009/0201371 A1 | 8/2009 | Matsuda et al. |
| 2009/0207235 A1 | 8/2009 | Francini et al. |
| 2009/0219435 A1 | 9/2009 | Yuan et al. |
| 2009/0225203 A1 | 9/2009 | Tanida et al. |
| 2009/0237520 A1 | 9/2009 | Kaneko et al. |
| 2009/0245573 A1 | 10/2009 | Saptharishi et al. |
| 2009/0256947 A1 | 10/2009 | Ciurea et al. |
| 2009/0263017 A1 | 10/2009 | Tanbakuchi |
| 2009/0268192 A1 | 10/2009 | Koenck et al. |
| 2009/0268970 A1 | 10/2009 | Babacan et al. |
| 2009/0268983 A1 | 10/2009 | Stone et al. |
| 2009/0274387 A1 | 11/2009 | Jin |
| 2009/0284651 A1 | 11/2009 | Srinivasan |
| 2009/0297056 A1 | 12/2009 | Lelescu et al. |
| 2009/0302205 A9 | 12/2009 | Olsen et al. |
| 2009/0322876 A1 | 12/2009 | Lee et al. |
| 2009/0323195 A1 | 12/2009 | Hembree et al. |
| 2009/0323206 A1 | 12/2009 | Oliver et al. |
| 2009/0324118 A1 | 12/2009 | Maslov et al. |
| 2010/0002126 A1 | 1/2010 | Wenstrand et al. |
| 2010/0002313 A1 | 1/2010 | Duparre et al. |
| 2010/0002314 A1 | 1/2010 | Duparre |
| 2010/0013927 A1 | 1/2010 | Nixon |
| 2010/0044815 A1 | 2/2010 | Chang et al. |
| 2010/0053342 A1 | 3/2010 | Hwang et al. |
| 2010/0053600 A1 | 3/2010 | Tanida |
| 2010/0060746 A9 | 3/2010 | Olsen et al. |
| 2010/0073463 A1 | 3/2010 | Momonoi et al. |
| 2010/0074532 A1 | 3/2010 | Gordon et al. |
| 2010/0085425 A1 | 4/2010 | Tan |
| 2010/0086227 A1 | 4/2010 | Sun et al. |
| 2010/0091389 A1 | 4/2010 | Henriksen et al. |
| 2010/0097491 A1 | 4/2010 | Farina et al. |
| 2010/0103259 A1 | 4/2010 | Tanida et al. |
| 2010/0103308 A1 | 4/2010 | Butterfield et al. |
| 2010/0111444 A1 | 5/2010 | Coffman |
| 2010/0118127 A1 | 5/2010 | Nam |
| 2010/0128145 A1 | 5/2010 | Pitts et al. |
| 2010/0133230 A1 | 6/2010 | Henriksen et al. |
| 2010/0133418 A1 | 6/2010 | Sargent et al. |
| 2010/0141802 A1 | 6/2010 | Knight |
| 2010/0142839 A1 | 6/2010 | Lakus-Becker |
| 2010/0157073 A1 | 6/2010 | Kondo et al. |
| 2010/0165152 A1 | 7/2010 | Lim |
| 2010/0166410 A1 | 7/2010 | Chang |
| 2010/0177411 A1 | 7/2010 | Hegde et al. |
| 2010/0194901 A1 | 8/2010 | van Hoorebeke et al. |
| 2010/0195716 A1 | 8/2010 | Klein et al. |
| 2010/0201834 A1 | 8/2010 | Maruyama et al. |
| 2010/0202054 A1 | 8/2010 | Niederer |
| 2010/0202683 A1 | 8/2010 | Robinson |
| 2010/0208100 A9 | 8/2010 | Olsen et al. |
| 2010/0220212 A1 | 9/2010 | Perlman et al. |
| 2010/0223237 A1 | 9/2010 | Mishra et al. |
| 2010/0231285 A1 | 9/2010 | Boomer et al. |
| 2010/0244165 A1 | 9/2010 | Lake et al. |
| 2010/0259610 A1 | 10/2010 | Petersen et al. |
| 2010/0265346 A1 | 10/2010 | Iizuka |
| 2010/0265381 A1 | 10/2010 | Yamamoto et al. |
| 2010/0265385 A1 | 10/2010 | Knight et al. |
| 2010/0281070 A1 | 11/2010 | Chan et al. |
| 2010/0289941 A1 | 11/2010 | Ito |
| 2010/0302423 A1 | 12/2010 | Adams, Jr. et al. |
| 2010/0309292 A1 | 12/2010 | Ho et al. |
| 2010/0309368 A1 | 12/2010 | Choi et al. |
| 2010/0321595 A1 | 12/2010 | Chiu et al. |
| 2010/0321640 A1 | 12/2010 | Yeh et al. |
| 2011/0001037 A1 | 1/2011 | Tewinkle |
| 2011/0018973 A1 | 1/2011 | Takayama |
| 2011/0019243 A1 | 1/2011 | Constant, Jr. et al. |
| 2011/0031381 A1 | 2/2011 | Tay et al. |
| 2011/0032370 A1 | 2/2011 | Ludwig |
| 2011/0033129 A1 | 2/2011 | Robinson |
| 2011/0043661 A1 | 2/2011 | Podoleanu |
| 2011/0043665 A1 | 2/2011 | Ogasahara |
| 2011/0043668 A1 | 2/2011 | McKinnon et al. |
| 2011/0044502 A1 | 2/2011 | Liu et al. |
| 2011/0051255 A1 | 3/2011 | Lee et al. |
| 2011/0055729 A1 | 3/2011 | Mason et al. |
| 2011/0069189 A1* | 3/2011 | Venkataraman .. H01L 27/14618 348/218.1 |
| 2011/0080487 A1* | 4/2011 | Venkataraman ..... H04N 5/2253 348/218.1 |
| 2011/0085028 A1 | 4/2011 | Samadani et al. |
| 2011/0108708 A1 | 5/2011 | Olsen et al. |
| 2011/0121421 A1 | 5/2011 | Charbon |
| 2011/0122308 A1* | 5/2011 | Duparre ............ H01L 27/14621 348/340 |
| 2011/0128393 A1* | 6/2011 | Tavi ................... H04N 5/2257 348/218.1 |
| 2011/0128412 A1 | 6/2011 | Milnes et al. |
| 2011/0149408 A1 | 6/2011 | Hahgholt et al. |
| 2011/0149409 A1 | 6/2011 | Haugholt et al. |
| 2011/0153248 A1 | 6/2011 | Gu et al. |
| 2011/0157321 A1 | 6/2011 | Nakajima et al. |
| 2011/0176020 A1 | 7/2011 | Chang |
| 2011/0181797 A1 | 7/2011 | Galstian et al. |
| 2011/0206291 A1 | 8/2011 | Kashani et al. |
| 2011/0211824 A1 | 9/2011 | Georgiev et al. |
| 2011/0221599 A1 | 9/2011 | Högasten |
| 2011/0221658 A1 | 9/2011 | Haddick et al. |
| 2011/0221939 A1 | 9/2011 | Jerdev |
| 2011/0221950 A1 | 9/2011 | Oostra |
| 2011/0228142 A1 | 9/2011 | Brueckner |
| 2011/0228144 A1 | 9/2011 | Tian et al. |
| 2011/0234841 A1 | 9/2011 | Akeley et al. |
| 2011/0241234 A1 | 10/2011 | Duparre |
| 2011/0242342 A1 | 10/2011 | Goma et al. |
| 2011/0242355 A1 | 10/2011 | Goma et al. |
| 2011/0242356 A1 | 10/2011 | Aleksic et al. |
| 2011/0255592 A1 | 10/2011 | Sung |
| 2011/0255745 A1 | 10/2011 | Hodder et al. |
| 2011/0261993 A1 | 10/2011 | Weiming et al. |
| 2011/0267348 A1 | 11/2011 | Lin |
| 2011/0273531 A1 | 11/2011 | Ito et al. |
| 2011/0274366 A1 | 11/2011 | Tardif |
| 2011/0279705 A1 | 11/2011 | Kuang et al. |
| 2011/0279721 A1* | 11/2011 | McMahon ............. H04N 5/345 348/302 |
| 2011/0285866 A1 | 11/2011 | Bhrugumalla et al. |
| 2011/0285910 A1 | 11/2011 | Bamji et al. |
| 2011/0292216 A1 | 12/2011 | Fergus et al. |
| 2011/0298917 A1 | 12/2011 | Yanagita |
| 2011/0300929 A1 | 12/2011 | Tardif et al. |
| 2011/0310980 A1 | 12/2011 | Mathew |
| 2011/0316968 A1 | 12/2011 | Taguchi et al. |

(56) References Cited

U.S. PATENT DOCUMENTS

| | | |
|---|---|---|
| 2011/0317766 A1 | 12/2011 | Lim, II et al. |
| 2012/0012748 A1 | 1/2012 | Pain et al. |
| 2012/0019700 A1 | 1/2012 | Gaber |
| 2012/0023456 A1 | 1/2012 | Sun et al. |
| 2012/0026297 A1 | 2/2012 | Sato |
| 2012/0026342 A1 | 2/2012 | Yu et al. |
| 2012/0026366 A1 | 2/2012 | Golan et al. |
| 2012/0026451 A1 | 2/2012 | Nystrom |
| 2012/0039525 A1 | 2/2012 | Tian et al. |
| 2012/0044249 A1 | 2/2012 | Mashitani et al. |
| 2012/0044372 A1 | 2/2012 | Côté et al. |
| 2012/0056982 A1 | 3/2012 | Katz et al. |
| 2012/0062697 A1 | 3/2012 | Treado et al. |
| 2012/0062702 A1 | 3/2012 | Jiang et al. |
| 2012/0062756 A1 | 3/2012 | Tian |
| 2012/0069235 A1 | 3/2012 | Imai |
| 2012/0081519 A1 | 4/2012 | Goma |
| 2012/0105691 A1 | 5/2012 | Waqas et al. |
| 2012/0113318 A1 | 5/2012 | Galstian et al. |
| 2012/0113413 A1 | 5/2012 | Miahczylowicz-Wolski et al. |
| 2012/0147139 A1 | 6/2012 | Li et al. |
| 2012/0147205 A1* | 6/2012 | Lelescu .............. H04N 13/0029 348/218.1 |
| 2012/0153153 A1 | 6/2012 | Chang et al. |
| 2012/0154551 A1 | 6/2012 | Inoue |
| 2012/0155830 A1 | 6/2012 | Sasaki et al. |
| 2012/0163672 A1 | 6/2012 | McKinnon |
| 2012/0169433 A1 | 7/2012 | Mullins |
| 2012/0170134 A1 | 7/2012 | Bolis et al. |
| 2012/0176479 A1 | 7/2012 | Mayhew et al. |
| 2012/0188235 A1 | 7/2012 | Wu |
| 2012/0188341 A1 | 7/2012 | Klein Gunnewiek et al. |
| 2012/0188389 A1* | 7/2012 | Lin ...................... G06T 7/0065 348/218.1 |
| 2012/0188420 A1 | 7/2012 | Black et al. |
| 2012/0188634 A1 | 7/2012 | Kubala et al. |
| 2012/0198677 A1 | 8/2012 | Duparre |
| 2012/0200669 A1 | 8/2012 | Lai |
| 2012/0200726 A1 | 8/2012 | Bugnariu |
| 2012/0200734 A1 | 8/2012 | Tang |
| 2012/0219236 A1 | 8/2012 | Ali et al. |
| 2012/0224083 A1 | 9/2012 | Jovanovski et al. |
| 2012/0229602 A1 | 9/2012 | Chen et al. |
| 2012/0229628 A1 | 9/2012 | Ishiyama et al. |
| 2012/0249550 A1 | 10/2012 | Akeley et al. |
| 2012/0249750 A1 | 10/2012 | Izzat et al. |
| 2012/0249836 A1 | 10/2012 | Ali et al. |
| 2012/0262601 A1 | 10/2012 | Choi et al. |
| 2012/0262607 A1 | 10/2012 | Shimura et al. |
| 2012/0268574 A1 | 10/2012 | Gidon et al. |
| 2012/0287291 A1 | 11/2012 | McMahon |
| 2012/0293695 A1 | 11/2012 | Tanaka |
| 2012/0307099 A1 | 12/2012 | Yahata |
| 2012/0314033 A1 | 12/2012 | Lee et al. |
| 2012/0314937 A1 | 12/2012 | Kim et al. |
| 2012/0327222 A1 | 12/2012 | Ng et al. |
| 2013/0002828 A1 | 1/2013 | Ding et al. |
| 2013/0003184 A1 | 1/2013 | Duparre |
| 2013/0010073 A1 | 1/2013 | Do |
| 2013/0016885 A1 | 1/2013 | Tsujimoto et al. |
| 2013/0022111 A1 | 1/2013 | Chen et al. |
| 2013/0027580 A1 | 1/2013 | Olsen et al. |
| 2013/0033579 A1 | 2/2013 | Wajs |
| 2013/0033585 A1 | 2/2013 | Li et al. |
| 2013/0050504 A1 | 2/2013 | Safaee-Rad et al. |
| 2013/0050526 A1* | 2/2013 | Keelan ................... H04N 5/232 348/231.99 |
| 2013/0057710 A1 | 3/2013 | McMahon |
| 2013/0070060 A1* | 3/2013 | Chatterjee ............ H04N 5/2258 348/47 |
| 2013/0076967 A1 | 3/2013 | Brunner et al. |
| 2013/0077880 A1 | 3/2013 | Venkataraman et al. |
| 2013/0077882 A1 | 3/2013 | Venkataraman et al. |
| 2013/0083172 A1 | 4/2013 | Baba |
| 2013/0088489 A1 | 4/2013 | Schmeitz et al. |
| 2013/0088637 A1 | 4/2013 | Duparre |
| 2013/0093842 A1 | 4/2013 | Yahata |
| 2013/0107061 A1 | 5/2013 | Kumar et al. |
| 2013/0113899 A1 | 5/2013 | Morohoshi et al. |
| 2013/0113939 A1 | 5/2013 | Strandemar |
| 2013/0120605 A1 | 5/2013 | Georgiev et al. |
| 2013/0121559 A1 | 5/2013 | Hu |
| 2013/0128068 A1 | 5/2013 | Georgiev et al. |
| 2013/0128069 A1 | 5/2013 | Georgiev et al. |
| 2013/0128087 A1 | 5/2013 | Georgiev et al. |
| 2013/0128121 A1 | 5/2013 | Agarwala et al. |
| 2013/0147979 A1 | 6/2013 | McMahon et al. |
| 2013/0176394 A1 | 7/2013 | Tian et al. |
| 2013/0208138 A1 | 8/2013 | Li |
| 2013/0215108 A1 | 8/2013 | McMahon et al. |
| 2013/0215231 A1 | 8/2013 | Hiramoto et al. |
| 2013/0222556 A1 | 8/2013 | Shimada |
| 2013/0223759 A1* | 8/2013 | Nishiyama ............... G06T 5/50 382/284 |
| 2013/0229540 A1 | 9/2013 | Farina et al. |
| 2013/0230237 A1 | 9/2013 | Schlosser et al. |
| 2013/0250123 A1 | 9/2013 | Zhang et al. |
| 2013/0250150 A1 | 9/2013 | Malone |
| 2013/0259317 A1 | 10/2013 | Gaddy |
| 2013/0265459 A1 | 10/2013 | Duparre et al. |
| 2013/0274923 A1 | 10/2013 | By et al. |
| 2013/0293760 A1 | 11/2013 | Nisenzon et al. |
| 2014/0002674 A1 | 1/2014 | Duparre et al. |
| 2014/0009586 A1 | 1/2014 | McNamer et al. |
| 2014/0037137 A1 | 2/2014 | Broaddus et al. |
| 2014/0037140 A1 | 2/2014 | Benhimane et al. |
| 2014/0043507 A1 | 2/2014 | Wang et al. |
| 2014/0076336 A1 | 3/2014 | Clayton et al. |
| 2014/0078333 A1 | 3/2014 | Miao |
| 2014/0079336 A1 | 3/2014 | Venkataraman et al. |
| 2014/0092281 A1 | 4/2014 | Nisenzon et al. |
| 2014/0098267 A1 | 4/2014 | Tian et al. |
| 2014/0104490 A1 | 4/2014 | Hsieh et al. |
| 2014/0118493 A1 | 5/2014 | Sali et al. |
| 2014/0118584 A1 | 5/2014 | Lee et al. |
| 2014/0132810 A1 | 5/2014 | McMahon |
| 2014/0146201 A1 | 5/2014 | Knight et al. |
| 2014/0176592 A1 | 6/2014 | Wilburn et al. |
| 2014/0192253 A1 | 7/2014 | Laroia |
| 2014/0198188 A1 | 7/2014 | Izawa |
| 2014/0204183 A1 | 7/2014 | Lee et al. |
| 2014/0218546 A1 | 8/2014 | McMahon |
| 2014/0232822 A1 | 8/2014 | Venkataraman et al. |
| 2014/0240528 A1 | 8/2014 | Venkataraman et al. |
| 2014/0240529 A1 | 8/2014 | Venkataraman et al. |
| 2014/0253738 A1 | 9/2014 | Mullis |
| 2014/0267243 A1 | 9/2014 | Venkataraman et al. |
| 2014/0267286 A1 | 9/2014 | Duparre |
| 2014/0267633 A1 | 9/2014 | Venkataraman et al. |
| 2014/0267762 A1 | 9/2014 | Mullis et al. |
| 2014/0267890 A1 | 9/2014 | Lelescu et al. |
| 2014/0285675 A1 | 9/2014 | Mullis |
| 2014/0313315 A1 | 10/2014 | Shoham et al. |
| 2014/0321712 A1 | 10/2014 | Ciurea et al. |
| 2014/0333731 A1 | 11/2014 | Venkataraman et al. |
| 2014/0333764 A1 | 11/2014 | Venkataraman et al. |
| 2014/0333787 A1 | 11/2014 | Venkataraman et al. |
| 2014/0340539 A1 | 11/2014 | Venkataraman et al. |
| 2014/0347509 A1 | 11/2014 | Venkataraman et al. |
| 2014/0347748 A1 | 11/2014 | Duparre |
| 2014/0354773 A1 | 12/2014 | Venkataraman et al. |
| 2014/0354843 A1 | 12/2014 | Venkataraman et al. |
| 2014/0354844 A1 | 12/2014 | Venkataraman et al. |
| 2014/0354853 A1 | 12/2014 | Venkataraman et al. |
| 2014/0354854 A1 | 12/2014 | Venkataraman et al. |
| 2014/0354855 A1 | 12/2014 | Venkataraman et al. |
| 2014/0355870 A1 | 12/2014 | Venkataraman et al. |
| 2014/0368662 A1 | 12/2014 | Venkataraman et al. |
| 2014/0368683 A1 | 12/2014 | Venkataraman et al. |
| 2014/0368684 A1 | 12/2014 | Venkataraman et al. |
| 2014/0368685 A1 | 12/2014 | Venkataraman et al. |
| 2014/0368686 A1 | 12/2014 | Duparre |
| 2014/0369612 A1 | 12/2014 | Venkataraman et al. |
| 2014/0369615 A1 | 12/2014 | Venkataraman et al. |

(56) References Cited

U.S. PATENT DOCUMENTS

| | | |
|---|---|---|
| 2014/0376825 A1 | 12/2014 | Venkataraman et al. |
| 2014/0376826 A1 | 12/2014 | Venkataraman et al. |
| 2015/0002734 A1 | 1/2015 | Lee |
| 2015/0003752 A1 | 1/2015 | Venkataraman et al. |
| 2015/0003753 A1 | 1/2015 | Venkataraman et al. |
| 2015/0009353 A1 | 1/2015 | Venkataraman et al. |
| 2015/0009354 A1 | 1/2015 | Venkataraman et al. |
| 2015/0009362 A1 | 1/2015 | Venkataraman et al. |
| 2015/0015669 A1 | 1/2015 | Venkataraman et al. |
| 2015/0035992 A1 | 2/2015 | Mullis |
| 2015/0036014 A1 | 2/2015 | Lelescu et al. |
| 2015/0036015 A1 | 2/2015 | Lelescu et al. |
| 2015/0042766 A1 | 2/2015 | Ciurea et al. |
| 2015/0042767 A1 | 2/2015 | Ciurea et al. |
| 2015/0042833 A1 | 2/2015 | Lelescu et al. |
| 2015/0049915 A1 | 2/2015 | Ciurea et al. |
| 2015/0049916 A1 | 2/2015 | Ciurea et al. |
| 2015/0049917 A1 | 2/2015 | Ciurea et al. |
| 2015/0055884 A1 | 2/2015 | Venkataraman et al. |
| 2015/0085174 A1 | 3/2015 | Shabtay et al. |
| 2015/0091900 A1 | 4/2015 | Yang et al. |
| 2015/0122411 A1 | 5/2015 | Rodda et al. |
| 2015/0124113 A1 | 5/2015 | Rodda et al. |
| 2015/0124151 A1 | 5/2015 | Rodda et al. |
| 2015/0146029 A1 | 5/2015 | Venkataraman et al. |
| 2015/0146030 A1 | 5/2015 | Venkataraman et al. |
| 2015/0199841 A1 | 7/2015 | Venkataraman et al. |
| 2015/0243480 A1 | 8/2015 | Yamada et al. |
| 2015/0296137 A1 | 10/2015 | Duparre et al. |
| 2015/0312455 A1 | 10/2015 | Venkataraman et al. |
| 2015/0326852 A1 | 11/2015 | Duparre et al. |
| 2015/0373261 A1 | 12/2015 | Rodda |
| 2016/0037097 A1 | 2/2016 | Duparre |
| 2016/0044252 A1 | 2/2016 | Molina |
| 2016/0044257 A1 | 2/2016 | Venkataraman et al. |
| 2016/0057332 A1 | 2/2016 | Ciurea et al. |
| 2016/0165106 A1 | 6/2016 | Duparre |
| 2016/0165134 A1 | 6/2016 | Lelescu et al. |
| 2016/0165147 A1 | 6/2016 | Nisenzon et al. |
| 2016/0165212 A1 | 6/2016 | Mullis |
| 2016/0195733 A1 | 7/2016 | Lelescu et al. |
| 2016/0227195 A1 | 8/2016 | Venkataraman et al. |
| 2016/0249001 A1 | 8/2016 | McMahon |
| 2016/0255333 A1 | 9/2016 | Nisenzon et al. |
| 2016/0266284 A1 | 9/2016 | Duparre et al. |
| 2016/0267665 A1 | 9/2016 | Venkataraman et al. |
| 2016/0267672 A1 | 9/2016 | Ciurea et al. |
| 2016/0269626 A1 | 9/2016 | McMahon |
| 2016/0269627 A1 | 9/2016 | McMahon |
| 2016/0269650 A1 | 9/2016 | Venkataraman et al. |
| 2016/0316140 A1 | 10/2016 | Nayar et al. |
| 2017/0006233 A1 | 1/2017 | Venkataraman et al. |

FOREIGN PATENT DOCUMENTS

| | | |
|---|---|---|
| CN | 101010619 A | 8/2007 |
| CN | 101064780 A | 10/2007 |
| CN | 101102388 A | 1/2008 |
| CN | 101147392 A | 3/2008 |
| CN | 101427372 A | 5/2009 |
| CN | 101606086 A | 12/2009 |
| CN | 101883291 A | 11/2010 |
| CN | 102037717 A | 4/2011 |
| CN | 102375199 A | 3/2012 |
| EP | 0677821 A2 | 10/1995 |
| EP | 840502 A2 | 5/1998 |
| EP | 1201407 A2 | 5/2002 |
| EP | 1355274 A2 | 10/2003 |
| EP | 1734766 A2 | 12/2006 |
| EP | 2026563 A1 | 2/2009 |
| EP | 2104334 A1 | 9/2009 |
| EP | 2244484 A1 | 10/2010 |
| EP | 2336816 A2 | 6/2011 |
| GB | 2482022 A | 1/2012 |
| JP | 59-025483 | 9/1984 |
| JP | 64-037177 | 7/1989 |
| JP | 02-285772 | 11/1990 |
| JP | H0715457 A | 1/1995 |
| JP | 09181913 A | 7/1997 |
| JP | 11142609 A | 5/1999 |
| JP | 11223708 A | 8/1999 |
| JP | 2000209503 A | 7/2000 |
| JP | 2001277260 A | 10/2001 |
| JP | 2002195910 A | 7/2002 |
| JP | 2002205310 A | 7/2002 |
| JP | 2002252338 A | 9/2002 |
| JP | 2003094445 A | 4/2003 |
| JP | 2003139910 A | 5/2003 |
| JP | 2003163938 A | 6/2003 |
| JP | 2004221585 A | 8/2004 |
| JP | 2005116022 A | 4/2005 |
| JP | 2005181460 A | 7/2005 |
| JP | 2005295381 A | 10/2005 |
| JP | 2005354124 A | 12/2005 |
| JP | 2006033493 A | 2/2006 |
| JP | 2006047944 A | 2/2006 |
| JP | 2006258930 A | 9/2006 |
| JP | 2007520107 A | 7/2007 |
| JP | 2007259136 A | 10/2007 |
| JP | 2008039852 A | 2/2008 |
| JP | 2008055908 A | 3/2008 |
| JP | 2008507874 A | 3/2008 |
| JP | 2008258885 A | 10/2008 |
| JP | 2009132010 A | 6/2009 |
| JP | 2009300268 A | 12/2009 |
| JP | 2011017764 A | 1/2011 |
| JP | 2011030184 A | 2/2011 |
| JP | 2011109484 A | 6/2011 |
| JP | 2013526801 A | 6/2013 |
| JP | 2014521117 A | 8/2014 |
| KR | 1020110097647 A | 8/2011 |
| TW | 200828994 A | 7/2008 |
| TW | 200939739 A | 9/2009 |
| WO | 2005057922 A1 | 6/2005 |
| WO | 2007083579 A1 | 7/2007 |
| WO | 2007134137 A2 | 11/2007 |
| WO | 2008045198 A2 | 4/2008 |
| WO | 2008108271 A1 | 9/2008 |
| WO | 2008108926 A1 | 9/2008 |
| WO | 2008150817 A1 | 12/2008 |
| WO | 2009073950 A1 | 6/2009 |
| WO | 2009151903 A2 | 12/2009 |
| WO | 2009157273 A1 | 12/2009 |
| WO | 2011008443 A2 | 1/2011 |
| WO | 2011055655 A1 | 5/2011 |
| WO | 2011063347 A2 | 5/2011 |
| WO | 2011116203 A1 | 9/2011 |
| WO | 2011063347 A3 | 10/2011 |
| WO | 2011143501 A1 | 11/2011 |
| WO | 2012057619 A1 | 5/2012 |
| WO | 2012057620 A2 | 5/2012 |
| WO | 2012057621 A1 | 5/2012 |
| WO | 2012057622 A1 | 5/2012 |
| WO | 2012057623 A1 | 5/2012 |
| WO | 2012057620 A3 | 6/2012 |
| WO | 2012074361 A1 | 6/2012 |
| WO | 2012078126 A1 | 6/2012 |
| WO | 2012082904 A1 | 6/2012 |
| WO | 2012155119 A1 | 11/2012 |
| WO | 2013003276 A1 | 1/2013 |
| WO | 2013043751 A1 | 3/2013 |
| WO | 2013043761 A1 | 3/2013 |
| WO | 2013049699 A1 | 4/2013 |
| WO | 2013055960 A1 | 4/2013 |
| WO | 2013119706 A1 | 8/2013 |
| WO | 2013126578 A1 | 8/2013 |
| WO | 2014052974 A2 | 4/2014 |
| WO | 2014032020 A3 | 5/2014 |
| WO | 2014078443 A1 | 5/2014 |
| WO | 2014130849 A1 | 8/2014 |
| WO | 2014133974 A1 | 9/2014 |
| WO | 2014138695 A1 | 9/2014 |
| WO | 2014138697 A1 | 9/2014 |
| WO | 2014144157 A1 | 9/2014 |

(56) References Cited

FOREIGN PATENT DOCUMENTS

| WO | 2014145856 A1 | 9/2014 |
|---|---|---|
| WO | 2014149403 A1 | 9/2014 |
| WO | 2014149902 A1 | 9/2014 |
| WO | 2014150856 A1 | 9/2014 |
| WO | 2014159721 A1 | 10/2014 |
| WO | 2014159779 A1 | 10/2014 |
| WO | 2014160142 A1 | 10/2014 |
| WO | 2014164550 A2 | 10/2014 |
| WO | 2014164909 A1 | 10/2014 |
| WO | 2014165244 A1 | 10/2014 |
| WO | 2014133974 A9 | 4/2015 |
| WO | 2015048694 A2 | 4/2015 |
| WO | 2015070105 A1 | 5/2015 |
| WO | 2015081279 A1 | 6/2015 |

OTHER PUBLICATIONS

US 8,964,053, 02/2015, Venkataraman et al. (withdrawn)
US 8,965,058, 02/2015, Venkataraman et al. (withdrawn)
US 9,014,491, 04/2015, Venkataraman et al. (withdrawn)
US 9,338,332, 05/2016, Venkataraman et al. (withdrawn)
Extended European Search Report for EP Application No. 13810429.4, Completed Jan. 7, 2016, Mailed Jan. 15, 2016, 6 Pgs.
Extended European Search Report for European Application EP12782935.6, completed Aug. 28, 2014, mailed Sep. 4, 2014, 7 Pgs.
Extended European Search Report for European Application EP12804266.0, Report Completed Jan. 27, 2015, Mailed Feb. 3, 2015, 6 Pgs.
Extended European Search Report for European Application EP12835041.0, Report Completed Jan. 28, 2015, Mailed Feb. 4, 2015, 7 Pgs.
Extended European Search Report for European Application EP13810229.8, Report Completed Apr. 14, 2016, Mailed Apr. 21, 2016, 7 pgs.
Extended European Search Report for European Application No. 13830945.5, Search completed Jun. 28, 2016, Mailed Jul. 7, 2016, 14 Pgs.
Extended European Search Report for European Application No. 13841613.6, Search completed Jul. 18, 2016, Mailed Jul. 26, 2016, 8 Pgs.
Supplementary European Search Report for EP Application No. 13831768.0, Search completed May 18, 2016, Mailed May 30, 2016, 13 Pgs.
International Preliminary Report on Patentability for International Application No. PCT/US2012/059813, Search Completed Apr. 15, 2014, 7 pgs.
International Preliminary Report on Patentability for International Application No. PCT/US2013/059991, Issued Mar. 17, 2015, Mailed Mar. 26, 2015, 8 pgs.
International Preliminary Report on Patentability for International Application PCT/US13/56065, Issued Feb. 24, 2015, Mailed Mar. 5, 2015, 4 Pgs.
International Preliminary Report on Patentability for International Application PCT/US13/62720, Report Issued Mar. 31, 2015, Mailed Apr. 9, 2015, 8 Pgs.
International Preliminary Report on Patentability for International Application PCT/US2013/024987, Mailed Aug. 12, 2014, 13 Pgs.
International Preliminary Report on Patentability for International Application PCT/US2013/027146, Completed Apr. 2, 2013, Issued Aug. 26, 2014, 10 pgs.
International Preliminary Report on Patentability for International Application PCT/US2013/039155, completed Nov. 4, 2014, Mailed Nov. 13, 2014, 10 Pgs.
International Preliminary Report on Patentability for International Application PCT/US2013/046002, issued Dec. 31, 2014, Mailed Jan. 8, 2015, 6 Pgs.
International Preliminary Report on Patentability for International Application PCT/US2013/048772, issued Dec. 31, 2014, Mailed Jan. 8, 2015, 8 Pgs.
International Preliminary Report on Patentability for International Application PCT/US2013/056502, Issued Feb. 24, 2015, Mailed Mar. 5, 2015, 7 Pgs.
International Preliminary Report on Patentability for International Application PCT/US2013/069932, issued May 19, 2015, Mailed May 28, 2015, 12 Pgs.
International Preliminary Report on Patentability for International Application PCT/US2014/017766, issued Aug. 25, 2015, Mailed Sep. 3, 2015, 8 Pgs.
International Preliminary Report on Patentability for International Application PCT/US2014/018084, issued Aug. 25, 2015, Mailed Sep. 3, 2015, 11 Pgs.
International Preliminary Report on Patentability for International Application PCT/US2014/018116, issued Sep. 15, 2015, Mailed Sep. 24, 2015, 12 Pgs.
International Preliminary Report on Patentability for International Application PCT/US2014/021439, issued Sep. 15, 2015, Mailed Sep. 24, 2015, 9 Pgs.
International Preliminary Report on Patentability for International Application PCT/US2014/022118, issued Sep. 8, 2015, Mailed Sep. 17, 2015, 4 pgs.
International Preliminary Report on Patentability for International Application PCT/US2014/022123, issued Sep. 8, 2015, Mailed Sep. 17, 2015, 4 Pgs.
International Preliminary Report on Patentability for International Application PCT/US2014/022774, issued Sep. 22, 2015, Mailed Oct. 1, 2015, 5 Pgs.
International Preliminary Report on Patentability for International Application PCT/US2014/023762, issued Mar. 2, 2015, Mailed Mar. 9, 2015, 10 Pgs.
International Preliminary Report on Patentability for International Application PCT/US2014/024407, issued Sep. 15, 2015, Mailed Sep. 24, 2015, 8 Pgs.
International Preliminary Report on Patentability for International Application PCT/US2014/024903, issued Sep. 15, 2015, Mailed Sep. 24, 2015, 12 Pgs.
International Preliminary Report on Patentability for International Application PCT/US2014/024947, issued Sep. 15, 2015, Mailed Sep. 24, 2015, 7 Pgs.
International Preliminary Report on Patentability for International Application PCT/US2014/025100, issued Sep. 15, 2015, Mailed Sep. 24, 2015, 4 Pgs.
International Preliminary Report on Patentability for International Application PCT/US2014/025904, issued Sep. 15, 2015, Mailed Sep. 24, 2015, 5 Pgs.
International Preliminary Report on Patentability for International Application PCT/US2014/028447, issued Sep. 15, 2015, Mailed Sep. 24, 2015, 7 Pgs.
International Preliminary Report on Patentability for International Application PCT/US2014/030692, issued Sep. 15, 2015, Mailed Sep. 24, 2015, 6 Pgs.
International Preliminary Report on Patentability for International Application PCT/US2014/064693, issued May 10, 2016, Mailed May 19, 2016, 14 Pgs.
International Preliminary Report on Patentability for International Application PCT/US2014/066229, issued May 24, 2016, Mailed Jun. 6, 2016, 9 Pgs.
International Preliminary Report on Patentability for International Application PCT/US2014/067740, issued May 31, 2016, Mailed Jun. 9, 2016, 9 Pgs.
International Preliminary Report on Patentability for International Application PCT/US2015/019529, issued Sep. 13, 2016, Mailed Sep. 22, 2016, 9 Pgs.
International Search Report and Written Opinion for International Application No. PCT/US13/46002, completed Nov. 13, 2013, Mailed Nov. 29, 2013, 7 pgs.
International Search Report and Written Opinion for International Application No. PCT/US13/56065, Completed Nov. 25, 2013, Mailed Nov. 26, 2013, 8 pgs.
International Search Report and Written Opinion for International Application No. PCT/US13/59991, Completed Feb. 6, 2014, Mailed Feb. 26, 2014, 8 pgs.

(56) References Cited

OTHER PUBLICATIONS

International Search Report and Written Opinion for International Application No. PCT/US2011/64921, Completed Feb. 25, 2011, mailed Mar. 6, 2012, 17 pgs.
International Search Report and Written Opinion for International Application No. PCT/US2013/024987, Completed Mar. 27, 2013, Mailed Apr. 15, 2013, 14 pgs.
International Search Report and Written Opinion for International Application No. PCT/US2013/027146, completed Apr. 2, 2013, 11 pgs.
International Search Report and Written Opinion for International Application No. PCT/US2013/039155, completed Jul. 1, 2013, Mailed Jul. 11, 2013, 11 Pgs.
International Search Report and Written Opinion for International Application No. PCT/US2013/048772, Completed Oct. 21, 2013, Mailed Nov. 8, 2013, 6 pgs.
International Search Report and Written Opinion for International Application No. PCT/US2013/056502, Completed Feb. 18, 2014, Mailed Mar. 19, 2014, 7 pgs.
International Search Report and Written Opinion for International Application No. PCT/US2013/069932, Completed Mar. 14, 2014, Mailed Apr. 14, 2014, 14 pgs.
International Search Report and Written Opinion for International Application No. PCT/US2015/019529, completed May 5, 2015, Mailed Jun. 8, 2015, 11 Pgs.
International Search Report and Written Opinion for International Application PCT/US11/36349, mailed Aug. 22, 2011, 11 pgs.
International Search Report and Written Opinion for International Application PCT/US13/62720, completed Mar. 25, 2014, Mailed Apr. 21, 2014, 9 Pgs.
International Search Report and Written Opinion for International Application PCT/US14/024903, completed Jun. 12, 2014, Mailed, Jun. 27, 2014, 13 pgs.
International Search Report and Written Opinion for International Application PCT/US14/17766, completed May 28, 2014, Mailed Jun. 18, 2014, 9 Pgs.
International Search Report and Written Opinion for International Application PCT/US14/18084, completed May 23, 2014, Mailed Jun. 10, 2014, 12 Pgs.
International Search Report and Written Opinion for International Application PCT/US14/18116, completed May 13, 2014, Mailed Jun. 2, 2014, 12 Pgs.
International Search Report and Written Opinion for International Application PCT/US14/21439, completed Jun. 5, 2014, Mailed Jun. 20, 2014, 10 Pgs.
International Search Report and Written Opinion for International Application PCT/US14/22118, completed Jun. 9, 2014, Mailed, Jun. 25, 2014, 5 pgs.
International Search Report and Written Opinion for International Application PCT/US14/22774 report completed Jun. 9, 2014, Mailed Jul. 14, 2014, 6 Pgs.
International Search Report and Written Opinion for International Application PCT/US14/24407, report completed Jun. 11, 2014, Mailed Jul. 8, 2014, 9 Pgs.
International Search Report and Written Opinion for International Application PCT/US14/25100, report completed Jul. 7, 2014, Mailed Aug. 7, 2014 5 Pgs.
International Search Report and Written Opinion for International Application PCT/US14/25904 report completed Jun. 10, 2014, Mailed Jul. 10, 2014, 6 Pgs.
International Search Report and Written Opinion for International Application PCT/US2009/044687, completed Jan. 5, 2010, mailed Jan. 13, 2010, 9 pgs.
International Search Report and Written Opinion for International Application PCT/US2010/057661, completed Mar. 9, 2011, 14 pgs.
International Search Report and Written Opinion for International Application PCT/US2012/044014, completed Oct. 12, 2012, 15 pgs.
International Search Report and Written Opinion for International Application PCT/US2012/056151, completed Nov. 14, 2012, 10 pgs.
International Search Report and Written Opinion for International Application PCT/US2012/059813, completed Dec. 17, 2012, 8 pgs.
International Search Report and Written Opinion for International Application PCT/US2012/37670, Mailed Jul. 18, 2012, Completed Jul. 5, 2012, 9 pgs.
International Search Report and Written Opinion for International Application PCT/US2012/58093, Report completed Nov. 15, 2012, 12 pgs.
International Search Report and Written Opinion for International Application PCT/US2014/022123, completed Jun. 9, 2014, Mailed Jun. 25, 2014, 5 pgs.
International Search Report and Written Opinion for International Application PCT/US2014/024947, Completed Jul. 8, 2014, Mailed Aug. 5, 2014, 8 Pgs.
International Search Report and Written Opinion for International Application PCT/US2014/028447, completed Jun. 30, 2014, Mailed Jul. 21, 2014, 8 Pgs.
International Search Report and Written Opinion for International Application PCT/US2014/030692, completed Jul. 28, 2014, Mailed Aug. 27, 2014, 7 Pgs.
International Search Report and Written Opinion for International Application PCT/US2014/064693, Completed Mar. 7, 2015, Mailed Apr. 2, 2015, 15 pgs.
International Search Report and Written Opinion for International Application PCT/US2014/066229, Completed Mar. 6, 2015, Mailed Mar. 19, 2015, 9 Pgs.
International Search Report and Written Opinion for International Application PCT/US2014/067740, Completed Jan. 29, 2015, Mailed Mar. 3, 2015, 10 pgs.
International Search Report and Written Opinion for International Application PCT/US2014/23762, Completed May 30, 2014, Mailed Jul. 3, 2014, 6 Pgs.
Office Action for U.S. Appl. No. 12/952,106, dated Aug. 16, 2012, 12 pgs.
"File Formats Version 6", Alias Systems, 2004, 40 pgs.
Baker et al., "Limits on Super-Resolution and How to Break Them", IEEE Transactions on Pattern Analysis and Machine Intelligence, Sep. 2002, vol. 24, No. 9, pp. 1167-1183.
Bennett et al., "Multispectral Bilateral Video Fusion", 2007 IEEE Transactions on Image Processing, vol. 16, No. 5, May 2007, pp. 1185-1194.
Bertero et al., "Super-resolution in computational imaging", Micron, 2003, vol. 34, Issues 6-7, 17 pgs.
Bishop et al., "Full-Resolution Depth Map Estimation from an Aliased Plenoptic Light Field", ACCV 2010, Part II, LNCS 6493, pp. 186-200.
Bishop et al., "Light Field Superresolution", Computational Photography (ICCP), 2009 IEEE International Conference, 9 pgs.
Bishop et al., "The Light Field Camera: Extended Depth of Field, Aliasing, and Superresolution", IEEE Transactions on Pattern Analysis and Machine Intelligence, May 2012, vol. 34, No. 5, pp. 972-986.
Borman, "Topics in Multiframe Superresolution Restoration", Thesis of Sean Borman, Apr. 2004, 282 pgs.
Borman et al., "Image Sequence Processing", Source unknown, Oct. 14, 2002, 81 pgs.
Borman et al., "Block-Matching Sub-Pixel Motion Estimation from Noisy, Under-Sampled Frames—An Empirical Performance Evaluation", Proc SPIE, Dec. 1998, 3653, 10 pgs.
Borman et al., "Image Resampling and Constraint Formulation for Multi-Frame Super-Resolution Restoration", Proc. SPIE, Jun. 2003, 5016, 12 pgs.
Borman et al., "Linear models for multi-frame super-resolution restoration under non-affine registration and spatially varying PSF", Proc. SPIE, May 2004, vol. 5299, 12 pgs.
Borman et al., "Nonlinear Prediction Methods for Estimation of Clique Weighting Parameters in NonGaussian Image Models", Proc. SPIE, 1998. 3459, 9 pgs.

(56) References Cited

OTHER PUBLICATIONS

Borman et al., "Simultaneous Multi-Frame MAP Super-Resolution Video Enhancement Using Spatio-Temporal Priors", Image Processing, 1999, ICIP 99 Proceedings, vol. 3, pp. 469-473.
Borman et al., "Super-Resolution from Image Sequences—A Review", Circuits & Systems, 1998, pp. 374-378.
Bose et al., "Superresolution and Noise Filtering Using Moving Least Squares", IEEE Transactions on Image Processing, vol. 15, Issue 8, Aug. 2006, 21 pgs.
Bruckner et al., "Artificial compound eye applying hyperacuity", Optics Express, Dec. 11, 2006, vol. 14, No. 25, pp. 12076-12084.
Bruckner et al., "Driving microoptical imaging systems towards miniature camera applications", Proc. SPIE, Micro-Optics, 2010, 11 pgs.
Bruckner et al., "Thin wafer-level camera lenses inspired by insect compound eyes", Optics Express, Nov. 22, 2010, vol. 18, No. 24, pp. 24379-24394.
Capel, "Image Mosaicing and Super-resolution", Retrieved on Nov. 10, 2012, Retrieved from the Internet at URL:<http://citeseerx.ist.psu.edu/viewdoc/download?doi=1 0.1.1.226.2643&rep=rep1&type=pdf>, 2001, 269 pgs.
Chan et al., "Extending the Depth of Field in a Compound-Eye Imaging System with Super-Resolution Reconstruction", Proceedings—International Conference on Pattern Recognition, 2006, vol. 3, pp. 623-626.
Chan et al., "Investigation of Computational Compound-Eye Imaging System with Super-Resolution Reconstruction", IEEE, ISASSP 2006, pp. 1177-1180.
Chan et al., "Super-resolution reconstruction in a computational compound—eye imaging system", Multidim Syst Sign Process, 2007, vol. 18, pp. 83-101.
Chen et al., "Interactive deformation of light fields", In Proceedings of SIGGRAPH I3D 2005, pp. 139-146.
Chen et al., "KNN Matting", IEEE Transactions on Pattern Analysis and Machine Intelligence, Sep. 2013, vol. 35, No. 9, pp. 2175-2188.
Crabb et al., "Real-time foreground segmentation via range and color imaging", Computer Vision and Pattern Recognition Workshops, 2008. CVPRW08. IEEE Computer Society Conference on. IEEE, 2008.
Drouin et al., "Fast Multiple-Baseline Stereo with Occlusion", Proceedings of the Fifth International Conference on 3-D Digital Imaging and Modeling, 2005, 8 pgs.
Drouin et al., "Geo-Consistency for Wide Multi-Camera Stereo", Proceedings of the 2005 IEEE Computer Society Conference on Computer Vision and Pattern Recognition, 2005, 8 pgs.
Drouin et al., "Improving Border Localization of Multi-Baseline Stereo Using Border-Cut", International Journal of Computer Vision, Jul. 2009, vol. 83, Issue 3, 8 pgs.
Duparre et al., "Artificial apposition compound eye fabricated by micro-optics technology", Applied Optics, Aug. 1, 2004, vol. 43, No. 22, pp. 4303-4310.
Duparre et al., "Artificial compound eye zoom camera", Bioinspiration & Biomimetics, 2008, vol. 3, pp. 1-6.
Duparre et al., "Artificial compound eyes—different concepts and their application to ultra flat image acquisition sensors", MOEMS and Miniaturized Systems IV, Proc. SPIE 5346, Jan. 2004, pp. 89-100.
Duparre et al., "Chirped arrays of refractive ellipsoidal microlenses for aberration correction under oblique incidence", Optics Express, Dec. 26, 2005, vol. 13, No. 26, pp. 10539-10551.
Duparre et al., "Micro-optical artificial compound eyes", Bioinspiration & Biomimetics, 2006, vol. 1, pp. R1-R16.
Duparre et al., "Microoptical Artificial Compound Eyes—Two Different Concepts for Compact Imaging Systems", 11th Microoptics Conference, Oct. 30-Nov. 2, 2005, 2 pgs.
Duparre et al., "Microoptical telescope compound eye", Optics Express, Feb. 7, 2005, vol. 13, No. 3, pp. 889-903.
Duparre et al., "Micro-optically fabricated artificial apposition compound eye", Electronic Imaging—Science and Technology, Prod. SPIE 5301, Jan. 2004, pp. 25-33.
Duparre et al., "Novel Optics/Micro-Optics for Miniature Imaging Systems", Proc. of SPIE, 2006, vol. 6196, pp. 619607-1-619607-15.
Duparre et al., "Theoretical analysis of an artificial superposition compound eye for application in ultra flat digital image acquisition devices", Optical Systems Design, Proc. SPIE 5249, Sep. 2003, pp. 408-418.
Duparre et al., "Thin compound-eye camera", Applied Optics, May 20, 2005, vol. 44, No. 15, pp. 2949-2956.
Duparre et al., "Ultra-Thin Camera Based on Artificial Apposition Compound Eyes", 10th Microoptics Conference, Sep. 1-3, 2004, 2 pgs.
Fanaswala, "Regularized Super-Resolution of Multi-View Images", Retrieved on Nov. 10, 2012 (Nov. 11, 2012). Retrieved from the Internet at URL:<http://www.site.uottawa.ca/-edubois/theses/Fanaswala_thesis.pdf>, 163 pgs.
Farrell et al., "Resolution and Light Sensitivity Tradeoff with Pixel Size", Proceedings of the SPIE Electronic Imaging 2006 Conference, 2006, vol. 6069, 8 pgs.
Farsiu et al., "Advances and Challenges in Super-Resolution", International Journal of Imaging Systems and Technology, 2004, vol. 14, pp. 47-57.
Farsiu et al., "Fast and Robust Multiframe Super Resolution", IEEE Transactions on Image Processing, Oct. 2004, vol. 13, No. 10, pp. 1327-1344.
Farsiu et al., "Multiframe Demosaicing and Super-Resolution of Color Images", IEEE Transactions on Image Processing, Jan. 2006, vol. 15, No. 1, pp. 141-159.
Feris et al., "Multi-Flash Stereopsis: Depth Edge Preserving Stereo with Small Baseline Illumination", IEEE Trans on PAMI, 2006, 31 pgs.
Fife et al., "A 3D Multi-Aperture Image Sensor Architecture", Custom Integrated Circuits Conference, 2006, CICC '06, IEEE, pp. 281-284.
Fife et al., "A 3MPixel Multi-Aperture Image Sensor with 0.7Mu Pixels in 0.11Mu CMOS", ISSCC 2008, Session 2, Image Sensors & Technology, 2008, pp. 48-50.
Fischer et al., "Optical System Design", 2nd Edition, SPIE Press, Feb. 14, 2008, pp. 191-198.
Fischer et al., "Optical System Design", 2nd Edition, SPIE Press, Feb. 14, 2008, pp. 49-58.
Goldman et al., "Video Object Annotation, Navigation, and Composition", In Proceedings of UIST 2008, pp. 3-12.
Gortler et al., "The Lumigraph", In Proceedings of SIGGRAPH 1996, pp. 43-54.
Hacohen et al., "Non-Rigid Dense Correspondence with Applications for Image Enhancement", ACM Transactions on Graphics, 30, 4, 2011, pp. 70:1-70:10.
Hamilton, "JPEG File Interchange Format, Version 1.02", Sep. 1, 1992, 9 pgs.
Hardie, "A Fast Image Super-Algorithm Using an Adaptive Wiener Filter", IEEE Transactions on Image Processing, Dec. 2007, vol. 16, No. 12, pp. 2953-2964.
Hasinoff et al., "Search-and-Replace Editing for Personal Photo Collections", Computational Photography (ICCP) 2010, pp. 1-8.
Hernandez-Lopez et al., "Detecting objects using color and depth segmentation with Kinect sensor", Procedia Technology, vol. 3, Jan. 1, 2012 (Jan. 1, 2012), pp. 196-204, XP055307680, ISSN: 2212-0173, DOI: 10.1016/j.protcy.2012.03.021.
Horisaki et al., "Irregular Lens Arrangement Design to Improve Imaging Performance of Compound-Eye Imaging Systems", Applied Physics Express, 2010, vol. 3, pp. 022501-1-022501-3.
Horisaki et al., "Superposition Imaging for Three-Dimensionally Space-Invariant Point Spread Functions", Applied Physics Express, 2011, vol. 4, pp. 112501-1-112501-3.
Horn et al., "LightShop: Interactive Light Field Manipulation and Rendering", In Proceedings of I3D 2007, pp. 121-128.
Isaksen et al., "Dynamically Reparameterized Light Fields", In Proceedings of SIGGRAPH 2000, pp. 297-306.
Jarabo et al., "Efficient Propagation of Light Field Edits", In Proceedings of SIACG 2011, pp. 75-80.
Joshi, et al., "Synthetic Aperture Tracking: Tracking Through Occlusions", ICCV IEEE 11th International Conference on Computer Vision; Publication [online]. Oct. 2007 [retrieved Jul. 28,

(56) References Cited

OTHER PUBLICATIONS

2014]. Retrieved from the Internet: <URL: http:I/ieeexplore.ieee.org/stamp/stamp.jsp?tp=&arnumber=4409032&isnumber=4408819; pp. 1-8.
Kang et al., "Handling Occlusions inn Dense Multi-View Stereo", Computer Vision and Pattern Recognition, 2001, vol. 1, pp. I-103-I-110.
Kitamura et al., "Reconstruction of a high-resolution image on a compound-eye image-capturing system", Applied Optics, Mar. 10, 2004, vol. 43, No. 8, pp. 1719-1727.
Krishnamurthy et al., "Compression and Transmission of Depth Maps for Image-Based Rendering", Image Processing, 2001, pp. 828-831.
Lai et al., "A Large-Scale Hierarchical Multi-View RGB-D Object Dataset", May 2011, 8 pgs.
Lee et al., "Electroactive Polymer Actuator for Lens-Drive Unit in Auto-Focus Compact Camera Module", ETRI Journal, vol. 31, No. 6, Dec. 2009, pp. 695-702.
Lensvector, "How LensVector Autofocus Works", printed Nov. 2, 2012 from http://www.lensvector.com/overview.html, 1 pg.
Levin et al., "A Closed Form Solution to Natural Image Matting", Pattern Analysis and Machine Intelligence, Feb. 2008, vol. 30, 8 pgs.
Levoy, "Light Fields and Computational Imaging", IEEE Computer Society, Aug. 2006, pp. 46-55.
Levoy et al., "Light Field Rendering", Proc. ADM SIGGRAPH '96, pp. 1-12.
Li et al., "A Hybrid Camera for Motion Deblurring and Depth Map Super-Resolution", Jun. 23-28, 2008, IEEE Conference on Computer Vision and Pattern Recognition, 8 pgs. Retrieved from www.eecis.udel.edu/~jye/lab_research/08/deblur-feng.pdf on Feb. 5, 2014.
Liu et al., "Virtual View Reconstruction Using Temporal Information", 2012 IEEE International Conference on Multimedia and Expo, 2012, pp. 115-120.
Lo et al., "Stereoscopic 3D Copy & Paste", ACM Transactions on Graphics, vol. 29, No. 6, Article 147, Dec. 2010, pp. 147:1-147:10.
Merkle et al., "Adaptation and optimization of coding algorithms for mobile 3DTV", Mobile3DTV Project No. 216503, Nov. 2008, 55 pgs.
Mitra et al., "Light Field Denoising, Light Field Superresolution and Stereo Camera Based Refocussing using a GMM Light Field Patch Prior", Computer Vision and Pattern Recognition Workshops (CVPRW), 2012 IEEE Computer Society Conference on Jun. 16-21, 2012, pp. 22-28.
Moreno-Noguer et al., "Active Refocusing of Images and Videos", ACM SIGGRAPH, 2007, vol. 26, pp. 1-10, [retrieved on Jul. 8, 2015], Retrieved from the Internet <U RL:http://doi.acm.org/1 0.1145/1276377.1276461 >.
Muehlebach, "Camera Auto Exposure Control for VSLAM Applications", Studies on Mechatronics, Swiss Federal Institute of Technology Zurich, Autumn Term 2010 course, 67 pgs.
Nayar, "Computational Cameras: Redefining the Image", IEEE Computer Society, Aug. 2006, pp. 30-38.
Ng, "Digital Light Field Photography", Thesis, Jul. 2006, 203 pgs.
Ng et al., "Super-Resolution Image Restoration from Blurred Low-Resolution Images", Journal of Mathematical Imaging and Vision, 2005, vol. 23, pp. 367-378.
Nitta et al., "Image reconstruction for thin observation module by bound optics by using the iterative backprojection method", Applied Optics, May 1, 2006, vol. 45, No. 13, pp. 2893-2900.
Nomura et al., "Scene Collages and Flexible Camera Arrays", Proceedings of Eurographics Symposium on Rendering, 2007, 12 pgs.
Park et al., "Super-Resolution Image Reconstruction", IEEE Signal Processing Magazine, May 2003, pp. 21-36.
Perwass et al., "Single Lens 3D-Camera with Extended Depth-of-Field", printed from www.raytrix.de, Jan. 2012, 15 pgs.
Pham et al., "Robust Super-Resolution without Regularization", Journal of Physics: Conference Series 124, 2008, pp. 1-19.

Philips 3D Solutions, "3D Interface Specifications, White Paper", Philips 3D Solutions retrieved from www.philips.com/3dsolutions, 29 pgs., Feb. 15, 2008.
Pouydebasquea et al., "Varifocal liquid lenses with integrated actuator, high focusing power and low operating voltage fabricated on 200 mm wafers", Sensors and Actuators A: Physical, vol. 172, Issue 1, Dec. 2011, pp. 280-286.
Protter et al., "Generalizing the Nonlocal-Means to Super-Resolution Reconstruction", IEEE Transactions on Image Processing, Jan. 2009, vol. 18, No. 1, pp. 36-51.
Radtke et al., "Laser lithographic fabrication and characterization of a spherical artificial compound eye", Optics Express, Mar. 19, 2007, vol. 15, No. 6, pp. 3067-3077.
Rajan et al., "Simultaneous Estimation of Super Resolved Scene and Depth Map from Low Resolution Defocused Observations", IEEE Transactions on Pattern Analysis and Machine Intelligence, vol. 25, No. 9, Sep. 2003, pp. 1-16.
Rander et al., "Virtualized Reality: Constructing Time-Varying Virtual Worlds From Real World Events", Proc. of IEEE Visualization '97, Phoenix, Arizona, Oct. 19-24, 1997, pp. 277-283, 552.
Rhemann et al, "Fast Cost-Volume Filtering for Visual Correspondence and Beyond", IEEE Trans. Pattern Anal. Mach. Intell, 2013, vol. 35, No. 2, pp. 504-511.
Robertson et al., "Dynamic Range Improvement Through Multiple Exposures", In Proc. of the Int. Conf. on Image Processing, 1999, 5 pgs.
Robertson et al., "Estimation-theoretic approach to dynamic range enhancement using multiple exposures", Journal of Electronic Imaging, Apr. 2003, vol. 12, No. 2, pp. 219-228.
Roy et al., "Non-Uniform Hierarchical Pyramid Stereo for Large Images", Computer and Robot Vision, 2007, pp. 208-215.
Sauer et al., "Parallel Computation of Sequential Pixel Updates in Statistical Tomographic Reconstruction", ICIP 1995, pp. 93-96.
Shum et al., "Pop-Up Light Field: An Interactive Image-Based Modeling and Rendering System", Apr. 2004, ACM Transactions on Graphics, vol. 23, No. 2, pp. 143-162. Retrieved from http://131.107.65.14/en-us/um/people/jiansun/papers/PopupLightField_TOG.pdf on Feb. 5, 2014.
Stollberg et al., "The Gabor superlens as an alternative wafer-level camera approach inspired by superposition compound eyes of nocturnal insects", Optics Express, Aug. 31, 2009, vol. 17, No. 18, pp. 15747-15759.
Sun et al., "Image Super-Resolution Using Gradient Profile Prior", 2008 IEEE Conference on Computer Vision and Pattern Recognition, Jun. 23-28, 2008, 8 pgs.
Takeda et al., "Super-resolution Without Explicit Subpixel Motion Estimation", IEEE Transaction on Image Processing, Sep. 2009, vol. 18, No. 9, pp. 1958-1975.
Tallon et al., "Upsampling and Denoising of Depth Maps Via Joint-Segmentation", 20th European Signal Processing Conference, Aug. 27-31, 2012, 5 pgs.
Tanida et al., "Color imaging with an integrated compound imaging system", Optics Express, Sep. 8, 2003, vol. 11, No. 18, pp. 2109-2117.
Tanida et al., "Thin observation module by bound optics (TOMBO): concept and experimental verification", Applied Optics, Apr. 10, 2001, vol. 40, No. 11, pp. 1806-1813.
Taylor, "Virtual camera movement: The way of the future?", American Cinematographer vol. 77, No. 9, Sep. 1996, 93-100.
Vaish et al., "Reconstructing Occluded Surfaces Using Synthetic Apertures: Stereo, Focus and Robust Measures", Proceeding, CVPR '06 Proceedings of the 2006 IEEE Computer Society Conference on Computer Vision and Pattern Recognition—vol. 2, pp. 2331-2338.
Vaish et al., "Synthetic Aperture Focusing Using a Shear-Warp Factorization of the Viewing Transform", IEEE Workshop on A3DISS, CVPR, 2005, 8 pgs.
Vaish et al., "Using Plane + Parallax for Calibrating Dense Camera Arrays", IEEE Conference on Computer Vision and Pattern Recognition (CVPR), 2004, 8 pgs.
Veilleux, "CCD Gain Lab: The Theory", University of Maryland, College Park—Observational Astronomy (ASTR 310), Oct. 19,

(56) References Cited

OTHER PUBLICATIONS 2006, pp. 1-5 (online), [retrieved on May 13, 2014]. Retrieved from the Internet <URL: http://www.astro.umd.edu/~veilleux/ASTR310/fall06/ccd_theory.pdf, 5 pgs.
Venkataraman et al., "PiCam: An Ultra-Thin High Performance Monolithic Camera Array", ACM Transactions on Graphics (TOG), ACM, US, vol. 32, No. 6, Nov. 1, 2013 (Nov. 1, 2013), pp. 1-13.
Vuong et al., "A New Auto Exposure and Auto White-Balance Algorithm to Detect High Dynamic Range Conditions Using CMOS Technology", Proceedings of the World Congress on Engineering and Computer Science 2008, WCECS 2008, Oct. 22-24, 2008.
Wetzstein et al., "Computational Plenoptic Imaging", Computer Graphics Forum, 2011, vol. 30, No. 8, pp. 2397-2426.
Wheeler et al., "Super-Resolution Image Synthesis Using Projections Onto Convex Sets in the Frequency Domain", Proc. SPIE, 2005, 5674, 12 pgs.
Wikipedia, "Polarizing Filter (Photography)", retrieved fromhttp://en.wikipedia.org/wiki/Polarizing_filter_(photography) on Dec. 12, 2012, 5 pgs.
Wilburn, "High Performance Imaging Using Arrays of Inexpensive Cameras", Thesis of Bennett Wilburn, Dec. 2004, 128 pgs.
Wilburn et al., "High Performance Imaging Using Large Camera Arrays", ACM Transactions on Graphics, Jul. 2005, vol. 24, No. 3, pp. 1-12.
Wilburn et al., "High-Speed Videography Using a Dense Camera Array", Proceeding, CVPR'04 Proceedings of the 2004 IEEE Computer Society Conference on Computer Vision and Pattern Recognition, pp. 294-301.
Wilburn et al., "The Light Field Video Camera", Proceedings of Media Processors 2002, SPIE Electronic Imaging, 2002, 8 pgs.
Wippermann et al., "Design and fabrication of a chirped array of refractive ellipsoidal micro-lenses for an apposition eye camera objective", Proceedings of SPIE, Optical Design and Engineering II, Oct. 15, 2005, 59622C-1-59622C-11.
Wu et al., "A virtual view synthesis algorithm based on image inpainting", 2012 Third International Conference on Networking and Distributed Computing. IEEE, 2012.
Yang et al., "A Real-Time Distributed Light Field Camera", Eurographics Workshop on Rendering (2002), pp. 1-10.
Yang et al., "Superresolution Using Preconditioned Conjugate Gradient Method", Proceedings of SPIE—The International Society for Optical Engineering, Jul. 2002, 8 pgs.
Zhang et al., "A Self-Reconfigurable Camera Array", Eurographics Symposium on Rendering, 2004, 12 pgs.
Zhang et al., "Depth estimation, spatially variant image registration, and super-resolution using a multi-lenslet camera", Proceedings of SPIE, vol. 7705, Apr. 23, 2010, pp. 770505-770505-8, XP055113797 ISSN: 0277-786X, DOI: 10.1117/12.852171.
Zheng et al., "Balloon Motion Estimation Using Two Frames", Proceedings of the Asilomar Conference on Signals, Systems and Computers, IEEE, Comp. Soc. Press, US, vol. 2 of 02, Nov. 4, 1991, pp. 1057-1061.
Zomet et al., "Robust Super-Resolution", IEEE, 2001, pp. 1-6.

\* cited by examiner

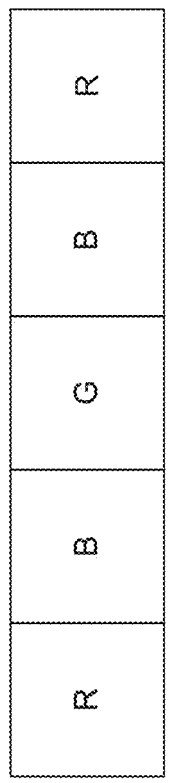
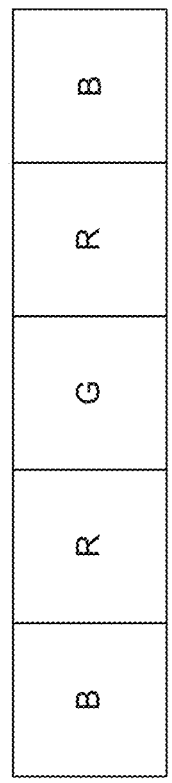
FIG. 4A
FIG. 4B

| FIG. 6A | FIG. 6B | FIG. 6C | FIG. 6D | FIG. 6E | FIG. 6F |
|---|---|---|---|---|---|
| G | G | G | G | G | G |
| R | R | B | R | N | P |
| B | G | G | N | R | R |
| G | B | R | R | B | B |
| R | G | G | G | G | G |
| B | B | R | B | B | B |
| G | G | R | N | R | R |
| R | R | B | R | N | P |
| G | G | G | G | G | G |

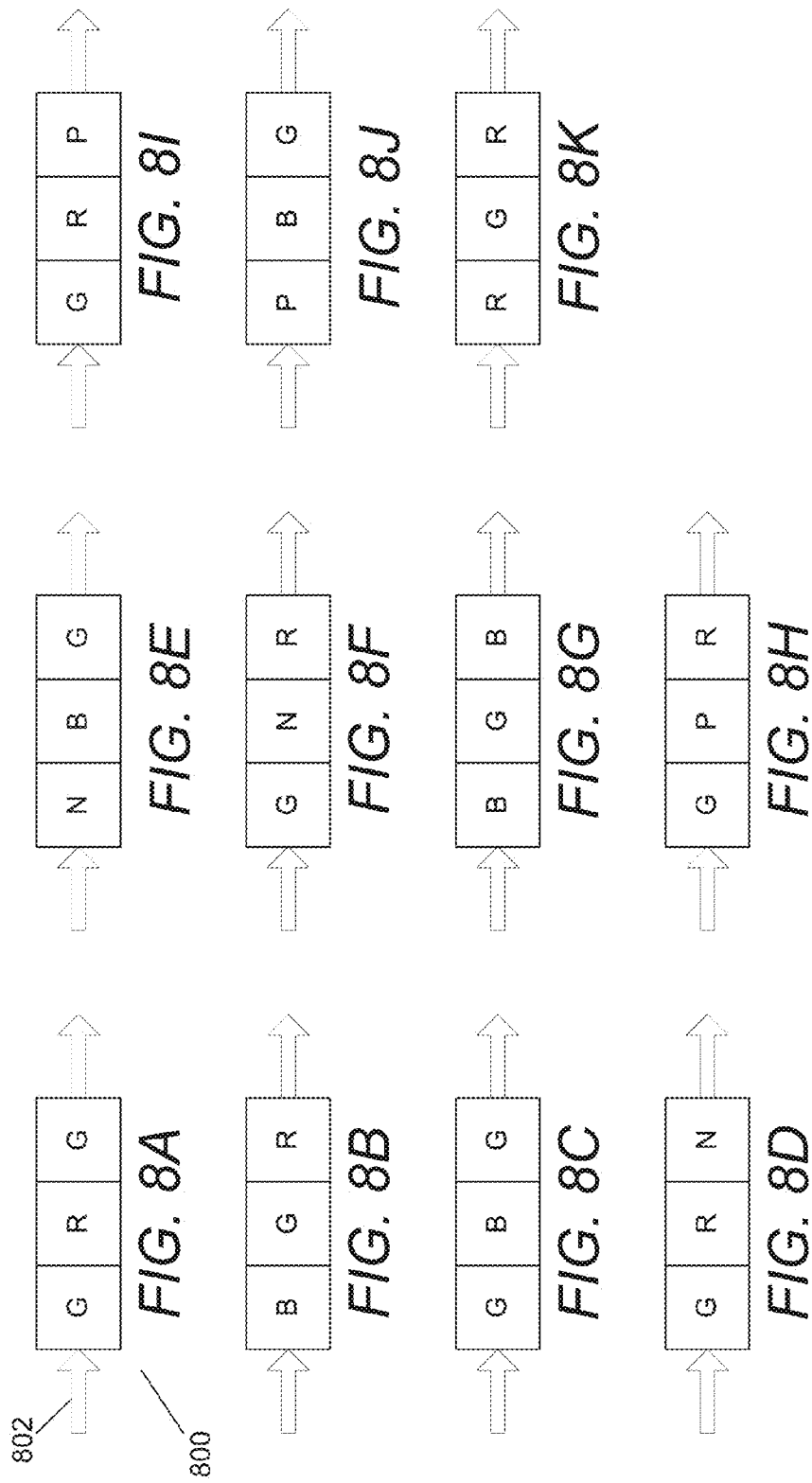

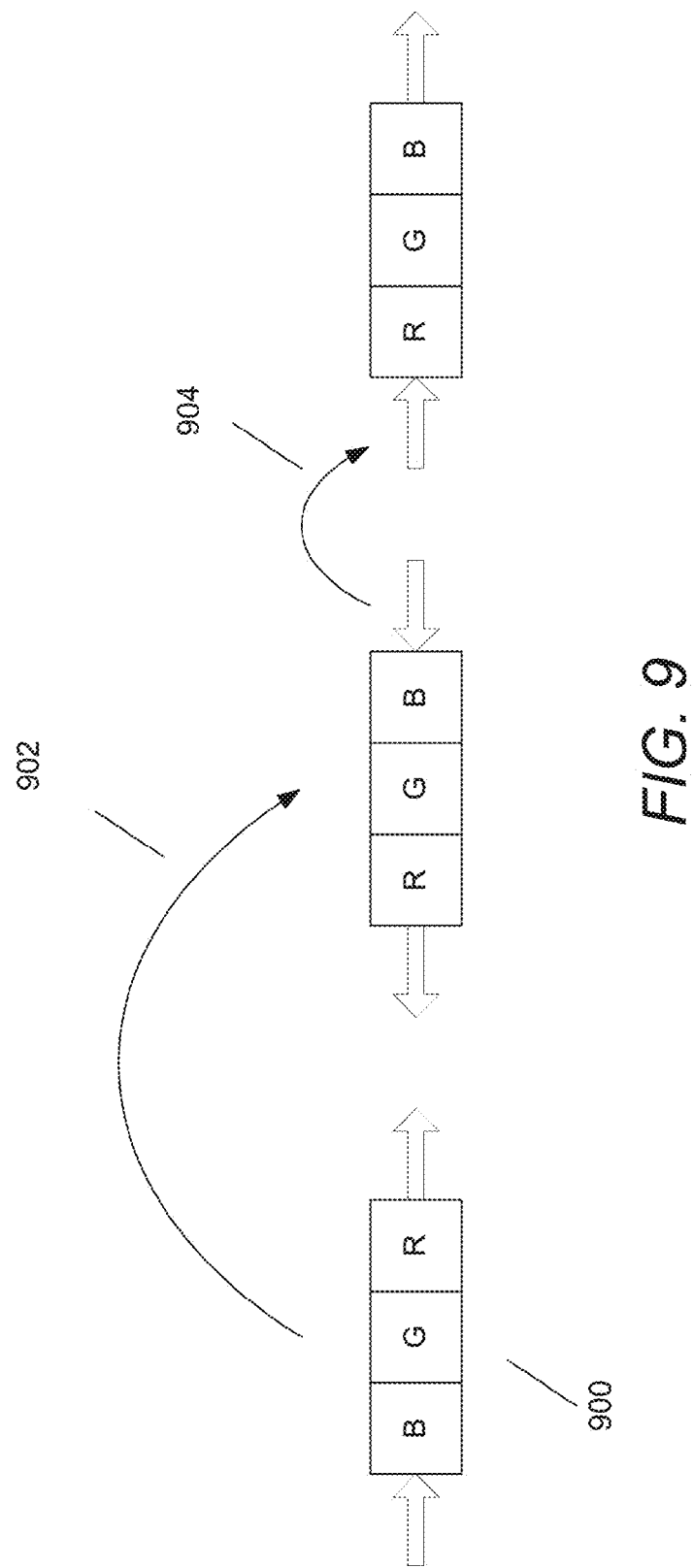

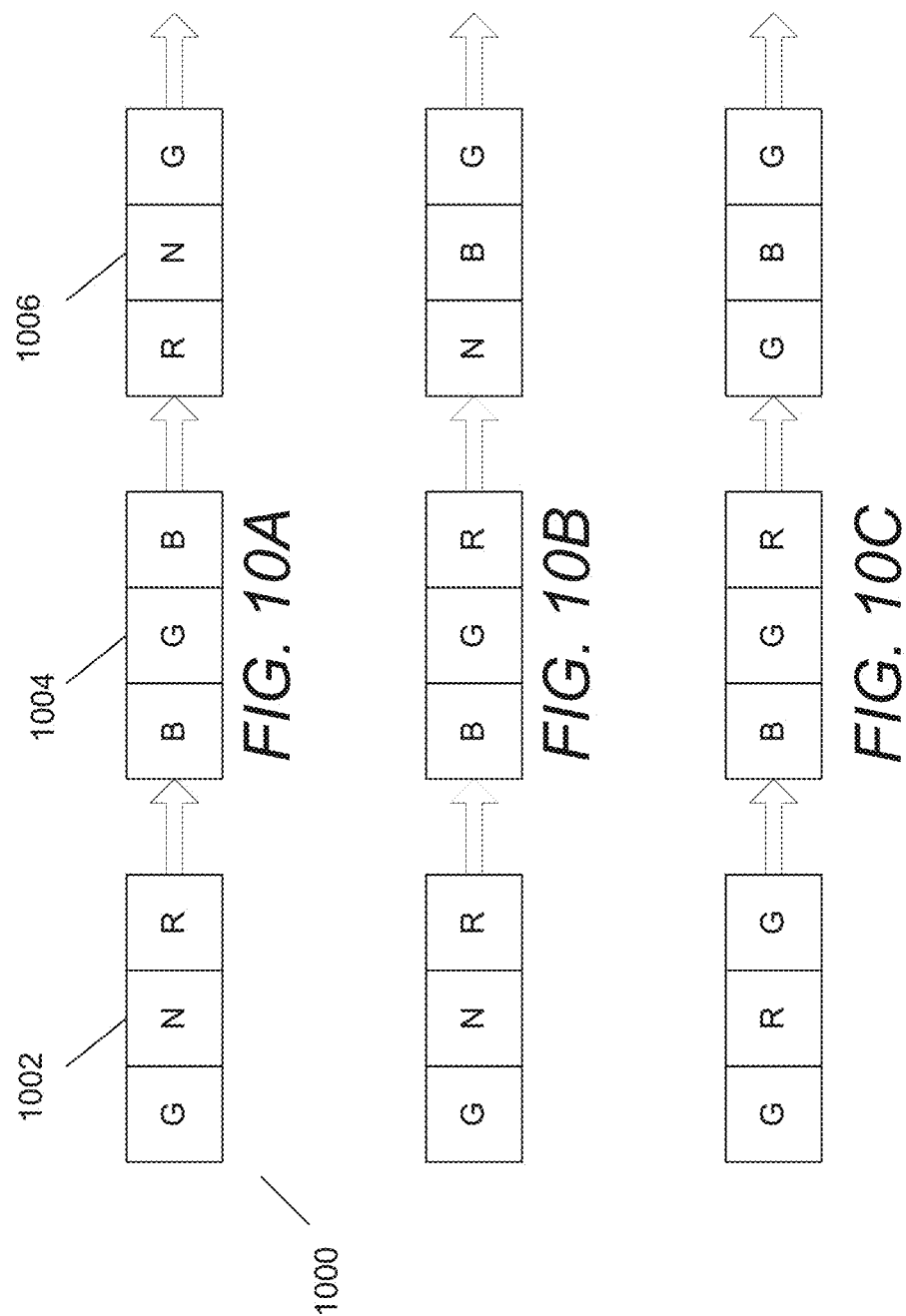

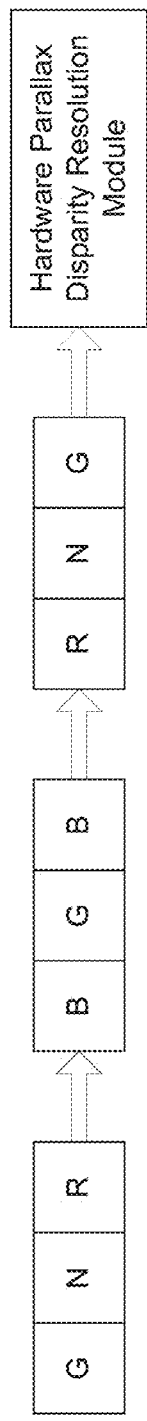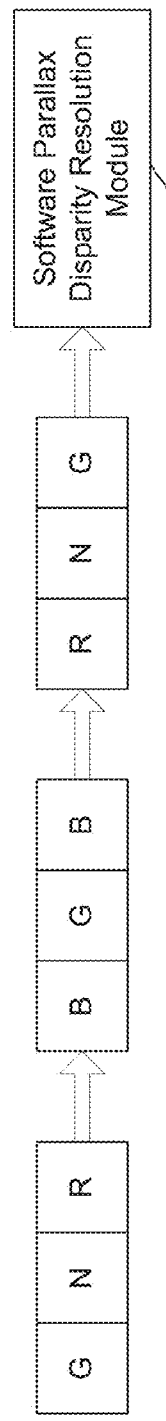

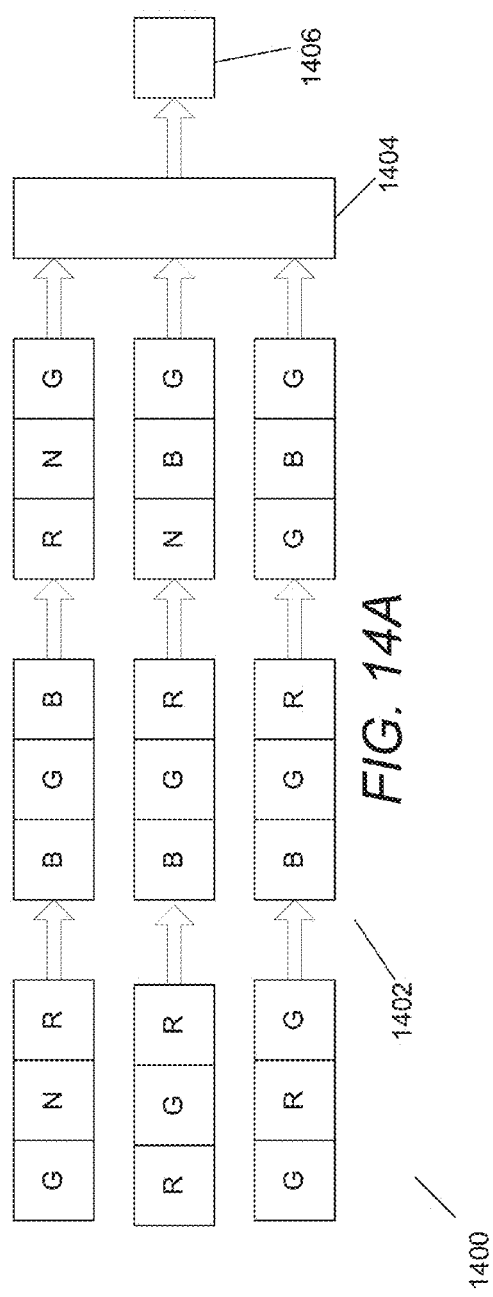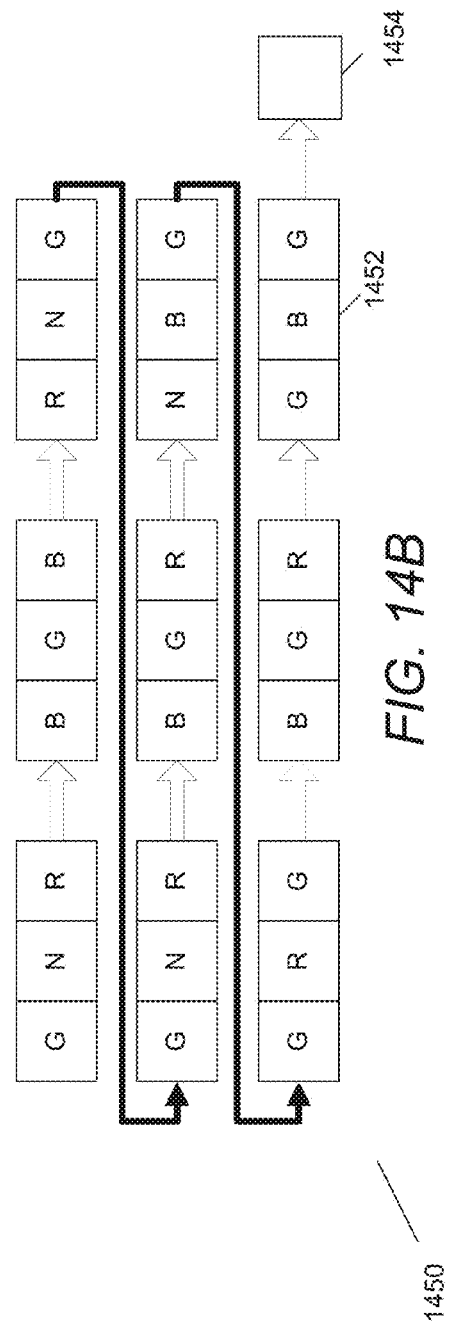

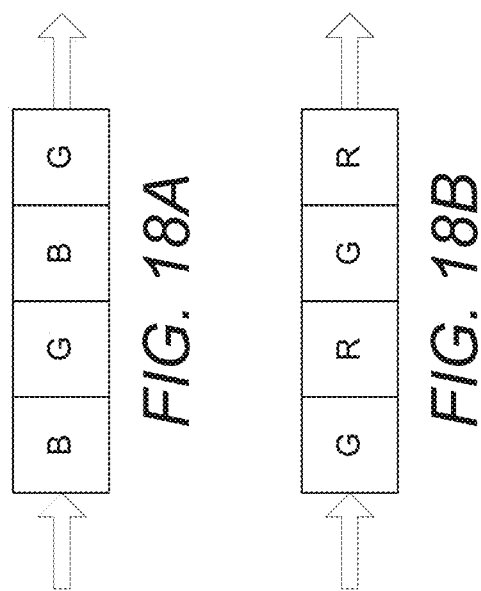

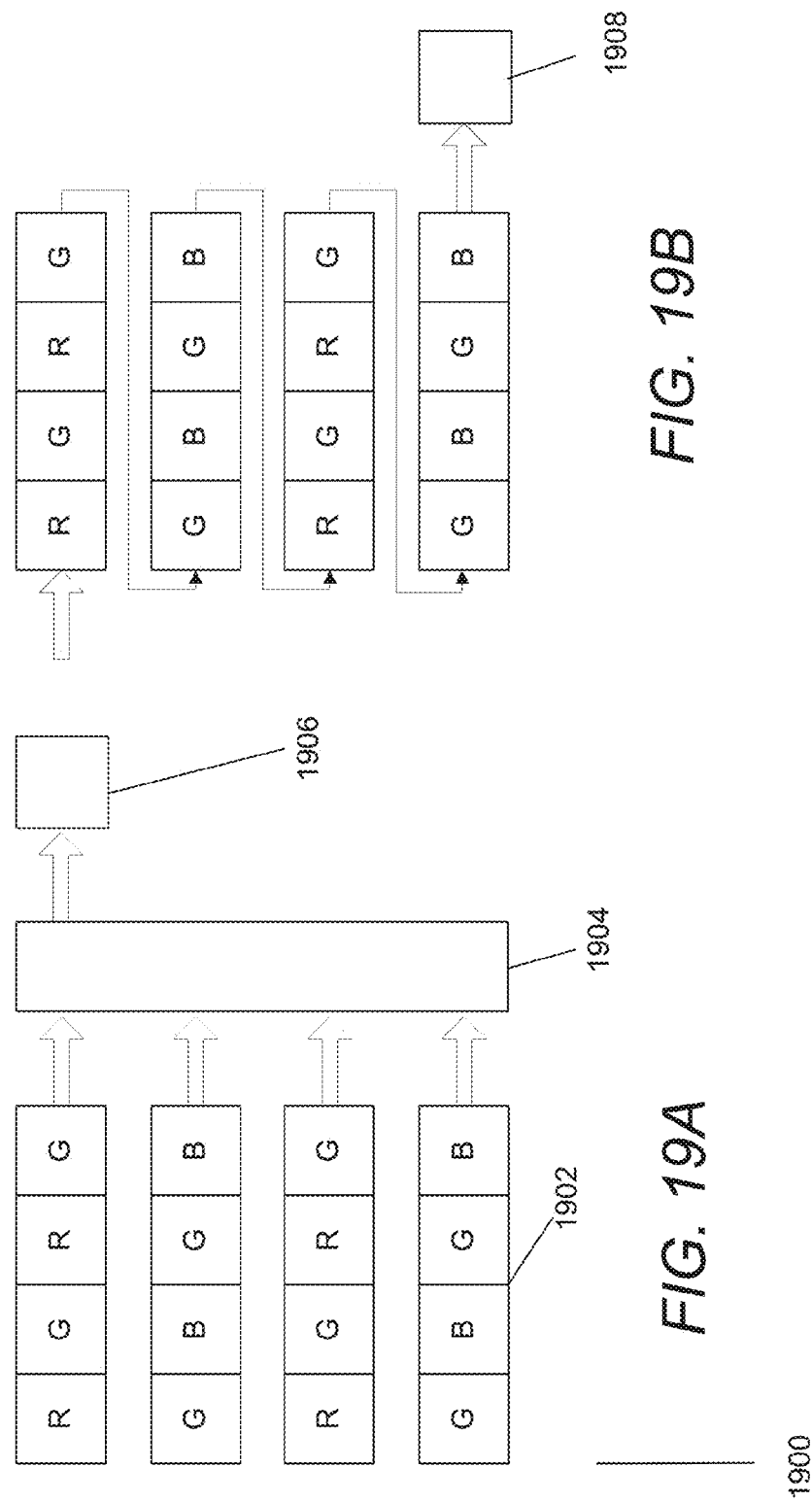

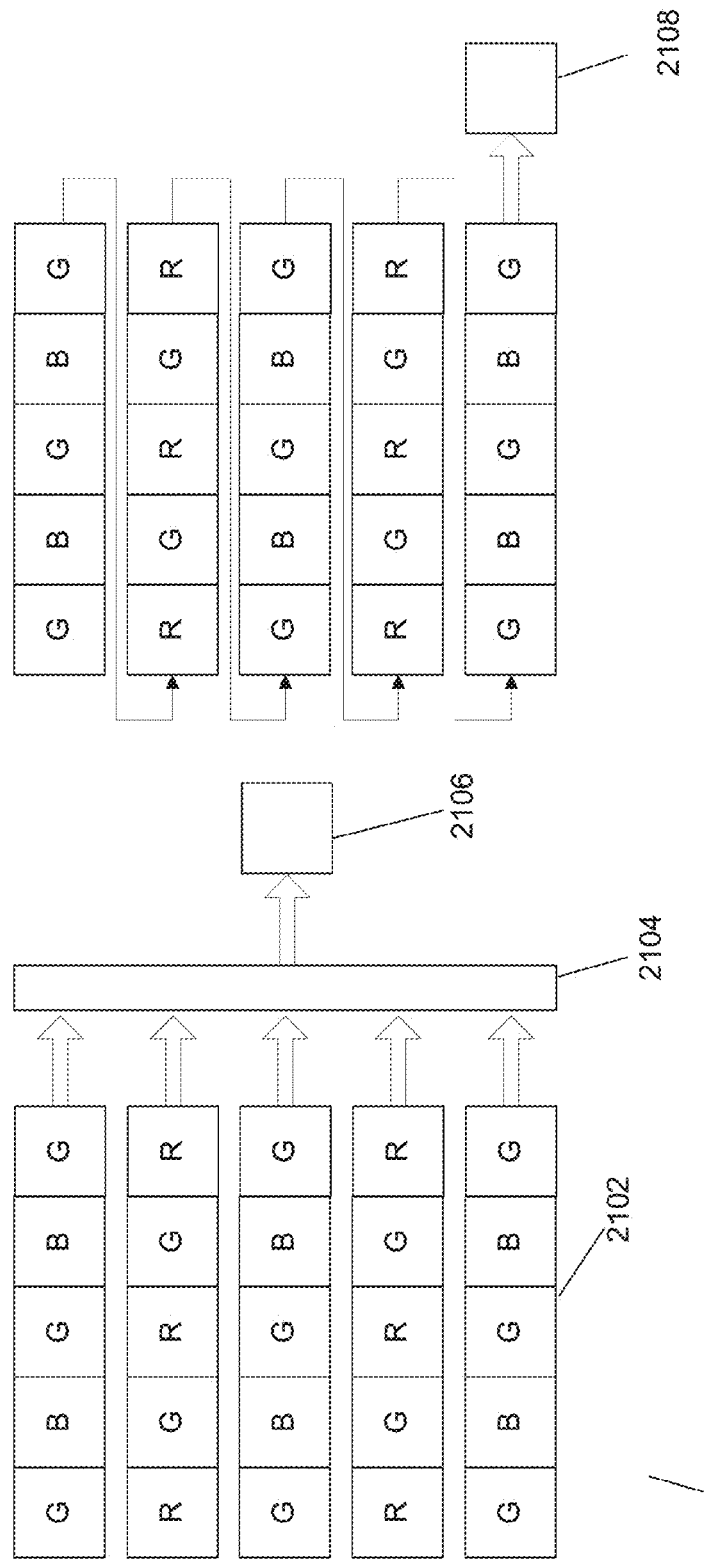

THIN FORM FACTOR COMPUTATIONAL ARRAY CAMERAS AND MODULAR ARRAY CAMERAS

CROSS-REFERENCE TO RELATED APPLICATIONS

The current application is a continuation of U.S. application Ser. No. 14/188,524, filed Feb. 24, 2014, which application claims priority to U.S. Provisional Application No. 61/768,523, filed Feb. 24, 2013, the disclosures of which are incorporated herein by reference.

FIELD OF THE INVENTION

The present invention generally relates to one-dimensional array cameras and also relates to the construction of modular array cameras using one-dimensional sub-array modules.

BACKGROUND

In response to the constraints placed upon a traditional digital camera based upon the camera obscura, a new class of cameras that can be referred to as array cameras has been proposed. Array cameras are characterized in that they include an imager array that has multiple arrays of pixels, where each pixel array is intended to define a focal plane, and each focal plane has a separate lens stack. Typically, each focal plane includes a plurality of rows of pixels that also forms a plurality of columns of pixels, and each focal plane is contained within a region of the imager that does not contain pixels from another focal plane. An image is typically formed on each focal plane by its respective lens stack. In many instances, the array camera is constructed using an imager array that incorporates multiple focal planes and an optic array of lens stacks.

SUMMARY OF THE INVENTION

Systems and methods in accordance with embodiments of the invention implement one-dimensional array cameras, as well as modular array cameras using sub-array modules. In one embodiment, a 1×N array camera module includes: a 1×N arrangement of focal planes, where N is greater than or equal to 2, each focal plane includes a plurality of rows of pixels that also form a plurality of columns of pixels, and each focal plane does not include pixels from another focal plane; and a 1×N arrangement of lens stacks, the 1×N arrangement of lens stacks being disposed relative to the 1×N arrangement of focal planes so as to form a 1×N arrangement of cameras, each of which being configured to independently capture an image of a scene, where each lens stack has a field of view that is shifted with respect to the field-of-views of each other lens stack so that each shift includes a sub-pixel shifted view of the scene.

In another embodiment, N is greater than or equal to 3.

In yet another embodiment, N is 5.

In still another embodiment, the 1×N arrangement of cameras includes a green camera that is configured to image light corresponding with the green band of the visible spectrum.

In still yet another embodiment, the green camera is centrally disposed relative to the 1×N arrangement of cameras.

In a further embodiment, the lens stack of the green camera is adapted to image light corresponding with the green band of the visible spectrum.

In a still further embodiment, a red camera that is configured to image light corresponding with the red band of the visible spectrum and a blue camera that is configured to image light corresponding with the blue band of the visible spectrum are each disposed on either side of the centrally disposed green camera.

In a yet further embodiment, N is 7.

In a still yet further embodiment, the 1×N arrangement of cameras includes a green camera that is configured to image light corresponding with the green band of the visible spectrum, and that is centrally disposed relative to the 1×N arrangement of cameras.

In another embodiment, a red camera that is configured to image light corresponding with the red band of the visible spectrum and a blue camera that is configured to image light corresponding with the blue band of the visible spectrum are each disposed on either side of the centrally disposed green camera.

In yet another embodiment, N is 9.

In still another embodiment, the 1×N arrangement of cameras includes a green camera that is configured to image light corresponding with the green band of the visible spectrum, and that is centrally disposed relative to the 1×N arrangement of cameras.

In still yet another embodiment, a red camera that is configured to image light corresponding with the red band of the visible spectrum and a blue camera that is configured to image light corresponding with the blue band of the visible spectrum are each disposed on either side of the centrally disposed green camera.

In a further embodiment, the 1×N arrangement of focal planes is embodied within a monolithic structure.

In a still further embodiment, the 1×N arrangement of lens stacks is embodied within a monolithic structure.

In a yet further embodiment, the 1×N arrangement of focal planes and the 1×N arrangement of lens stacks are each embodied within the same monolithic structure.

In a still yet further embodiment, at least one camera is embodied within a single sub-array module, the sub-array module including: a 1×X arrangement of focal planes, where X is greater than or equal to 1, each focal plane comprises a plurality of rows of pixels that also form a plurality of columns of pixels, and each focal plane does not include pixels from another focal plane; and a 1×X arrangement of lens stacks, the 1×X arrangement of lens stacks being disposed relative to the 1×X arrangement of focal planes so as to form a 1×X arrangement of cameras, each of which being configured to independently capture an image of a scene, where each lens stack has a field of view that is shifted with respect to the field-of-views of each other lens stack so that each shift includes a sub-pixel shifted view of the scene.

In another embodiment, the sub-array module further includes interface circuitry that can allow the sub-array module to interface with another sub-array module so that it can at least transmit image data to another sub-array module or receive image data from another sub-array module.

In yet another embodiment, the 1×X arrangement of cameras is embodied within a single monolithic structure.

In still another embodiment N is 9 and X is 3.

In still yet another embodiment, the 1×9 arrangement of cameras are embodied within three 1×3 sub-array modules, each 1×3 sub-array module including: a 1×3 arrangement of focal planes, where each focal plane comprises a plurality of rows of pixels that also form a plurality of columns of pixels, and each focal plane does not include pixels from another focal plane; and a 1×3 arrangement of lens stacks, the 1×3 arrangement of lens stacks being disposed relative to the 1×3 arrangement of focal planes so as to form a 1×3 arrangement of cameras, each of which being configured to independently capture an image of a scene, where each lens stack has a field of view that is shifted with respect to the field-of-views of each other lens stack so that each shift includes a sub-pixel shifted view of the scene.

In a further embodiment, each sub-array module further includes interface circuitry that can allow the sub-array module to interface with another sub-array module so that it can at least transmit image data to another sub-array module or receive image data from another sub-array module.

In a still further embodiment, an array camera module further includes at least two sub-array modules, where each sub-array module includes: a 1×X arrangement of focal planes, where X is greater than or equal to 1, each focal plane comprises a plurality of rows of pixels that also form a plurality of columns of pixels, and each focal plane does not include pixels from another focal plane; and a 1×X arrangement of lens stacks, the 1×X arrangement of lens stacks being disposed relative to the 1×X arrangement of focal planes so as to form a 1×X arrangement of cameras, each of which being configured to independently capture an image of a scene, where each lens stack has a field of view that is shifted with respect to the field-of-views of each other lens stack so that each shift includes a sub-pixel shifted view of the scene; where each of the at least two sub-array modules are adjoined to the interconnects of a single substrate, and can thereby interface with at least one other sub-array module.

In a yet further embodiment, each of the at least two sub-array modules further includes interface circuitry that can allow the respective sub-array module to interface with another sub-array module so that it can at least transmit image data to another sub-array module or receive image data from another sub-array module.

In a still yet further embodiment, the substrate is optically transparent.

In another embodiment, the substrate is glass.

In yet another embodiment, the substrate is ceramic.

In a further embodiment, a 1×X sub-array module includes: a 1×X arrangement of focal planes, where X is greater than or equal to 1, each focal plane comprises a plurality of rows of pixels that also form a plurality of columns of pixels, and each focal plane does not include pixels from another focal plane; and a 1×X arrangement of lens stacks, the 1×X arrangement of lens stacks being disposed relative to the 1×X arrangement of focal planes so as to form a 1×X arrangement of cameras, each of which being configured to independently capture an image of a scene, where each lens stack has a field of view that is shifted with respect to the field-of-views of each other lens stack so that each shift includes a sub-pixel shifted view of the scene.

In a yet further embodiment, the 1×X sub-array module further includes interface circuitry that can allow the sub-array module to interface with another sub-array module so that it can at least transmit image data to another sub-array module or receive image data from another sub-array module.

In a still further embodiment, the interface circuitry implements a MIPI CSI 2 interface.

In another embodiment, a 1×N array camera includes: a 1×N arrangement of focal planes, where N is greater than or equal to 2, each focal plane comprises a plurality of rows of pixels that also form a plurality of columns of pixels, and each focal plane does not include pixels from another focal plane; and a 1×N arrangement of lens stacks, the 1×N arrangement of lens stacks being disposed relative to the 1×N arrangement of focal planes so as to form a 1×N arrangement of cameras, each of which being configured to independently capture an image of a scene, where each lens stack has a field of view that is shifted with respect to the field-of-views of each other lens stack so that each shift includes a sub-pixel shifted view of the scene; and a processor that is configured to construct an image of the scene using image data generated by the 1×N array camera module.

In a further embodiment, an X×Y sub-array module includes: an X×Y arrangement of focal planes, where X and Y are each greater than or equal to 1, each focal plane includes a plurality of rows of pixels that also form a plurality of columns of pixels, and each focal plane does not include pixels from another focal plane; and an X×Y arrangement of lens stacks, the X×Y arrangement of lens stacks being disposed relative to the X×Y arrangement of focal planes so as to form an X×Y arrangement of cameras, each of which being configured to independently capture an image of a scene, where each lens stack has a field of view that is shifted with respect to the field-of-views of each other lens stack so that each shift includes a sub-pixel shifted view of the scene; and image data output circuitry that is configured to output image data from the X×Y sub-array module that can be aggregated with image data from other sub-array modules so that an image of the scene can be constructed.

In a yet further embodiment, X is 1.

In a still further embodiment, X and Y are each greater than 1.

In a still yet further embodiment, the arrangement of cameras are embodied within a single monolithic structure In another embodiment, an M×N array camera includes: a plurality of X×Y sub-array modules, each including: an X×Y arrangement of focal planes, where X and Y are each greater than or equal to 1, each focal plane includes a plurality of rows of pixels that also form a plurality of columns of pixels, and each focal plane does not include pixels from another focal plane; and an X×Y arrangement of lens stacks, the X×Y arrangement of lens stacks being disposed relative to the X×Y arrangement of focal planes so as to form an X×Y arrangement of cameras, each of which being configured to independently capture an image of a scene, where each lens stack has a field of view that is shifted with respect to the field-of-views of each other lens stack so that each shift includes a sub-pixel shifted view of the scene; and image data output circuitry that is configured to output image data from the sub-array module that can be aggregated with image data from other sub-array modules so that an image of the scene can be constructed; where the plurality of X×Y sub-array modules define at least some of the cameras in an M×N arrangement of cameras; and a processor; where the processor is configured to construct an image of the scene using image data generated by each of the sub-array modules.

In yet another embodiment, X is 1 and M is 1.

In still another embodiment, the plurality of X×Y sub-array modules define an M×N arrangement of cameras.

In still yet another embodiment, an M×N array camera further includes circuitry that aggregates the image data generated by each of the sub-array modules into a single MIPI output, and provides the MIPI output to the processor so that the processor can construct an image of the scene.

In a further embodiment, an M×N array camera further includes a parallax disparity resolution module, where the parallax disparity resolution module is configured to receive image data captured by each sub-array module, implement a parallax detection and correction process on the received image data, and output the result for further processing.

In a still further embodiment, an M×N array camera further includes circuitry that converts the output of the parallax disparity resolution module into a single MIPI output, and provides the MIPI output to the processor so that the processor can construct an image of the scene.

In a still yet further embodiment, the parallax disparity resolution module includes a processor and memory, where the memory contains software to configure the processor to act as a parallax disparity resolution module.

In another embodiment, the parallax disparity resolution module is a hardware parallax disparity resolution module.

In still another embodiment, M and N are each greater than or equal to 2.

In yet another embodiment, at least two of the plurality of sub-array modules are adjoined to the interconnects of a single substrate, and can thereby output image data through the interconnects.

In still yet another embodiment, each of the plurality of sub-array modules are adjoined to the interconnects of a single substrate, and can thereby output image data through the interconnects.

In a further embodiment, the substrate is optically transparent.

In a still further embodiment, the substrate is glass.

In a still yet further embodiment, the substrate is ceramic.

In another embodiment, at least one sub-array module is embodied within a single monolithic structure.

In yet another embodiment, each sub-array module is embodied within a single respective monolithic structure.

In still another embodiment, an array camera further includes: a plurality of I/O devices, where each of the plurality of I/O devices interfaces with at least one camera: and a separate I/O block that includes circuitry configured to receive image data, aggregate the received image data, and output the aggregated image data to the processor so that the processor can construct an image of the scene; and where each of the plurality of I/O devices interfaces with the I/O block.

In still yet another embodiment, the number of I/O devices equals the number of sub-array modules, and each I/O device interfaces with a corresponding sub-array module.

BRIEF DESCRIPTION OF THE DRAWINGS

FIGS. 4A and 4B illustrate 1×5 array camera modules in accordance with embodiments of the invention.

FIGS. 5A-5C illustrate 1×7 array camera modules in accordance with embodiments of the invention.

FIGS. 6A-6F illustrate 1×9 array camera modules in accordance with embodiments of the invention.

FIGS. 8A-8K illustrate 1×3 sub-array modules in accordance with embodiments of the invention.

FIG. 9 illustrates how sub-array modules may be reconfigured in accordance with an embodiment of the invention.

FIGS. 10A-10C illustrate how 1×3 sub-array modules may be coupled to form array camera modules in accordance with embodiments of the invention.

FIGS. 13A-13B illustrate how array camera modules formed from sub-array modules may utilize a parallax disparity resolution module in accordance with embodiments of the invention.

FIGS. 14A-14B illustrate how sub-array modules may be coupled to form an M×N array camera in accordance with embodiments of the invention.

FIGS. 18A-18B illustrate 1×4 sub-array modules in accordance with embodiments of the invention.

FIGS. 19A-19B illustrate how 1×4 sub-array modules may be coupled to form an M×N array camera in accordance with embodiments of the invention.

FIGS. 21A-21B illustrate how 1×5 sub-array modules may be coupled to form an M×N array camera in accordance with embodiments of the invention.

DETAILED DESCRIPTION

Figure 1:
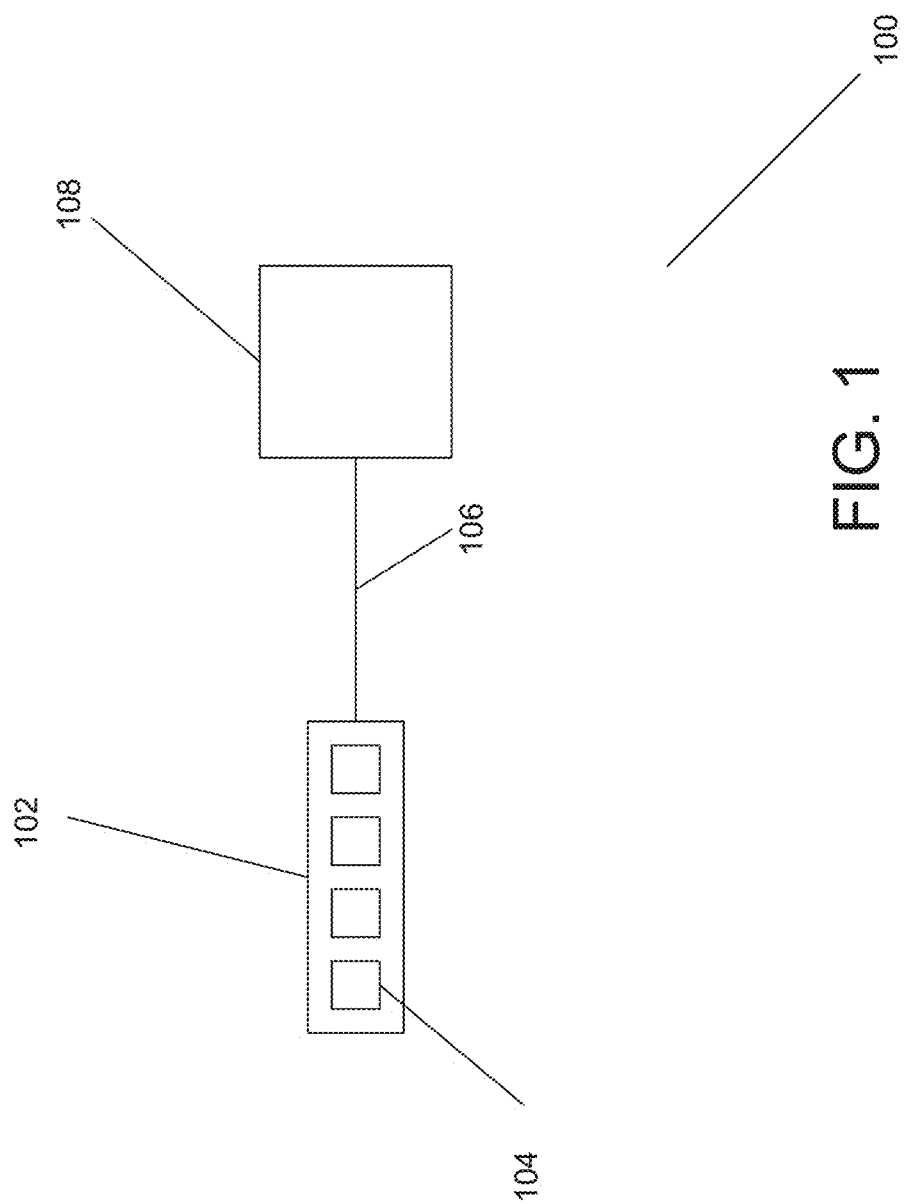
FIG. 1 conceptually illustrates an array camera architecture in accordance with an embodiment of the invention.

Turning now to the drawings, systems and methods for implementing one-dimensional array cameras and modular array cameras are disclosed. Processes for constructing array cameras using lens stack arrays are described in U.S. patent application Ser. No. 12/935,504, entitled "Capturing and Processing of Images Using Monolithic Camera Array with Heterogeneous Imagers", Venkataraman et al., which is incorporated herein by reference in its entirety. The monolithic array camera modules illustrated in U.S. patent application Ser. No. 12/935,504 can be constructed from an optic array of lens stacks—each lens stack in the array defining an optical channel—and an imager array including a plurality of focal planes corresponding to the optical channels in the optic array. The combination of a lens stack and its corresponding focal plane can be understood to be a 'camera' (as opposed to an 'array camera'). Typically, array cameras capture image data that can be used to form multiple images of a single scene using their constituent cameras, and process the image data to yield a single image of the scene with improved image properties.

U.S. patent application Ser. No. 12/935,504 discloses many two-dimensional array camera schemes. However, such two-dimensional embodiments may be inapplicable in a number of desirable applications. For example, a consumer electronics device, such as a tablet or smartphone, may benefit from the use of an array camera with a distinctly thin form factor such that it would be able to fit within the device's bezel.

Many embodiments of the invention utilize one-dimensional array camera modules. One-dimensional array camera modules are advantageous insofar as they may accommodate distinct form factor requirements, and are further advantageous in that they may ease processing requirements as compared with two-dimensional array cameras (e.g. they simplify parallax disparity resolution calculations). In many embodiments, 1×5 array camera modules are utilized in the construction of an array camera. In several embodiments, a 1×5 array camera module is utilized that includes a central narrow spectral band green camera (i.e. a camera configured to image light that falls within the 'green' band of the visible spectrum, which can be achieved, for example, where the corresponding lens stack is configured to focus light that falls within the 'green' band of the visible spectrum onto the corresponding focal plane), and adjacent narrow spectral band blue and red cameras on either side of the central narrow spectral band green camera. In a number of embodiments, 1×7 array camera modules are utilized in the construction of array cameras. In several embodiments, a 1×7 array camera module includes a central narrow spectral band green camera, adjacent narrow spectral band blue and red cameras on either side of the central narrow spectral band green camera, and two periphery narrow spectral band green cameras.

In many embodiments, 1×9 array camera modules are utilized in the construction of an array camera. A 1×9 array camera module can be preferable to either a 1×7 or a 1×5 array camera module since a 1×9 array camera module can capture more image data. 1×9 array camera modules may include narrow spectral band green, blue, and red cameras, full visual spectrum cameras, and/or near-infrared (near-IR) cameras, which are useful for imaging in low lighting conditions. In many embodiments, a 1×9 array camera module includes more narrow spectral band green cameras than either narrow spectral band blue, narrow spectral band red, or near-IR cameras.

In many embodiments, one-dimensional array camera modules are constructed that do not use narrow spectral band cameras; in many embodiments one-dimensional array camera modules are constructed that employ Bayer filters to facilitate the imaging of a scene.

Although one-dimensional array cameras may be beneficial in numerous applications, their manufacture can be challenging. Specifically, components for one-dimensional array cameras (e.g. the lenses and the corresponding sensor) are typically manufactured on wafers, but the elongated nature of the components may not be conducive to optimizing wafer space. For example, in the manufacture of a one-dimensional lens array, the periphery of the wafer used in the manufacture may contain significant unused space that, because of the elongated shape of lens array, cannot accommodate further lens arrays. In other words, wafers may be more efficient in the manufacture of components that are more 'square' in shape than 'elongated.'

In many embodiments of the invention, array cameras constructed using sub-array modules. Each of the sub-array modules are configured to interface with other sub-array modules so that data can pass between the sub-array modules, enabling a processor to communicate with multiple sub-array modules via an interface with one of the sub-array modules. The dies used in the construction of sub-array modules may be less elongated as compared with the dies utilized in the construction of the aforementioned one-dimensional array camera modules, and can therefore better utilize wafer space. In several embodiments, a 1×3 sub-array module is utilized that includes input and output interface circuitry, which allow the sub-array module to couple with other sub-array modules. In many embodiments, a sub-array module including a single camera is utilized. The interface circuitry can further allow coupled sub-array modules to transmit and receive data including image data and/or instructions from a processor with one another. The image data from one of the sub-array modules may be read out by a processor. The interface circuitry may employ any interface protocol including Mobile Industry Processor Interface Alliance (MIPI) Camera Serial Interface 2(c) interface format (the "MIPI interface format") or a Standard Mobile Imaging Architecture ("SMIA") format. The 1×3 modular array cameras may include constituent narrow spectral band green, blue, or red cameras and may also include near-IR cameras.

Using sub-array modules to construct array cameras can provide numerous advantages. First, the manufacture of sub-array modules can result in a greater yield as compared with the manufacturing yield of longer one-dimensional array camera modules since sub-array module components may more efficiently utilize wafer space. Additionally, their manufacture can also result in comparatively greater homogeneity between sub-array modules since sub-array modules are less intricate as compared with longer one-dimensional array camera modules or two-dimensional array camera modules. Moreover, sub-array modules are versatile insofar as they can be used to construct array cameras of any specified dimension.

One-dimensional array camera modules and sub-array modules in accordance with embodiments of the invention are discussed further below.

Array Camera Architecture

Array cameras in accordance with many embodiments of the invention can include an array camera module and a processor. The array camera module can include an array of cameras. An array camera module can include an imager array, which is a sensor that includes an array of focal planes. Each focal plane includes an array of pixels used to capture an image formed on the focal plane by a lens stack. The focal plane can be formed of, but is not limited to, traditional CIS (CMOS Image Sensor), CCD (charge-coupled device), quantum film image sensors, high dynamic range sensor elements, multispectral sensor elements and various alternatives thereof. In many embodiments, the pixels of each focal plane have similar physical properties and receive light through the same lens stack. Furthermore, the pixels in each focal plane may be associated with the same color filter. In a number of embodiments, at least one of the focal planes includes a Bayer-pattern filter. In several embodiments, the focal planes are independently controlled. In other embodiments, the operation of the focal planes in the imager array is controlled via a single set of controls. Array cameras are discussed in U.S. patent application Ser. No. 13/106,797 entitled "Architectures for imager arrays and array cameras" and U.S. patent application Ser. No. 12/952,106 entitled "Capturing and processing of images using monolithic camera array with heterogenous imagers" the disclosure of both applications is hereby incorporated by reference in its entirety.

An array camera architecture that can be used in a variety of array camera configurations in accordance with embodiments of the invention is illustrated in FIG. 1. The array camera 100 includes an array camera module 102 that is configured to transmit 106 image data to a receiving device 108 via an interface format involving the transmission of additional data describing the transmitted image data. The array camera module 102 includes an array of cameras 104. The cameras 104 in the array camera module 102 are formed from the combination of a lens stack and a focal plane. The array camera module 102 can include an optic array of lens stacks and an imager array of focal planes. These multiple cameras 104 may be active or inactive at any given time. The image data captured by these multiple cameras may be transmitted from the focal planes of each camera to a processor. The focal planes may have different imaging characteristics, such as varying exposure times, start times, and end times. Therefore, the timing of the transmission of the image data captured by each focal plane can vary. Accordingly, the imager array can transmit additional data describing the image data to enable a device receiving the image data to appropriately reconstruct images from the received image data. The transmission of array camera image data is disclosed in U.S. patent application Ser. No. 13/470,252, entitled "Systems and Methods for Transmitting and Receiving Array Camera Image Data," the disclosure of which is hereby incorporated by reference.

In many embodiments, the array camera 100 captures images using a plurality of cameras 104, which can have different imaging characteristics. The array camera 100 can separately control each of the cameras to obtain enhanced image capture and/or to enhance processes such as (but not limited to) super-resolution processes that may be applied to the captured images. For example, each pixel of a focal plane may capture different wavelengths of light, or may capture the intensity of light, varying exposure times, start times, or end times. Once the array camera 100 has commenced capturing image data using the pixels on the imager array, the focal planes can commence transmitting the image data captured using the pixels to a receiving device 108. The image data captured by different cameras can be interleaved for transmission to a receiving device 108 that includes interface circuitry configured to receive image data. In many embodiments, the interface circuitry is implemented in hardware and/or using a processor. The receiving device 108 can then organize the captured image data from the received packet and appropriately combine the image data to process and/or reconstruct the image(s) captured by one or more of the focal planes in the imager array.

In the illustrated embodiment, image data from multiple images of a scene can be captured by the array camera module 102. As the image data is captured, the array camera module 102 transmits 106 the image data to a receiving device 108. The array camera module 102 transmits the image data using a small number of local data storage cells on the array camera module 102 that store the captured image data following capture by the cameras. In the illustrated embodiment, the array camera module 102 manages the capture and transmission of image data so that the captured image data stored in the storage cells is transmitted by the imager array of the array camera module 102 in the time taken to capture and load the next set of image data into the storage cells. In this way, the array camera module can continuously buffer and transmit image data using a number of local data storage cells that is less than the total number of pixels in the array camera module.

In many embodiments, a line of image data transmitted by an imager array can be considered to equal the number of pixels in a row of a focal plane multiplied by the number of focal planes. In several embodiments, the clock frequency of transmitter circuitry on the imager array is set to a desired output data rate and the internal focal plane pixel rate is set to 1/N the desired output data rate (where N is the total number of focal planes). In many image transmission protocols, once a start of line condition is sent, all of image data is transmitted without interrupt until the end of line. Accordingly, a sufficient number of data storage cells and a buffering mechanism can be developed that starts transmission of pixels once there are sufficient pixels stored such that all of the pixels will have been captured and transmitted by the time the end of the line of image data is reached. If, for example, an imager array including 4 focal planes (as in a 1×4 array) transmits image data from all focal planes, then there is very little data storage utilized prior to the start of focal plane readout, because the data is transmitted at approximately the rate that at which it is being read. If, however, the same imager array only has one active imager, then almost all of the pixels from a row of the focal plane are stored since the buffer is being read 4 times as fast as it is being written. Therefore, the data storage requirement would be one row of pixels (i.e. ¼th of a line of image data). When three focal planes are active, 1/the data from the three focal planes is buffered before transmission commences to avoid underflow. Therefore, the total number of data storage cells utilized is equal to the number of pixels in three quarters of a row of one of the focal planes in this example. The above examples illustrate how the data storage requirements of an imager array can vary based upon the number of active focal planes. In many embodiments, the total number of storage cells within an imager array is less than a quarter of a line of image data. In several embodiments, the total number of storage cells within an imager array is equal to a line of image data. In several embodiments, the total number of data storage cells is between a quarter of a line of image data and a full line of image data. In a number of embodiments, the total number of storage cells is equal to or greater than a line of image data. When the array camera module transmits the captured image data, the incorporation of additional data describing the image data enables a peripheral device receiving the image data to reconstruct the images captured by each active camera in the imager array 102.

Imager arrays in accordance with many embodiments of the invention are configured to output image data via an interface format that accommodates the transfer of image data captured via multiple focal planes. In several embodiments, the imager array is configured to transmit captured image data in accordance with an interface format that is compatible with standard interface formats, such as (but not limited to) the MIPI CSI-2 interface format (MIPI interface format), the Camera Link interface format, and any of the Universal Serial Bus (USB) interface formats or FireWire interface formats. When image data captured from multiple focal planes is output by the imager array, the device receiving the image data is faced with the task of assembling the image data into a plurality of images of a scene.

Although specific array camera system architectures are discussed above for constructing array cameras including 1×N arrays of cameras, any of a variety of system architectures for array cameras including 1×N arrays of cameras can be utilized as appropriate to the requirements of a specific application in accordance with embodiments of the invention. Imager array architectures are discussed below in greater detail.

Imager Array Architectures

Figure 2:
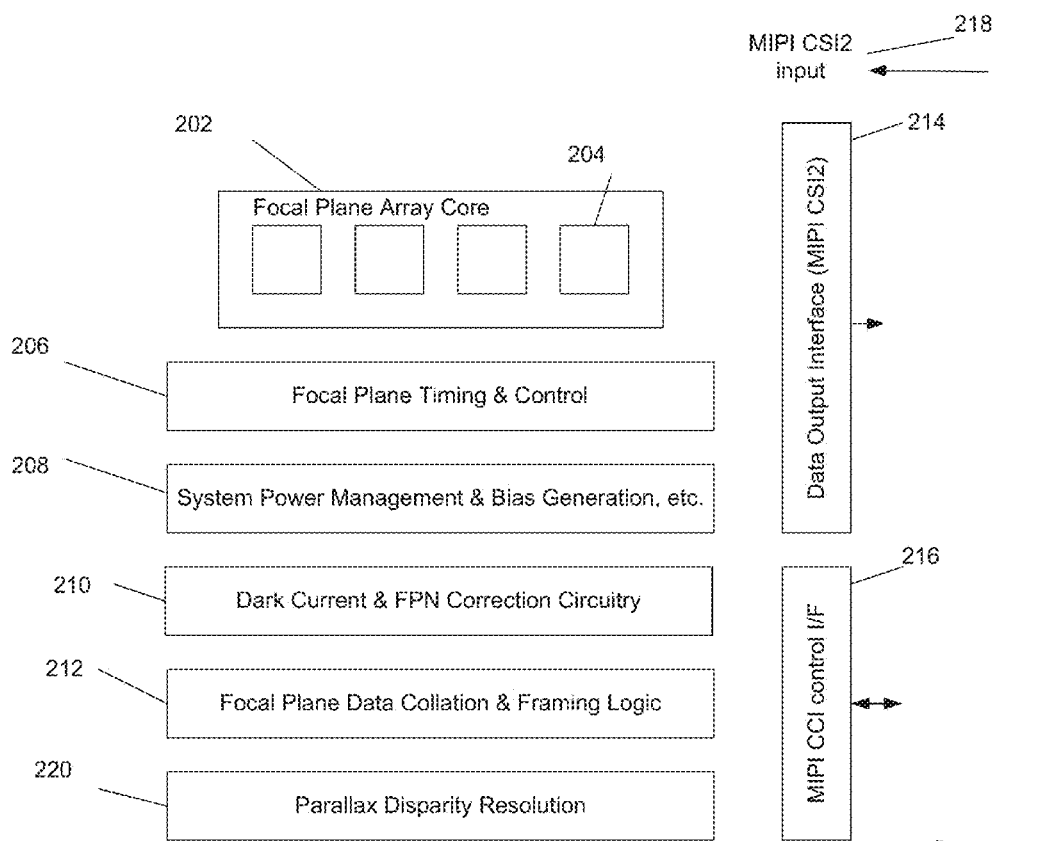
FIG. 2 conceptually illustrates an imager array architecture in accordance with an embodiment of the invention.

An imager array in accordance with an embodiment of the invention is illustrated in FIG. 2. The imager array 200 includes a focal plane array core 202 that includes a 1×N array of focal planes 204 and all analog signal processing, pixel level control logic, signaling, and analog-to-digital conversion circuitry. The imager array also includes focal plane timing and control circuitry 206 that is responsible for controlling the capture of image information using the pixels. For example, in some embodiments, the focal plane timing and control circuitry 206 can synchronize the capture of image data by the focal planes such that active focal planes capture image data from a scene simultaneously. In many embodiments, the focal plane timing and control circuitry 206 causes the active focal planes to capture image data from a scene in a particular controlled sequence. In a number of embodiments, the focal plane timing and control circuitry 206 utilizes reset and read-out signals to control the integration time of the pixels. In several embodiments, any of a variety of techniques can be utilized to control integration time of pixels and/or to capture image information using pixels. In many embodiments, the focal plane timing and control circuitry 206 provides flexibility of image information capture control, which enables features including (but not limited to) high dynamic range imaging, high speed video, and electronic image stabilization. In various embodiments, the imager array 200 includes power management and bias generation circuitry 208. The power management and bias generation circuitry 208 provides current and voltage references to analog circuitry such as the reference voltages against which an ADC would measure the signal to be converted against. In many embodiments, the power management and bias circuitry also includes logic that turns off the current/voltage references to certain circuits when they are not in use for power saving reasons. In several embodiments, the imager array includes dark current and fixed pattern (FPN) correction circuitry 210 that increases the consistency of the black level of the image data captured by the imager array and can reduce the appearance of row temporal noise and column fixed pattern noise. In several embodiments, each focal plane includes reference pixels for the purpose of calibrating the dark current and FPN of the focal plane and the control circuitry can keep the reference pixels active when the rest of the pixels of the focal plane are powered down in order to increase the speed with which the imager array can be powered up by reducing the need for calibration of dark current and FPN. In many embodiments, the SOC imager includes focal plane framing circuitry 212 that packages the data captured from the focal planes into a container file and can prepare the captured image data for transmission. In several embodiments, the focal plane framing circuitry 212 includes information identifying the focal plane and/or group of pixels from which the captured image data originated. In a number of embodiments, the imager array 200 also includes an interface for transmission of captured image data to external devices. In the illustrated embodiment, the interface is a MIPI CSI 2 output interface supporting four lanes that can support read-out of video at 30 fps from the imager array and incorporating data output interface circuitry 214, interface control circuitry 216 and interface input circuitry 218. Typically, the bandwidth of each lane is optimized for the total number of pixels in the imager array and the desired frame rate. The use of various interfaces including the MIPI CSI 2 interface to transmit image data captured by an array of imagers within an imager array to an external device in accordance with embodiments of the invention is described in in U.S. patent application Ser. No. 13/470,252, cited to and incorporated by reference above.

An imager array in accordance with embodiments of the invention can include a single controller that can separately sequence and control each focal plane. Having a common controller and I/O circuitry can provide important system advantages including lowering the cost of the system due to the use of less silicon area, decreasing power consumption due to resource sharing and reduced system interconnects, simpler system integration due to the host system only communicating with a single controller rather than M×N controllers and read-out I/O paths, simpler array synchronization due to the use of a common controller, and improved system reliability due to the reduction in the number of interconnects.

Additionally, an imager array in accordance with embodiments of the invention may include a parallax disparity resolution module 220 that can determine disparity between pixels in different images captured by the camera array using parallax detection processes similar to those described in U.S. Provisional Patent Application Ser. No. 61/691,666 entitled "Systems and Methods for Parallax Detection and Correction in Images Captured Using Array Cameras" to Venkataraman et al., the disclosure of which is incorporated by reference herein in its entirety. In particular, as will be elaborated on below in the section on "One-Dimensional Array Camera Modules", in some embodiments, the processing requirements for a parallax disparity resolution calculation may be sufficiently low that the process may be computed by the imager array circuitry.

Although specific components of an imager array architecture are discussed above with respect to FIG. 2, any of a variety of imager arrays can be constructed in accordance with embodiments of the invention that enable the capture of images of a scene at a plurality of focal planes in accordance with embodiments of the invention. Array camera modules that utilize imager arrays are discussed below.

Array Camera Modules

Array camera modules in accordance with many embodiments of the invention include the combination of an optic array including a 1×N array of lens stacks and an imager array that includes a 1×N array of focal planes. Each lens stack in the optic array defines a separate optical channel. The optic array may be mounted to an imager array that includes a focal plane for each of the optical channels, where each focal plane includes an array of pixels or sensor elements configured to capture an image. When the optic array and the imager array are combined with sufficient precision, the array camera module can be utilized to capture image data from multiple images of a scene that can be read out to a processor for further processing, e.g. to synthesize a high resolution image using super-resolution processing. For example, each of the cameras in an array camera module can capture image data of a scene reflecting a sub-pixel shifted view of the scene—i.e. relative to the corresponding image formed by at least one other camera (e.g. the lens stack of each camera can have a field-of-view that is shifted with respect to the field-of-view of each other camera so that each shift includes a sub-pixel shifted view of the scene); hence, the aggregated image data can embody sufficient sampling diversity to enable the implementation of super-resolution processes that can be used construct an enhanced image of the scene using the aggregated image data. In other words, each lens stack can form an image of a scene onto a corresponding focal plane, and thereby generate image data, from a slightly different viewpoint relative to an image formed by each of the other lens stacks, such that the images formed of the scene by each of the lens stacks contain non-redundant information of about the scene. Hence, the non-redundant information can be used in the construction of a super-resolved image.

In many embodiments, the optics in an array camera module are designed to be able to resolve images to a sufficient extent such that the super-resolution processes can be implemented. For example, in many instances, the MTF of the optics is able to resolve variation in intensity at the spatial resolution of the image that is to result from implemented super-resolution processes (e.g. as opposed to the spatial resolution of the image that can be formed by a single respective camera within an array camera module).

It should be noted that although 'arrays of lens stacks' and 'arrays of focal planes' are referenced, it is not meant to be suggested that such arrays are necessarily monolithic structures. In many instances a plurality of distinct lens stacks are disposed relative to one-another to form a 1×N array of lens stacks; similarly, in many instances a plurality of distinct focal planes are disposed relative to one-another to form a 1×N array of focal planes. In general, a plurality of lens stacks, and a plurality of focal planes can be adjoined in any suitable way to construct a 1×N array camera module in accordance with embodiments of the invention. In some instances, the focal planes and/or lens stacks are embodied within monolithic structures.

Figure 3:
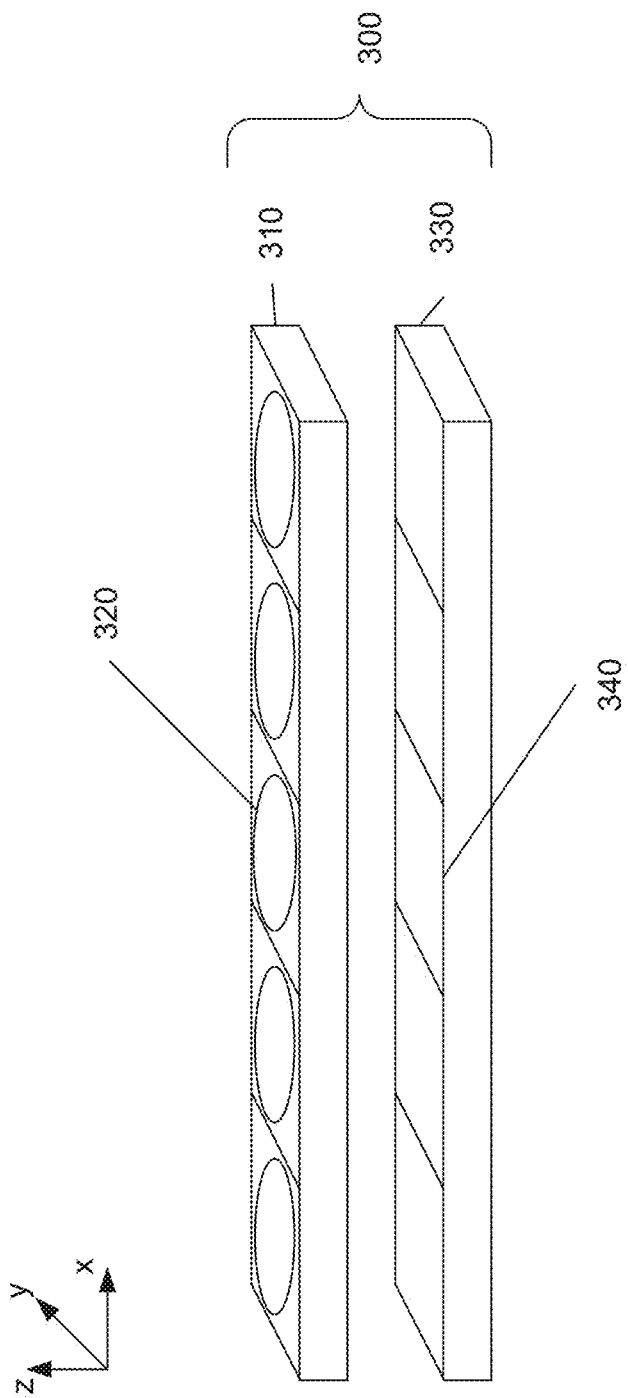
FIG. 3 conceptually illustrates the construction of an array camera module in accordance with an embodiment of the invention.

An exploded view of an array camera module formed by combining a lens stack array with a monolithic sensor including an array of focal planes in accordance with an embodiment of the invention is illustrated in FIG. 3. The array camera module 300 includes an optic array 310 including 1×N distinct lens stacks forming N separate apertures and an imager array 330 that includes a 1×N array of focal planes 340. Each lens stack 320 in the optic array 310 creates an optical channel that resolves an image on one of the focal planes 340 on the imager array 330. Each of the lens stacks 320 may be of a different type. In several embodiments, the optical channels are used to capture images of different portions of the wavelength of light spectrum (e.g. using color filters, located either within the lens stack or on the sensor) and the lens stack in each optical channel is specifically optimized for the portion of the spectrum imaged by the focal plane associated with the optical channel.

In many embodiments, the array camera module 300 includes lens stacks 320 having one or multiple separate optical lens elements axially arranged with respect to each other. Optic arrays of lens stacks 310 in accordance with several embodiments of the invention include one or more adaptive optical elements that can enable the independent adjustment of the focal length of each lens stack and/or later shifting of the centration of the refractive power distribution of the adaptive optical element. The use of adaptive optical elements is described in U.S. patent application Ser. No. 13/650,039, entitled "Lens Stack Arrays Including Adaptive Optical Elements", filed Oct. 11, 2012, the disclosure of which is incorporated by reference herein in its entirety.

In several embodiments, the array camera module employs wafer level optics (WLO) technology. WLO is a technology that encompasses a number of processes, including, for example, molding of lens arrays on glass wafers, stacking of those wafers (including wafers having lenses replicated on either side of the substrate) with appropriate spacers, followed by packaging of the optics directly with the imager into a monolithic integrated module. The WLO procedure may involve, among other procedures, using a diamond-turned mold to create each plastic lens element on a glass substrate. More specifically, the process chain in WLO generally includes producing a diamond turned lens master (both on an individual and array level), then producing a negative mold for replication of that master (also called a stamp or tool), and then finally forming a polymer replica on a glass substrate, which has been structured with appropriate supporting optical elements, such as, for example, apertures (transparent openings in light blocking material layers), and filters. Although the construction of lens stack arrays using WLO is discussed above, any of a variety of techniques can be used to construct lens stack arrays, for instance those involving precision glass molding, polymer injection molding or wafer level polymer monolithic lens processes.

Although certain array camera module configurations have been discussed above, any of a variety of array camera modules that utilize lens stacks and focal planes may be implemented in accordance with embodiments of the invention. One-dimensional array camera modules are discussed below.

One-Dimensional Array Camera Modules

In many embodiments, one-dimensional (or 1×N) array camera modules are utilized in the construction of array cameras. One-dimensional array camera modules can provide a number of benefits. For instance, one-dimensional array camera modules can enable the construction of array cameras having distinctly thin form factors. Such array cameras may be useful in a host of applications. For example, array cameras having a thin form factor may be incorporated within the bezel of a consumer electronics device such as a laptop, a tablet, or a smart phone, and may further be incorporated within a pair of eye glasses.

Additionally, array cameras that incorporate one-dimensional array camera modules are advantageous insofar as they may require less processing and/or memory requirements as compared to two-dimensional (or M×N) array cameras. For example, array cameras typically employ a parallax detection and correction process in order to facilitate the imaging of a scene. Generally, the process is meant to address the fact that the relative positioning of objects in a scene may appear to vary from the respective viewpoints of different cameras within an array camera module. In two-dimensional array cameras, this technique can be processor intensive and involve significant data storage requirements related to searches for corresponding pixels along epipolar lines (other than just horizontal or vertical) between cameras located in different rows and/or columns within the array camera module. Array camera modules typically pass image data to a processor by starting with image data captured by pixels in a first row of a focal plane and then advancing to the next row of pixels and reading out image data from pixels within the next row of pixels. The read out of image data from pixels within a focal plane can also be interspersed with the readout of image data from pixels within other focal planes. Note that with this technique, because image data is being passed to the processor along the rows of the focal planes, searches for corresponding pixels along vertical or diagonal epipolar lines, for example during a parallax detection and correction process of a two-dimensional array camera, involve the processor storing substantial amounts of image data across multiple rows of image data captured by a focal plane. In other words, whereas a parallax detection and correction process may be employed along the 'row' direction as soon as the image data from a respective row of focal planes has been read out to a processor, the parallax detection and correction process along the column direction cannot be employed until multiple rows of image data has been read out to the processor. Consequently, image data across multiple rows of pixels must be stored in order to complete parallax detection and correction processes. This may result in larger storage requirements that may be prohibitive of a system-on-a-chip (SOC) type solution, e.g. where the parallax disparity resolution is built into the imager array. However, because one-dimensional array cameras do not necessarily employ parallax correction and detection processes in two directions, the processing and/or memory requirements can be substantially reduced. Thus, with lesser processing and/or memory requirements, system-on-a-chip (SOC) type solutions may be enabled.

Additionally, one-dimensional array camera modules may provide greater manufacturing yield as compared with two dimensional array camera modules, because one-dimensional array camera modules may have less cameras. Generally, the more cameras an array camera module has, the more difficult it is to directly manufacture because it is more likely to have faulty sensors and/or faulty lens stacks.

A 1×5 array camera module in accordance with embodiments of the invention is illustrated in FIG. 4A. In particular, the array camera module includes a central narrow spectral band green camera (G), adjacent narrow spectral band blue cameras (B), and periphery narrow spectral band red cameras (R). Color filters may be employed to achieve the respective narrow spectral band cameras. The color filters may be located either within the lens stack or on the sensor. A narrow spectral band green camera may be centrally placed to accommodate the fact that humans are most sensitive to green light. Narrow spectral band red and blue cameras may be placed on either side of the central narrow spectral band green camera—this configuration may counteract any occlusion that may occur as a result of any obstructing foreground objects. For example, in the case of an obstructing foreground object, areas of the scene immediately surrounding the foreground object as seen by the central camera may not be seen by the cameras on one of the two sides of the central green camera. However, if both narrow spectral band red and blue cameras are placed on either side of the central green camera, color imaging data can be obtained from the scene irrespective of such obstruction caused by the foreground object, and uniform spectral coverage is thereby provided. FIG. 4B is similar to FIG. 4A except that the narrow spectral band red cameras are adjacent to a central narrow spectral band green camera, and narrow spectral band blue cameras enclose the configuration. Note that although two particular configurations of 1×5 array camera modules are illustrated, any number of configurations may be employed all in accordance with embodiments of the invention. For example, in some embodiments near-IR cameras (N), which facilitate the imaging of scenes with low-lighting, may be employed, and in a number of embodiments, full visual spectrum cameras (P) are employed. Note that where full visual spectrum cameras are employed, Bayer filters, which are typically implemented on the sensor, may be utilized to obtain color information.

Figures 5A, 5B, 5C:
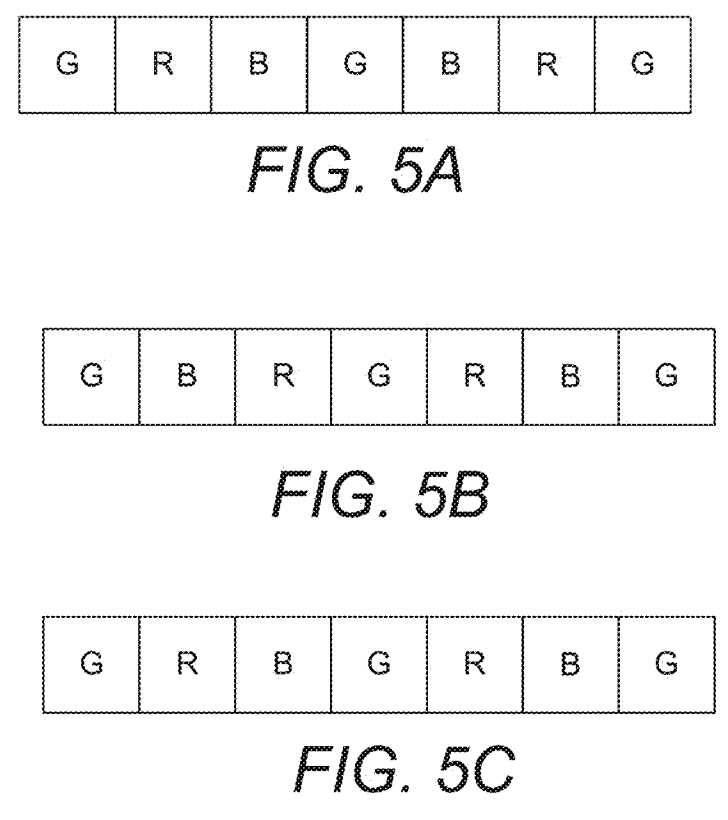

By increasing the number of a particular type of narrow spectral band camera (e.g. Green), super-resolution processes can be employed to greater effect. A 1×7 array camera module in accordance with embodiments of the invention is illustrated in FIGS. 5A-5C. As illustrated, a 1×7 array camera module may employ more narrow spectral band green cameras than narrow spectral band blue or narrow spectral band red cameras. This may be to accommodate the fact that humans are most sensitive to green light. In the illustrated embodiments, the array camera module includes a central narrow spectral band green camera and periphery narrow spectral band green cameras, and narrow spectral band red and blue cameras. The cameras may be symmetrically distributed or they may be asymmetrically distributed. In the embodiments illustrated in FIGS. 5A and 5B, the narrow spectral band cameras are symmetrically distributed. In the embodiment illustrated in FIG. 5C, the narrow spectral band cameras are asymmetrically distributed. The inclusion of multiple red and blue cameras uniformly distributed around the central green camera reduces the likelihood of color artifacts related to occlusions by foreground objects. The presence of multiple green cameras in an array having sub-pixel shifted views of the scene to provide sampling diversity enables the application of super-resolution processes to the captured image data to recover a higher resolution image of the scene. As before, although three particular configurations of 1×7 array camera modules are illustrated, any number of configurations may be employed all in accordance with embodiments of the invention. For example, in some embodiments near-IR cameras may be employed, and in a number of embodiments, full visual spectrum cameras are employed. As before, where full visual spectrum cameras are employed, Bayer filters may be utilized to obtain color information.

A 1×9 array camera module in accordance with embodiments of the invention is illustrated in FIGS. 6A-6F. A 1×9 array camera module may be more preferable than either a 1×7 array camera module or a 1×5 array camera module since it provides more image data. As before, a 1×9 array camera module may employ more narrow spectral band green cameras than narrow spectral band blue or narrow spectral band red cameras. The inclusion of multiple red and blue cameras distributed around the central green camera reduces the likelihood of color artifacts related to occlusions by foreground objects. The presence of multiple green cameras in an array having sub-pixel shifted views of the scene to provide sampling diversity enables the application of super-resolution processes to the captured image data to recover a higher resolution image of the scene. Also as before, although six particular configurations of 1×9 array camera modules are illustrated, any number of configurations may be employed all in accordance with embodiments of the invention. For example, in some embodiments, narrow spectral band green cameras are not disposed along the periphery of the array camera module.

Although particular one-dimensional array camera modules have been discussed, an array camera module with any number of cameras may be implemented in accordance with embodiments of the invention. For instance, 1×4 array camera modules and 1×5 array camera modules may be implemented. Sub-array modules that may be used to construct one-dimensional array camera modules are discussed below.

Sub-Array Modules

Much of the discussion above describes the construction of array cameras using a single monolithic array camera module. In many embodiments, sub-array modules are used in the construction of array cameras. Sub-array modules may be configured to interface with other sub-array modules so that data can pass between the sub-array modules, thereby enabling a processor to interact with multiple coupled sub-array modules via an interface with one of the sub-array modules. In this way, sub-array modules can couple with other sub-array modules to enable the fabrication of array cameras of any number of specified dimensions and characteristics. In many embodiments, sub-array modules do not couple with one-another, but instead interact directly or indirectly (e.g. via a bus) with a receiving device (e.g. a processor). Accordingly, sub-array modules of this variety can also enable the modular construction of an array camera of any number of specified dimensions and characteristics.

The use of sub-array modules in the construction of array cameras can provide a number of benefits. For example, the use of sub-array modules to construct array cameras can improve manufacturing yield relative to the direct fabrication of an array camera module. In particular, although one-dimensional array camera modules may be beneficial in numerous applications, their manufacture can be challenging. Specifically, components for one-dimensional array cameras (e.g. the lenses and the corresponding sensor) are typically manufactured on wafers, but the elongated nature of the components may not be conducive to optimizing wafer space. In many instances, in the manufacture of a one-dimensional lens array, the periphery of the wafer used in the manufacture may contain significant unused space that, because of the elongated shape of a lens array, cannot accommodate further lens arrays. In other words, wafers are may be more efficient in the manufacture of components that are more 'square' in shape than 'elongated.' However, sub-array modules that are used in the construction of an array camera module may be less elongated than the array camera module. Hence, sub-array modules can better optimize wafer space during manufacture.

Moreover, the manufacture of sub-array modules is also beneficial since they comprise a relatively fewer number of cameras compared to an array camera module: the more cameras an array camera module has, the more difficult it is to directly manufacture since it is more likely to have a critical number of faulty cameras. Furthermore, the manufacturing processes disclosed in prior U.S. patent application Ser. No. 13/050,429 disclosure entitled "Fabrication process for mastering imaging lens arrays" can be more beneficially applied if the array to be generated is smaller like those discussed in this application. The 1×N master structure, for the sub-array, can be more optimally fine-tuned for homogeneity either by multiple attempts to directly diamond-turn the 1×N arrays of the template or by multiple attempts to step-and-repeat the 1×N array of the template from single lens pins before using the final small-variation 1×N template to fully populate, for example, a 8" wafer scale master. As a result, the array-internal performance variation and in particular BFL-variation can be reduced. Resulting variations from array to array on the full wafer scale master can be compensated by the approach presented under the method described above.

Moreover, array camera modules constructed from sub-array modules may be further advantageous in that each individual sub-array module may incorporate custom spacers to counteract back focal length variation. U.S. Patent Application Ser. No. 61/666,852 entitled "Systems and Methods for Manufacturing Camera Modules Using Active Alignment of Lens Stack Arrays and Sensors" discusses the issues related to back focal length (BFL) misalignment in the construction of array camera modules, and is hereby incorporated by reference. In many embodiments, the distribution of the average BFL for a 1×N sub-array module fabricated in a wafer stack is determined over a sufficient number of stacks to establish the repeatable array-average BFL variation. A spacer wafer may then be machined with steps in thickness that correspond to the pattern of the average-BFL over the wafer stack, and the spacers may thereafter be incorporated into the sub array module. The standard deviation of the BFL of sub-array modules within a wafer stack is expected to be small given the relatively small number of cameras in a sub-array module; accordingly, the incorporation of the customized spacers into the sub-array modules is expected to result in sufficient focusing.

Figure 7A:
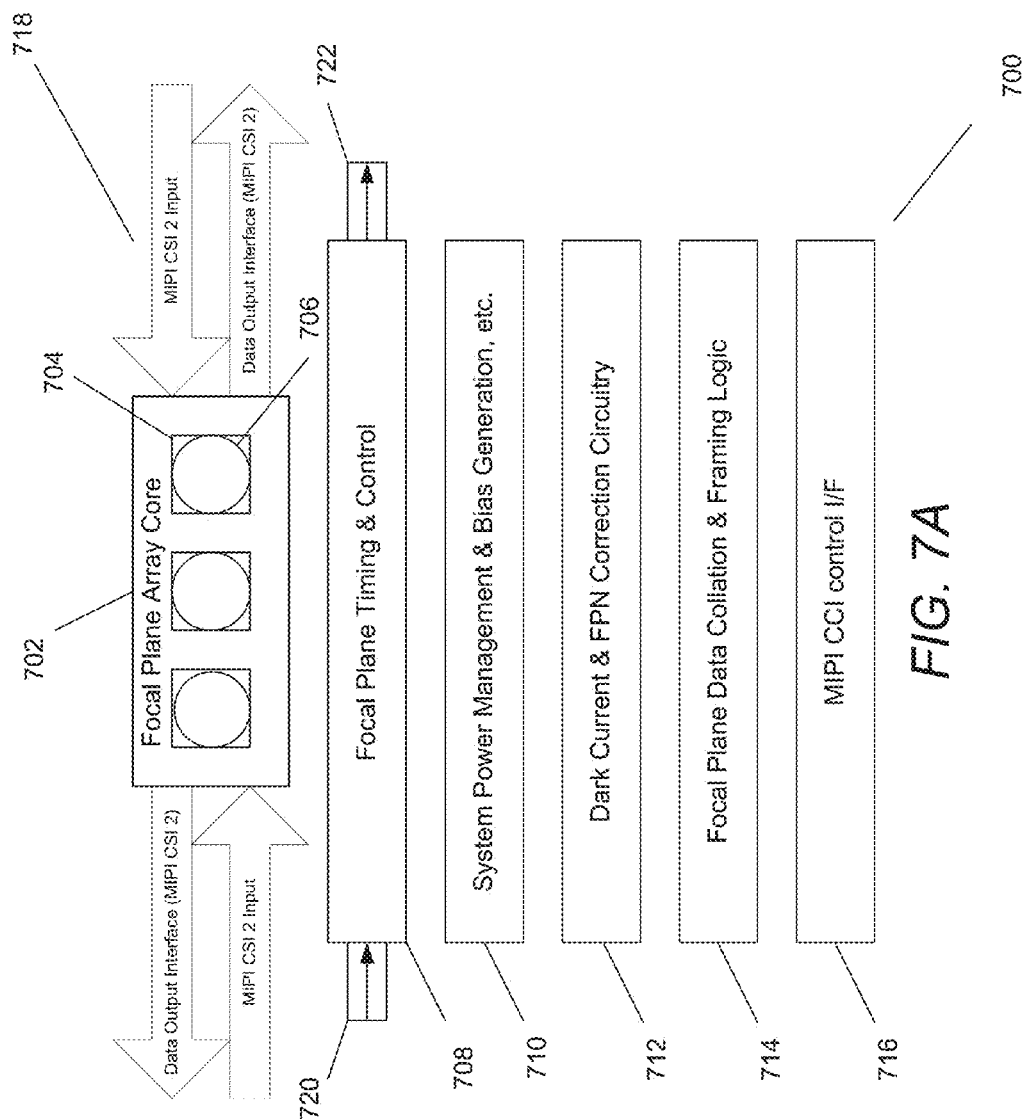
FIG. 7A illustrates a 1×3 sub-array module in accordance with an embodiment of the invention.

A sub-array module architecture in accordance with embodiments of the invention is illustrated in FIG. 7A. The sub-array module 700 includes a focal plane array core 702 that includes a 1×3 array of focal planes 704 and all analog signal processing, pixel level control logic, signaling, and analog-to-digital conversion circuitry. Although a 1×3 array of focal planes is illustrated, any number of focal planes can be used in accordance with embodiments of the invention. The sub-array module includes lens stacks 706, and the combination of a lens stack 706 and its corresponding focal plane 704 can be configured to implement any type of camera including but not limited to narrow spectral band red cameras, narrow spectral band blue cameras, narrow spectral band green cameras, near-IR cameras, and full visual spectrum cameras. Bayer-filters may be employed to facilitate imaging. The sub-array module may utilize focal plane timing and control circuitry 708 that is responsible for controlling the capture of image information using the focal plane's constituent pixels. In a number of embodiments, the focal plane timing and control circuitry 708 provides flexibility of image information capture control which enables features including, but not limited to, high dynamic range imaging, high speed video, and electronic imaging stabilization. The focal plane timing and control circuitry can have inputs 720 and outputs 722 related to the timing of image capture, so that the sub-array module timing can be controlled by an external device (e.g. a processor, or alternatively another sub-array module). In various embodiments, the sub-array module 700 includes power management and bias generation circuitry 710. The power management and bias generation circuitry 710 provides current and voltage references to analog circuitry such as the reference voltages against which an ADC would measure the signal to be converted against. In many embodiments, the power management and bias circuitry 710 also includes logic that turns off the current/voltage references to certain circuits when they are not in use for power saving reasons. In several embodiments, the imager array includes dark current and fixed pattern (FPN) correction circuitry 712 that increases the consistency of the black level of the image data captured by the imager array and can reduce the appearance of row temporal noise and column fixed pattern noise. In several embodiments, each focal plane includes reference pixels for the purpose of calibrating the dark current and FPN of the focal plane and the control circuitry can keep the reference pixels active when the rest of the pixels of the focal plane are powered down in order to increase the speed with which the imager array can be powered up by reducing the need for calibration of dark current and FPN. In many embodiments, the sub-array module includes focal plane framing circuitry 714 that packages the data captured from the focal planes into a container file and can prepare the captured image data for transmission. In several embodiments, the focal plane framing circuitry 714 includes information identifying the focal plane and/or group of pixels from which the captured image data originated. In a number of embodiments, the sub-array module 700 also includes an interface for transmission and reception of data to and from external device(s). For example, the interface can allow for the transmission and reception of image data. In the illustrated embodiment, the interface is a MIPI CSI 2 output interface supporting four lanes that can support read-out of video at 30 fps from the imager array and incorporating interface control circuitry 716, and two sets of data input/output interface circuitry 718. In the illustrated embodiment, each set of interface circuitry is capable of both sending and receiving data. The interface circuitry, the interface control circuitry, and the focal plane timing and control inputs/outputs can allow the sub-array module to be controlled by a processor (either directly or indirectly), and/or can also allow the sub-array module to receive/transmit captured image data. Typically, the bandwidth of each input/output lane is optimized for the total number of pixels in the imager array and the desired frame rate. The input/output interface circuitry is configured to interface with any receiving device such as another sub-array module or a processor. Note that although the illustrated embodiment depicts a MIPI CSI 2 protocol, any interface protocol may be used including a Standard Mobile Imaging Architecture ("SMIA") format. The use of various interfaces including the MIPI CSI 2 interface to transmit image data captured by an array of imagers within an imager array to an external device in accordance with embodiments of the invention is described in in U.S. patent application Ser. No. 13/470,252, cited to and incorporated by reference above. The sub-array module may also include pins that can be used to establish a unique slave address for the sub-array module in the case where the sub-array module interfaces with a master device (e.g. a processor, or a master sub-array module) via a bus as discussed below. In this way, each slave device can be independently controlled by the master device.

Figure 7B:
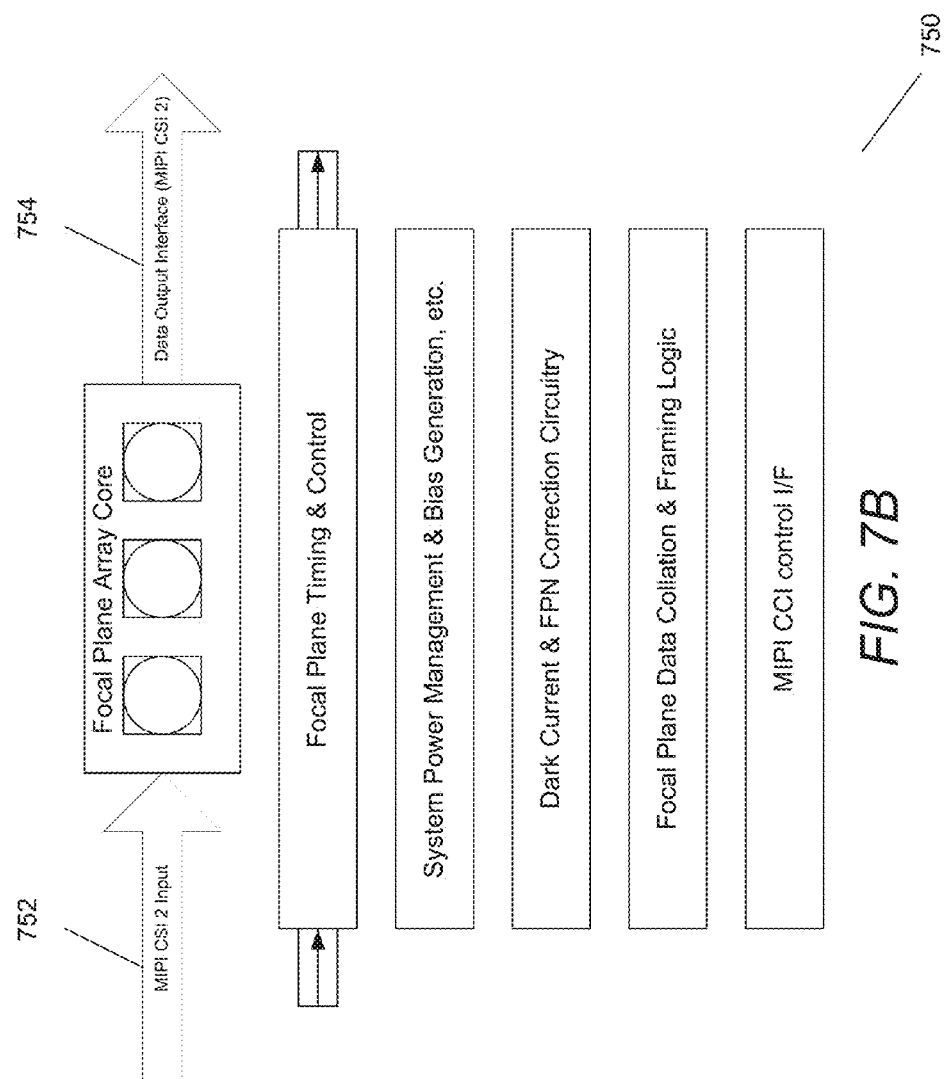
FIG. 7B illustrates another 1×3 sub-array module in accordance with another embodiment of the invention

A sub-array module in accordance with several embodiments of the invention is illustrated in FIG. 7B. The sub-array module 750 is similar to that seen in FIG. 7A, except that it does not include two sets of interface circuitry that allow both the transmission and reception of data; instead the illustrated embodiment depicts a sub-array module that includes receive interface circuitry 752 configured to receive image data from another sub-array module for forwarding, and transmit interface circuitry 754 configured to transmit forwarded image data and image data captured by the sub-array module. Such a design may be more efficiently manufactured.

As alluded to above, in many embodiments, sub-array modules are implemented that are not required to couple with other sub-array modules; instead they each interface—either directly or indirectly—with a receiving device, such as a processor, and thereby provide image data. As can be appreciated, any suitable way for transmitting the data can be implemented. For example, image data can be transmitted in parallel, or it can be transmitted in a serial fashion. In many embodiments, sub-array modules are configured to output image data to a bus; subsequently, the image data carried by the bus (e.g. from each of many sub-array modules) can be processed into a single MIPI output that can be more easily handled by a receiving device. The image data can be transmitted to the bus in a parallel fashion, or as serial data, e.g. via low voltage differential signaling. Additionally, any suitable I/O device may be used to relay image data to a receiving device, not just a conventional bus. In this way, sub-array modules can be implemented that do not have to have, for example, distinct MIPI processing circuitry; instead, the processing of image data from many sub-array modules into a single MIPI output can be accomplished separately and more efficiently. Accordingly, the manufacture of sub-array modules can become less intricate, and their manufacturing yield may increase as a result.

Further, with this modular construction, I/O devices can be easily swapped if desired. Although a particular architecture is described above, any suitable architecture can be implemented in accordance with embodiments of the invention.

Although particular sub-array modules have been illustrated and discussed, any of a variety of sub-array modules that can allow for transmission and reception of data may be implemented in accordance with embodiments of the invention. For example, 1×4, 1×2, and even 1×1 sub-array modules may be implemented. Furthermore, 2-dimensional sub-array modules may also be implemented in accordance with embodiments of the invention; for example 2×3, 2×2, and 3×3 sub-array modules may be implemented. Two-dimensional sub-array modules may be used to construct two-dimensional array camera modules. Sub-array module lens configurations and the construction of one-dimensional array camera modules using sub-array modules are discussed below.

Sub-Array Module Configurations and the Construction of One-Dimensional Array Modules Sub-array modules may include cameras arranged in a variety of configurations in accordance with embodiments of the invention. The exact configurations employed in sub-array modules depend on the particular design of the array camera to be formed. For example, in the case where a GNRBGBRNG 1×9 array camera is desired (like the one illustrated in FIG. 6E), three 1×3 sub-array modules may be used to form the corresponding array camera module having the following respective camera arrangement configurations: GNR, BGB, and RNG. FIGS. 8A-8K depict ten examples of sub-array module configurations that are similar to those shown in FIG. 7B in accordance with embodiments of the invention. Although ten examples are provided in FIGS. 8A-8K, any number of configurations of sub-array modules using any of a variety of color filter patterns may be implemented in accordance with embodiments of the invention. The sub-array modules 800 are illustrated as having corresponding interface circuitry 802, represented by arrows. The direction of the arrows is meant to indicate the direction in which image data is passed when the interface circuitry is operational.

The direction in which image data is passed in a sub-array module is configurable in accordance with many embodiments of the invention. For instance, a BGR sub-array module may be reconfigured so that it acts as a RGB sub-array module. FIG. 9 illustrates how a BGR sub-array module may be reconfigured to act as a RGB sub-array module. In particular, the BGR sub-array module 900 may be rotated 180° 902, and its corresponding interface circuitry may be reconfigured 904 such that the transmission/reception protocols in the interface circuitry are reversed. Where sub-array modules are rotated 180° the data read from the sub-array module can include a flag and/or additional data indicating the orientation of the sub-array module to enable a processor to map the relative position of pixel addresses to corresponding locations in other cameras in an array camera. Alternatively, in the case where a BGR sub-array module is mounted on a printed circuit board (PCB), the BGR sub-array module may be rotated 180° and positioned on a PCB (or laminated chip carrier or other similar such interconnector), and the configuration of the PCB (or laminated chip carrier or other similar such interconnector) may invert the routing of the data transmitted to/from the sub-array module, such that the sub-array module acts as a RGB sub-array module. Of course, the above description does not apply only to 1×3 BGR sub-array modules; the direction in which data is passed in any sub-array module may be reconfigured in accordance with embodiments of the invention.

Sub-array modules may be coupled to form an array camera module in accordance with embodiments of the invention. In particular, sub-array modules may be coupled via their respective interface circuitry such that data may be passed from one sub-array module to the coupled sub-array module. FIGS. 10A-10C illustrate the construction of three respective 1×9 array camera modules using three 1×3 sub-array modules. For example, FIG. 10A illustrates a GNRB-GBRNG array camera module 1000 made from a GNR sub-array module 1002, a BGB sub-array module 1004, and a RNG sub-array module 1006. Note that data received by one sub-array module can of course be transmitted to another sub-array module. As data is transmitted, a respective sub-array module can include within the transmission information regarding the type of data and its origination and/or the orientation of the sub-array module within the array (i.e. standard or inverted/rotated). For example, where the BGB sub-array module 1004 transmits data to the RNG sub-array module 1006, the BGB can also transmit information regarding what type of data is being transmitted—e.g. image data—and where it originated from—e.g. which pixel of which focal plane of which sub-array module (e.g., the GNR sub-array module or the BGB sub-array module itself). Generally, any type of information can be transmitted between sub-array modules that facilitates their coupling. The RNG sub-array module 1006 can read out the data to an external device. For example, the GNR sub-array module 1002 can transmit image data to the BGB sub-array module 1004, which can then transmit image data (including the image data received from the GNR sub-array module) to the RNG sub-array module 1006; the RNG sub-array module 1006 may then read out image data (including the image data received from the BGB sub-array module, which itself includes image data received from the GNR sub-array module) to an external device. Additionally, the manner in which the sub-array modules interface with each other and with a receiving device may be different. For example, the manner in which the RNG sub-array module 1006 interfaces with a receiving device may be in accordance with the MIPI interface format, whereas the manner in which the GNR sub-array module 1002, the BGB sub-array module 1004, and the RNG sub-array module 1006 interface with one another in a different manner, e.g., via simple analog voltages or serial interfaces.

The array camera module 1000 can couple with a receiving device, e.g. a processor, such that the receiving device can synchronize the capture of images from each of the sub-array modules. In some embodiments, each of the sub-array modules has inputs and outputs that can be used to control the respective sub-array module's internal timing engine, and that can allow a processor to synchronize the capture of images. A processor can thus provide a driving signal to each of the sub-array modules that synchronizes the capture of images of the focal planes in the sub-array modules. For example, the processor can provide the signal via a bus-type architecture, where the processor is set as a master, and each of the sub-arrays is set as a slave. The processor can also provide the driving signal to a directly coupled sub-array module, and the sub-array module can then relay the driving signal to an adjacent sub-array module, and this relaying process can continue until each sub-array module is provided with a driving signal. Thus, as each of the sub-array modules is provided with the driving signal, the capture of images by the focal planes in the sub-array module can be synchronized. In many embodiments, the processor does not provide a driving signal to each sub-array module; instead, the processor provides a driving signal to a master sub-array module. The master sub-array module can then controls the slave sub-array modules so that the capture of images from the cameras of the sub-array modules is synchronized.

The driving signal can constitute a 'horizontal sync pulse' and a 'vertical sync pulse' to help facilitate the precise capture of image data. For example, when the focal planes capture image data, the image data may be captured by the pixels of the focal plane by advancing along the rows of pixels of the focal plane—i.e. image data is captured by a first row of pixels in a particular direction (e.g. left-to-right), then image data is captured by a next row of pixels, etc. Thus, a constituent horizontal sync pulse within a driving signal can synchronize the sampling and readout of a particular row of pixels within a focal plane (whichever row the vertical timing controller is pointing to at that time). The vertical sync pulse indicates to a vertical timing controller associated with a focal plane that the vertical timing controller should start at the beginning of the frame (i.e. row zero). In the case where the sub-array modules are being used to capture video, the vertical sync pulse can synchronize the capture of individual frames from each sub-array module within the video. In many embodiments, one of the sub-arrays is configured as a master that outputs the horizontal and vertical sync pulses to the other sub-arrays in the array cameras, which are designated as slaves synchronized to the control signals issued by the master sub-array. Although, a particular form of driving signal has been described, any driving signal can be used to synchronize the capture of image data in accordance with embodiments of the invention. In addition to providing inputs for receiving a 'horizontal sync pulse' and a 'vertical sync pulse' the sub-array modules can also include outputs that provide information concerning the state of the internal timing engine of the sub-array camera module. In many embodiments, the timing information is also provided using a 'horizontal sync pulse' and a 'vertical sync pulse'. Similarly, although the construction of particular array camera modules is illustrated in FIGS. 10A-10C, any number of array camera modules can be constructed using sub-array modules in accordance with embodiments of the invention. For example, array camera modules of any length may be constructed using sub-array modules in accordance with embodiments of the invention.

Figure 11A:
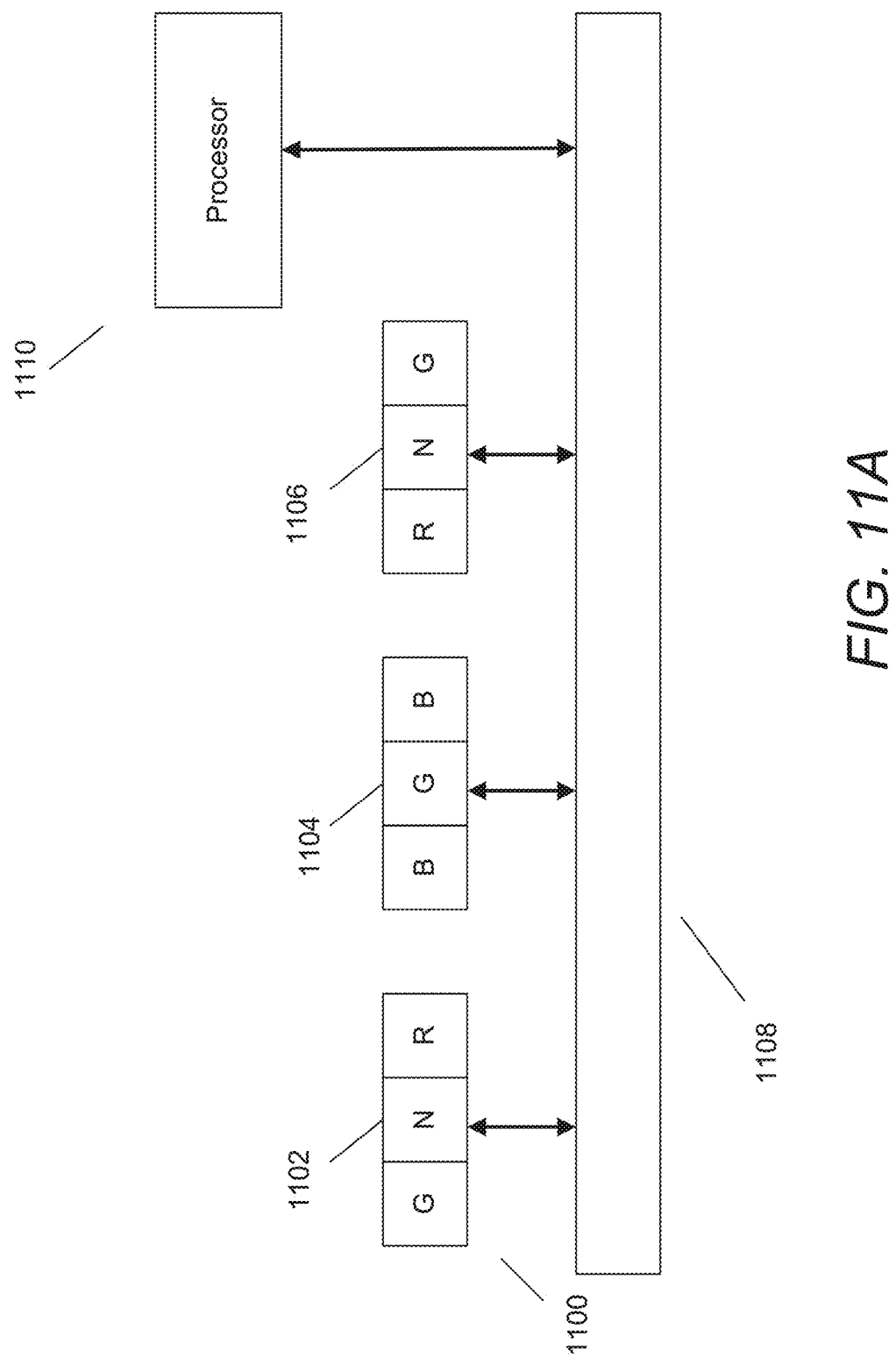
FIGS. 11A-11B illustrates how 1×3 sub-array modules may interface with a receiving device and thereby implement an array camera in accordance with embodiments of the invention FIG. 12 illustrate how sub-array modules may be coupled via a glass substrate with interconnects to form an array camera module in accordance with embodiments of the invention.

Furthermore, as mentioned above, in many embodiments, sub-array modules do not couple with one another, and instead interface—either directly or indirectly—with a receiving device. For example, FIG. 11A illustrates a 1×9 array camera fabricated from three 1×3 sub-array modules that do not couple with one another in accordance with embodiments of the invention. In particular, the array camera 1100 corresponds with that seen in FIG. 10A, except that each sub-array module, 1102, 1104, and 1106, outputs image data to a bus 1108, and thereby transmits image data to a processor 1108. In a number of embodiments, intermediary circuitry is used to convert received image data to a single MIPI output, which is then transmitted to a processor 1110. Thus, array cameras can be implemented whereby sub-array modules do not couple with one another.

Figure 11B:
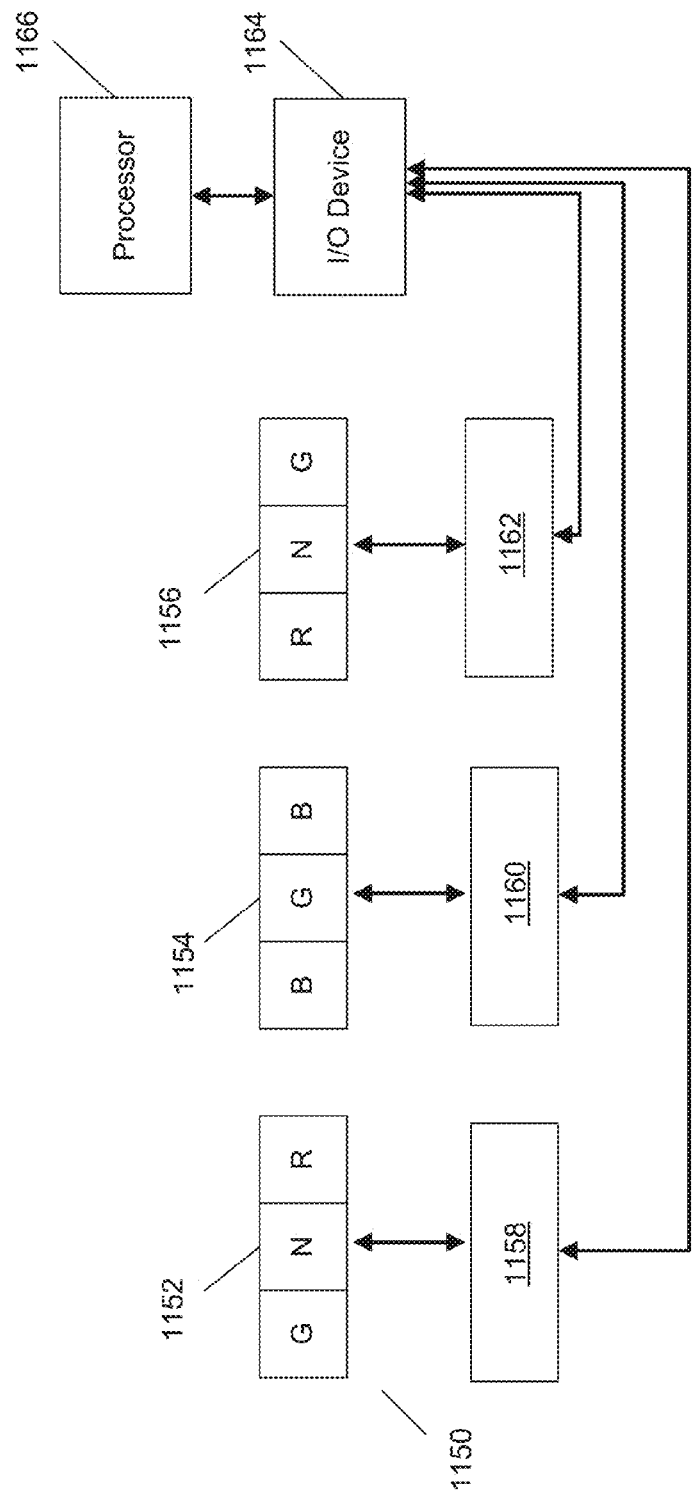

In many embodiments, multiple I/O devices are used in adjoining multiple sub-array modules. For example, FIG. 11B illustrates a 1×9 array camera similar to that seen in FIG. 11A, except that each sub-array module is associated with a respective I/O device, that itself interfaces with an I/O block which processes the received image data and provides an output to a processor. In particular, a 1×9 array camera 1150 includes three sub-array modules 1152, 1154, and 1156, that are each affiliated with a respective I/O device, 1158, 1160, and 1162. Accordingly, the respective I/O devices interface with a separate I/O block 1164 that can aggregate the image data and thereby provide a single MIPI output. The I/O block 1164 can provide the output in a MIPI container to a processor 1166 for further processing. As this architecture includes multiple I/O devices, each affiliated with certain cameras, image data may be processed more effectively and efficiently. For example, using this architecture, the length of circuit traces can be reduced, and correspondingly, the signal to noise ratio can be enhanced. Consequently, the increased efficiency can help mitigate a host of issues that may otherwise be present including those relating to: image data synchronization; power consumption; and cross-talk. Additionally, as multiple I/O devices are used, they each may be adapted to have a smaller footprint, and can thereby facilitate the implementation of an advantageous physical layout of the sub-array modules. As can be appreciated, each of multiple I/O devices can be affiliated with any number of cameras in accordance with embodiments of the invention. For example, in many embodiments, 2 I/O devices are incorporated whereby one I/O device is affiliated with 6 cameras, and the other I/O device is affiliated with 3 cameras. The I/O devices may then interface with a separate I/O block that receives image data, aggregates it, and outputs it to a processor for further processing. Additionally, as will be elaborated on below, two-dimensional sub-array modules may also be implemented in accordance with embodiments of the invention; accordingly, I/O devices may also be affiliated with any number of cameras in an arrangement of two-dimensional sub-array modules in accordance with embodiments of the invention. Generally, I/O blocks may be affiliated with cameras within sub-array modules of any dimensions in accordance with embodiments of the invention.

Note that sub-array modules of different types may be coupled to form array camera modules. For example, 1×3 sub-array modules may be combined with 1×2 sub-array modules, 1×4 sub-array modules, or even 1×1 sub-array modules. This flexibility is advantageous insofar as it can alleviate unwieldy manufacturing processes. For instance, the manufacture of sub-array modules that include near-IR cameras (e.g. a GRN sub-array module as shown in FIG. 8D) may require the imposition of an IR cut-off filter (that can be a structured dielectric coating), which may then be selectively removed in the areas of the sub-array module where a near-IR camera is desired (e.g. the N camera of a GRN sub-array module). Subsequently, an organic near-IR pass filter or another multilayer dielectric coating can then be applied at the position of the near-IR channels. This manufacturing process may be cumbersome. Thus, in accordance with embodiments of the invention, a 1×1 near-IR sub-array module may be coupled with another sub-array module of any type, thereby resulting in an array camera module that includes a near-IR camera. This technique may be advantageous in that cumbersome manufacturing processes may be avoided. For example, instead of forming sub-array modules that include near-IR cameras and color cameras, 1×1 sub-array modules that include near-IR cameras can be produced separately on a single wafer that does not include any other color channels and later coupled with a sub-array module that includes color cameras constituting different color channels. Consequently, the step of selectively removing an IR cut-off filter and then applying an organic near-IR pass filter or other dielectric coating may be avoided. Thus, for example a 1×2 GR sub-array module may be coupled to a 1×1 near-IR camera to form a 1×3 GRN array camera module in accordance with embodiments of the invention.

Similarly, the particular lens fabrication technique employed in the fabrication of a sub-array module (e.g. WLO manufacturing, precision glass molding, or polymer injection molding) may be selected to accommodate the particular sub-array module's functionality and/or its manufacturing process. Of course, any number of sub-array modules, which can each be of different types, can be coupled to form an array camera module in accordance with embodiments of the invention. More generally, as an array camera module can be formed from different types of sub-array modules that can be coupled using a variety of techniques in accordance with embodiments of the invention, the constituent sub-array modules may be designed to accommodate any number of different manufacturing processes.

Figure 12:
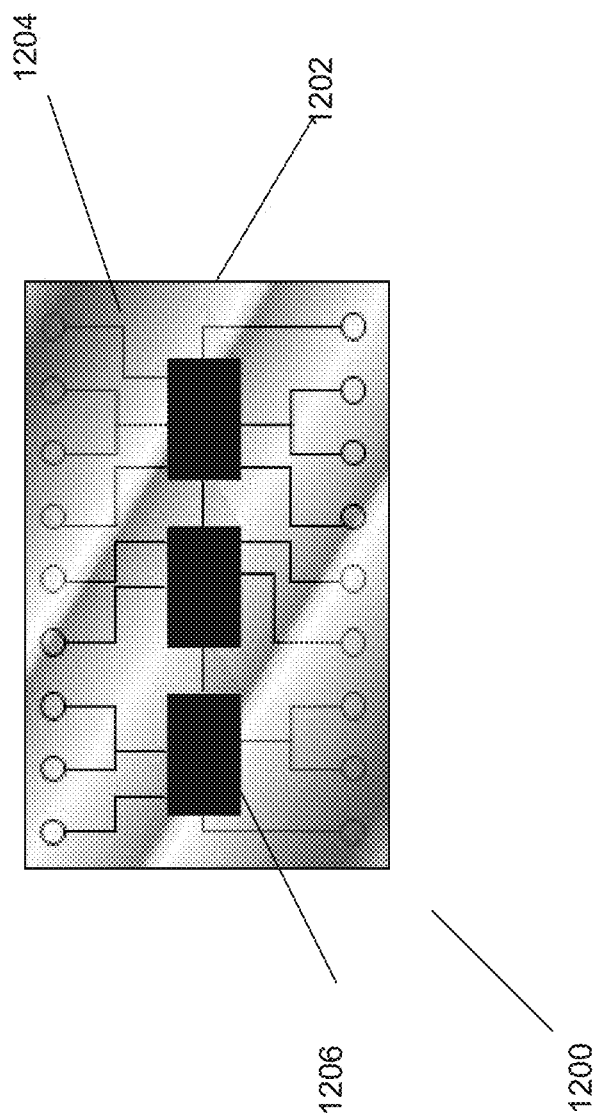

Moreover, sub-array modules may be combined using a single substrate that includes interconnects. For example, sub-array modules may be coupled to a substrate that has interconnects, such that when the sub-array modules are coupled to the substrate, the sub-array modules can thereby interface with each other and/or with a receiving device (e.g. a processor) via the substrate's interconnects. The interconnection of three sub-array modules coupled to a glass substrate in accordance with an embodiment of the invention is illustrated in FIG. 12. In the illustrated embodiment, three sub-array modules are coupled to a glass substrate that includes interconnects, thereby allowing the sub-array modules to interface with one another and with a receiving device. Specifically, the array camera module 1200 is constructed from a glass substrate 1202 that includes interconnects 1204, upon which sub-array modules 1206 can couple. The sub-array modules can include electrical pads to couple with the glass substrate's interconnects. The electrical pads can include the same interface functionality discussed above with respect to FIGS. 7A and 7B (e.g. interface circuitry 718, 752, 754, inputs/outputs, 720, 722). The interconnects 1204 can allow the sub-array modules to interface with one another and with a receiving device such as, but not limited to, an appropriately configured microprocessor and/or an application specific device that is configured to read in the serial data from the independent sub-array modules and synthesize a cohesive output data stream (e.g. a MIPI serial output data stream). As can be appreciated, the interconnects can be configured so as to allow each sub-array module to interface—either directly or indirectly—with a receiving device such that each sub-array module can provide image data to a receiving device without having to couple with another sub-array module. Thus, for example, the array camera seen in FIG. 11 can be constructed using a single substrate. Additionally, where a glass substrate is used, the lenses of a sub-array module may also be bonded to the glass substrate. For example, the sensors that include the sub-arrays of focal planes may be coupled with the glass substrate on one side of it that includes interconnects, and the corresponding lenses that combine with the sensors to form an imager array may be bonded to the other side of the glass substrate such that the complete functionality of the sub-array module is achieved. Because the glass substrate is optically transparent, the sub-array module can still function even though the glass substrate lies between the sensor dies and the corresponding lenses. In many embodiments, the lens for each sensor in a sub-array module can be independently mounted to the glass substrate. In a number of embodiments, arrays of lens stacks can be mounted to the glass substrate and the number of lens stacks in the array need not correspond with the number of focal planes on the sensors mounted to the glass substrate.

Using a substrate to facilitate the coupling of sub-array modules can be advantageous in that the specific configuration of the substrate can govern the spacing between the sub-array modules, and the spacing between sub-array modules can control the array camera module's imaging ability. Specifically, the manner in which the interconnects are situated can govern the sub-array module spacing. Hence, sub-array modules that are coupled need not be within immediate proximity of one another when a substrate is used to enable their coupling. Although much of the discussion above refers to the use of glass substrates, any of a variety of optically transparent substrate materials can be utilized as appropriate to the requirements of specific applications in accordance with embodiments of the invention. Furthermore, substrates in which openings are formed to permit transmission of light through the substrate can also be utilized including (but not limited to) ceramic substrates in which through holes are formed. Thus, for example, a single sensor or multiple sensors can be fixed to one side of the ceramic carrier to form the focal planes of the array camera module and lens barrels containing lens stacks can be affixed to the other side of the ceramic carrier so that the lens stacks direct light onto the focal planes of the one or more sensors through the openings in the ceramic carrier. In many instances, the ceramic carrier is rigid and has a coefficient of thermal expansion that matches that of the sensor. Thus, the likelihood that mismatches in thermal expansion will result in changes in the alignment between the lens stacks and corresponding focal planes that deteriorate the quality of the images that can be synthesized using the image data captured by the focal planes. U.S. Provisional Patent Application No. 61/904,947 to Mark Rodda et al. discloses the incorporation of ceramic substrates in the context of array cameras, and is hereby incorporated by reference in its entirety.

One-dimensional array camera modules constructed from sub-array modules may also be coupled to a parallax disparity resolution module in accordance with embodiments of the invention. The parallax disparity resolution module may either a hardware parallax disparity resolution module or may be a software parallax disparity resolution module. FIG. 13A illustrates a 1×9 array camera module constructed from three constituent 1×3 sub array modules, where the array camera module 1300 outputs the data to a hardware parallax disparity resolution module 1302. Similarly, FIG. 13B illustrates a 1×9 array camera module constructed from three constituent 1×3 sub-array modules, where the array camera module 1350 outputs the data to a software parallax disparity resolution module 1352. Either parallax disparity resolution module 1302, 1352 can receive the data and implement processes to detect parallax within image data (using processes similar to, but not limited to, those described in U.S. Provisional Patent Application Ser. No. 61/691,666) and implement processes to account for the detected parallax in the further processing of the image data.

Although particular one-dimensional array camera modules constructed from sub-array modules have been described, many other such configurations exist in accordance with embodiments of the invention. Hence, the descriptions and corresponding figures should not be construed as limiting the scope of the invention, and are instead merely illustrative. Two-dimensional array camera modules may also be constructed from sub-array modules in accordance with embodiments of the invention, and this is discussed below.

The Construction of Two-Dimensional Array Cameras Using Sub-Array Modules

Sub-array modules may be coupled to form two-dimensional array cameras in accordance with embodiments of the invention. A 3×9 two-dimensional array camera constructed from sub-array modules in accordance with embodiments of the invention is illustrated in FIG. 14A. In particular nine 1×3 sub-array modules are coupled so as to form three array camera module sub-assemblies 1402. Each array camera module sub-assembly 1402 is then coupled to a parallax disparity resolution module 1404 (either hardware or software). In the illustrated embodiment, an interconnection module interfaces with a processor 1406 and one of the sub-arrays in each of the rows of the camera array to enable communication between the processor and each of the sub-arrays. In other embodiments, the processor is configured to directly interface with multiple sub-arrays, e.g. similar to the arrangement seen in FIG. 11. In several embodiments, each sub-array module is configured to interface with circuitry that receives image data from each sub-array module and converts the image data to a single MIPI output, which is thereby provided to a processor. Note that in the illustrated embodiment, the three 1×9 array camera module sub-assemblies are adjacent to each other such that a 3×9 array camera module can be achieved. However, any arrangement may be implemented in order to achieve a two-dimensional array camera module in accordance with embodiments of the invention. In many embodiments, the processor 1406 is made aware of the relative location of the cameras, and uses this information in processing received data.

In many embodiments, a two-dimensional array camera is formed from sub-array modules where a single sub-array module reads out data to a processor. FIG. 14B illustrates a two-dimensional 3×9 array camera where a single constituent sub-array module reads out data to a processor. In the illustrated embodiment, the array camera 1450 is formed from nine 1×3 sub-array modules that are coupled, where data from the sub-array modules is read out by a single sub-array module 1452 to a processor 1454, which can then process the image data. Again, in the illustrated embodiment, the sub array modules are arranged such that a 3×9 array camera module is achieved. However, as before, any arrangement may be implemented in order to achieve a two-dimensional array camera module in accordance with embodiments of the invention. In many embodiments, the processor 1454 is made aware of the relative location of the cameras, and uses this information in processing received data. As before, the manner in which the sub-array modules interface with one another and with a receiving device may all be different.

Figure 15:
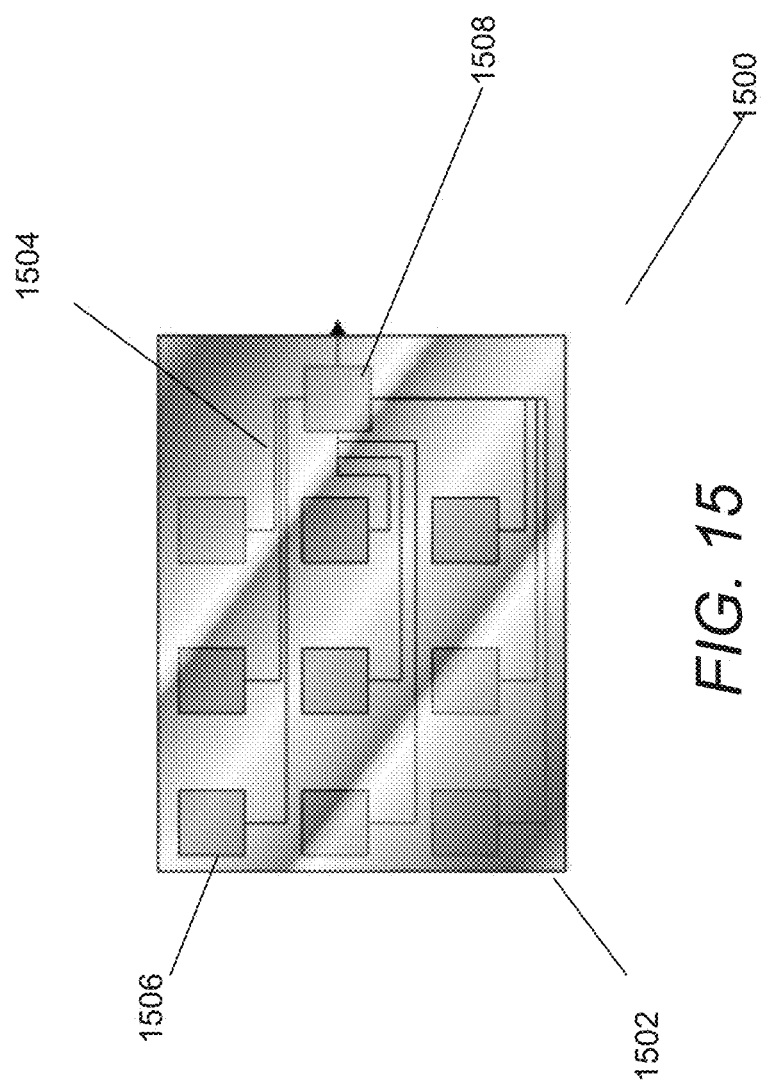
FIG. 15 illustrates how sub-array modules may be coupled via a glass substrate with interconnects to form a two-dimensional array camera in accordance with embodiments of the invention

Additionally, similar to before with respect to FIG. 12, sub-array modules may be coupled via a substrate to form an array camera. FIG. 15 illustrates a two-dimensional array camera formed from sub-array modules coupled to a substrate. Specifically, the array camera 1500 includes a glass substrate 1502 with interconnects 1504, sub-array modules 1506, and a processor 1508. As before, the sub-array modules 1506 can connect to the glass substrate 1502 via electrical pads, and as before the imager arrays of a sub-array module 1506 may be coupled to one-side of the glass substrate that includes interconnects 1504, and corresponding lenses may be bonded to the other side of the glass substrate 1502. Again, using substrates to facilitate the coupling of sub-array modules—either to one another or to independent circuitry—can be advantageous in that the substrate can control the spacing between sub-array modules, and this affects the array camera's imaging ability.

Figure 16:
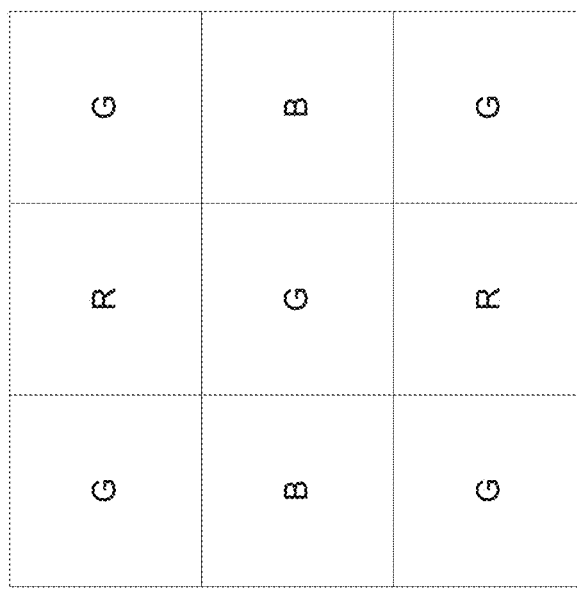
FIG. 16 illustrates a Pi filter group that may be utilized in accordance with embodiments of the invention.

In constructing an array camera, an array camera module may be patterned with "π filter groups", or alternatively "Pi filter groups." The term Pi filter groups refers to a pattern of narrow spectral band cameras within the array camera module. Processes for patterning array cameras with Pi filter groups are described in U.S. Provisional Patent Application Ser. No. 61/641,165, entitled "Camera Modules Patterned with π Filter Groups", Venkataraman et al. The disclosure of U.S. Provisional Patent Application Ser. No. 61/641,165 is incorporated by reference herein in its entirety. A single Pi filter group is illustrated in FIG. 16, wherein 5 cameras are configured to receive green light, 2 cameras are configured to receive red light, and 2 cameras are configured to receive blue light. The Pi filter patterns may facilitate the efficient capturing of color image data.

Figure 17A:
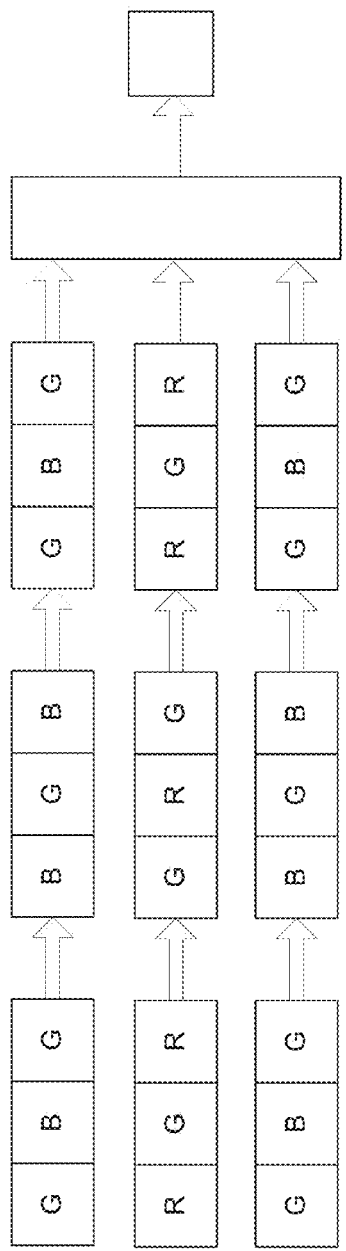
FIGS. 17A-17B illustrates how sub-array modules may be coupled to form an array camera that employs Pi filter groups.
Figure 17B:
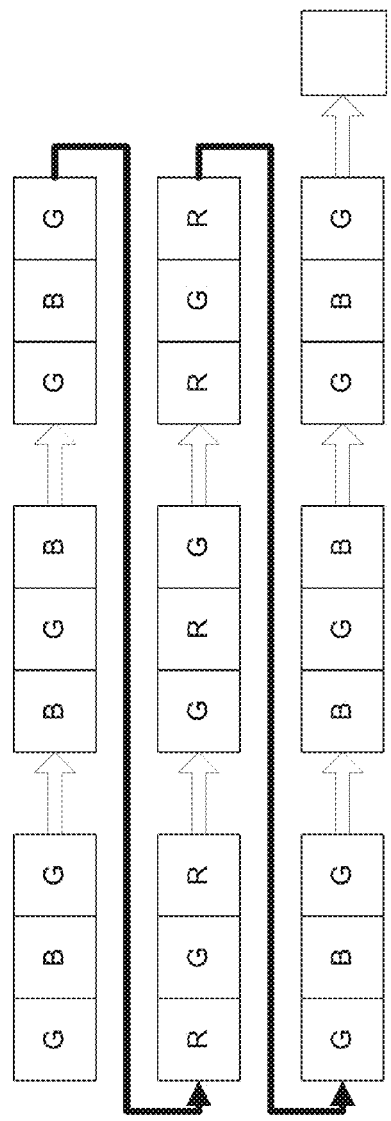
Figure 20A:
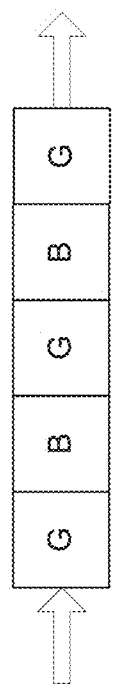
FIGS. 20A-20D illustrate 1×5 sub-array modules in accordance with embodiments of the invention.
Figure 20B:
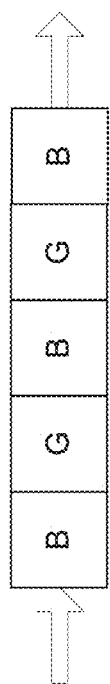
Figure 20C:
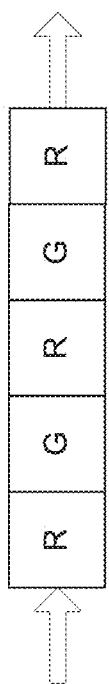
Figure 20D:
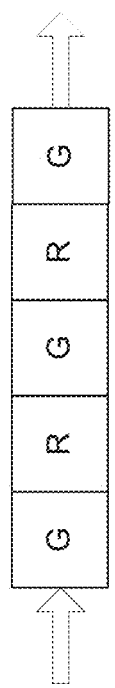

In many embodiments of the invention, two-dimensional array cameras are constructed using sub-array modules wherein the sub-array modules are arranged such that Pi filter groups are implemented within the array camera. FIGS. 17A and 17B are similar to FIGS. 14A and 14B except that the sub-array modules are configured to implement Pi filter groups.

Although the above discussion has largely focused on 1×3 sub-array modules and their implementation in the construction of array camera modules and array cameras, in many embodiments, sub-array modules have other dimensions. FIGS. 18A-18B illustrate 1×4 sub-array modules in accordance with some embodiments. It should be repeated that although only narrow spectral band blue, green and red cameras are illustrated in FIGS. 18A-18B, any type of camera may of course be implemented in sub-array modules in accordance with embodiments of the invention.

Sub-array modules of any dimension can be used in the construction of array cameras in accordance with embodiments of the invention. FIGS. 19A and 19B illustrate the construction of a 4×4 array camera using 1×4 sub-array modules in accordance with many embodiments. FIGS. 19A and 19B are similar to FIGS. 14A and 14B except that 1×4 sub-array modules are used to form the array camera. The illustrated embodiment includes an array camera, sub-array module sub-assemblies 1902, an interconnection module 1904, and a processor 1906, 1908. In the illustrated embodiment, Pi filter groups are patterned on the array camera. Similarly, FIGS. 20A-20D illustrate 1×5 sub-array modules, and FIGS. 21A-21B illustrate the construction of 5×5 array cameras using 1×5 sub-array modules. The illustrated embodiment includes an array camera 2100, sub-array modules sub-assemblies 2102, an interconnection module 2104, and a processor 2106, 2108. Again, in the illustrated embodiments, Pi filter groups are implemented on the two dimensional array cameras. A particular benefit of utilizing 1×5 sub-array modules to build a 5×5 array camera module is that the 5×5 array camera can be constructed using two different types of 1×5 sub-array modules (i.e. GRGRG and BGBGB or GBGBG and RGRGR). Similarly, any square array patterned with Pi filter groups including an odd number of rows and columns can be constructed using only two different types of sub-arrays.

Figure 22:
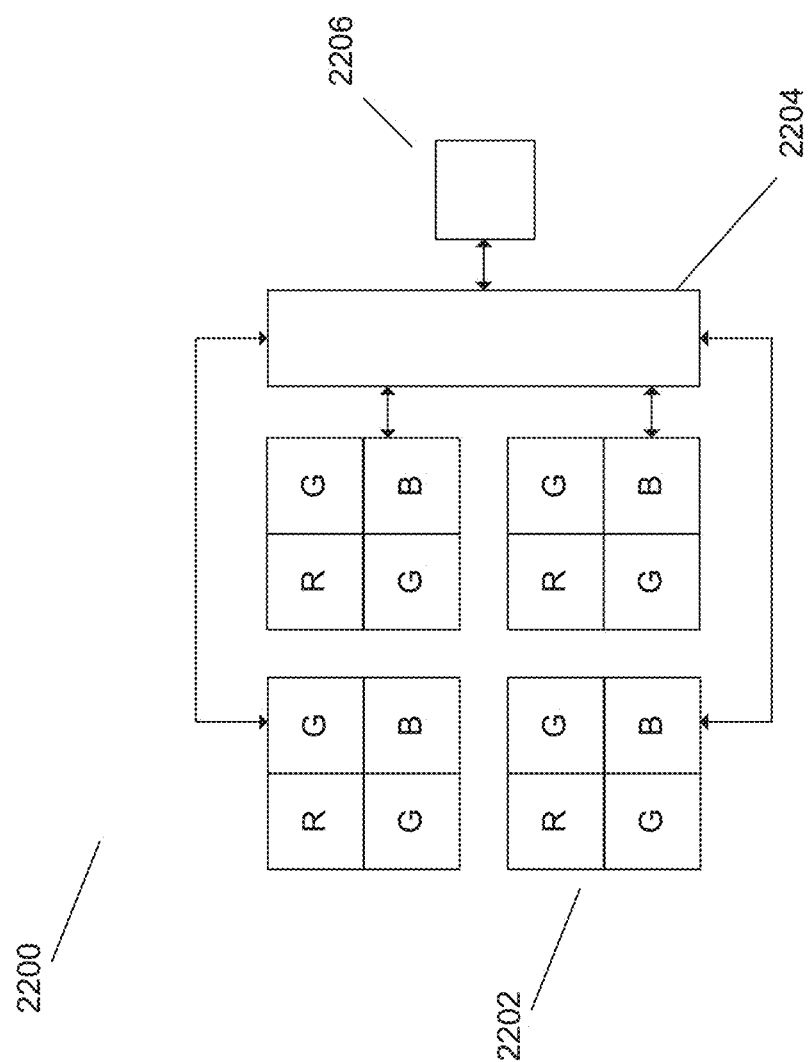
FIG. 22 illustrates a two-dimensional array camera fabricated from multiple two-dimensional sub-array modules.

Furthermore, as alluded to above, two-dimensional sub-array modules may also be implemented to construct two-dimensional array cameras in accordance with embodiments of the invention. For example, FIG. 22 illustrates the construction of a 4×4 array camera using 2×2 sub-array modules. In particular, the 4×4 array camera 2200 is similar to that seen in FIG. 19, except that it includes four 2×2 sub-array modules 2202. In the illustrated embodiment, each sub-array module 2202 interfaces with circuitry 2204 that receives image data from each of the sub-array modules and outputs the aggregated image data to a processor 2206. As can be appreciated from the above discussion, it should be understood that the sub-array modules can provide image data to a processor in any suitable fashion in accordance with embodiments of the invention. For example, in some embodiments, the two-dimensional sub-arrays include interface circuitry that allow them to interface with other sub-array modules, and thereby transmit image data to (and otherwise interact with) a processor. In many instances, modular array cameras include both two-dimensional and one-dimensional sub-array modules. In general, modular array cameras of any dimension can be constructed from one-dimensional and/or two-dimensional sub-array modules in accordance with embodiments of the invention.

As mentioned previously, 1×1 sub-array modules may also be used to construct array cameras, and this is discussed below.

1×1 Sub-Array Modules

In accordance with many embodiments of the invention, 1×1 sub-array modules may be used to construct array cameras. Thus, for example, 1×1 sub-array modules may be used to construct either one dimensional array cameras or two-dimensional array cameras. 1×1 sub-array modules are similar to the sub-array modules discussed above except that they do not include multiple lens stacks and multiple focal planes. Instead, a 1×1 sub-array module includes a single lens stack and a sensor including single focal plane. Accordingly, the above-mentioned techniques regarding constructing array cameras from sub-array modules may also be used to construct array cameras from 1×1 sub-array modules. Using 1×1 sub-array modules to construct array cameras may confer a host of benefits. For example, Array cameras of any dimension may be constructed using 1×1 sub-array modules, and many different types of 1×1 sub-array modules may be used in the construction. For example, 1×1 sub-array modules that have different F numbers, focal lengths, image sensor formats and/or fields of view, may be used, particularly because slightly different heights of different types of 1×1 sub-array modules can be accommodated. Similarly, the different substrates and spacer thicknesses within a lens stack may be accommodated. In many embodiments, these sub-array modules are used to construct array cameras that can provide optical zoom with no moving parts. Array cameras may also incorporate 1×1 sub-array modules that are configured for near-IR sensitivity and far-IR sensitivity. Additionally, sub-array modules that implement a time-of-flight camera to provide additional depth information, may also be used in accordance with embodiments of the invention. As already discussed above, 1×1 sub-array modules are also beneficial insofar as 1×1 sub-array modules of the same type (e.g., near-IR cameras) may be constructed on the same wafer, thereby increasing manufacturing efficiencies.

In several embodiments, 1×1 sub-array modules may be assembled to form an array camera module using a variety of technique appropriate to the specific 1×1 sub-array module constructions, including any of the above discussed techniques, in accordance with embodiments of the invention. In some embodiments, the sensor of a 1×1 sub-array module is adjoined to a printed circuit board using reflow soldering. Subsequently, the respective lenses of the sub-array module may be adjoined to the sensor. Note that the lenses may be affixed to the sensor using the active alignment processes U.S. Patent Application Ser. No. 61/666,852. In a number of embodiments, the sensors of a 1×1 sub-array module are bonded to a glass substrate that includes interconnects that allow the sub-array modules and other components to interface. The corresponding lenses may also be bonded to the glass substrate. This technique is similar to that already described above.

In numerous embodiments, each sub-array module is first independently formed such that it is inclusive of the sensor and the lens stack array, and is then reflow soldered to a printed circuit board. In these embodiments, both the lens and the sensor are adapted to be capable of undergoing a reflow soldering process. This method of manufacture may be advantageous insofar as the individual sub-array modules can be evaluated prior to construction of the array camera. It may be further advantageous, as the formed sub-array modules may be easily rearranged to provide different types of array cameras.

As already alluded to above, one-dimensional array camera modules and two-dimensional array camera modules may be formed from 1×1 sub-array modules in accordance with embodiments of the invention. Of course, the particular arrangement of the 1×1 sub-array modules will govern whether a one-dimensional or a two-dimensional array camera module is achieved.

Note that when the individual sub-array modules are assembled to form an array camera, the sub-array modules may be oriented in slightly different directions with respect to one another, for example due to manufacturing tolerances and corrections for alignment. As a result, the epipolar lines of the resulting array camera may deviate with respect to the scanlines of the individual cameras. Consequently, in many embodiments, the array camera includes a processor that can perform an affine transformation in conjunction with parallax disparity resolution, in processing the images provided by the sub-array modules, to resolve the discrepancies in camera orientation.

In many embodiments, an array camera that is constructed from 1×1 sub-array modules also utilizes an external hardware block that can read in serial data from the independent 1×1 sub-array modules, and synthesize a cohesive output data stream (e.g. a MIPI serial output data stream) that can be transmitted to a receiving device, e.g. a processor. In a number of embodiments, the external hardware block can interact with the sub-array modules through a custom I2C interface to, for example, command and control the individual sub-array modules. Moreover, in several embodiments, the external hardware block includes sufficient buffer space so that it can read out all the data from the sub-array modules to the receiving device simultaneously. This may improve array camera performance, since it can mitigate any delay that results from the transmission of data to the receiving device. For example, the rolling shutter performance of the array camera may be improved, since it would be governed by the size of a single sub-array module as opposed to the size of the entire array camera. In several embodiments, the external hardware block includes circuitry to encrypt the data being read out from the camera array to enable digital rights management control. In a plethora of embodiments, the external hardware block includes circuitry to compress the data being read out from the camera array to reduce the data bandwidth requirements in the resulting output stream. Although the external hardware blocks described above is discussed in the context of constructing array cameras using 1×1 sub-array modules, similar external hardware blocks can be utilized in the construction of array cameras using a variety of sub-array modules including sub-array modules having different dimensions. Furthermore, array camera modules can be constructed using any of a variety of techniques involving fixing sub-array modules of any dimension to a substrate appropriate to the requirements of a specific application in accordance with embodiments of the invention.

Although the present invention has been described in certain specific aspects, many additional modifications and variations would be apparent to those skilled in the art. For example, sub-array modules of different types (e.g. 1×3 and 1×4) may be coupled to form an array camera module. It is therefore to be understood that the present invention may be practiced otherwise than specifically described. Thus, embodiments of the present invention should be considered in all respects as illustrative and not restrictive.

What is claimed is:

1. An X×Y sub-array module comprising:
an X×Y arrangement of focal planes, wherein:
X and Y are each greater than or equal to 1;
each focal plane comprises a plurality of rows of pixels that also form a plurality of columns of pixels; and
each focal plane does not include pixels from another focal plane; and
an X×Y arrangement of lens stacks, the X×Y arrangement of lens stacks being disposed relative to the X×Y arrangement of focal planes so as to form an X×Y arrangement of cameras, each of which being configured to independently capture an image of a scene, wherein each lens stack has a field of view that is shifted with respect to the field-of-views of each other lens stack so that each shift includes a sub-pixel shifted view of the scene;
image data input circuitry that is capable of receiving image data from a separate sub-array module; and
image data output circuitry that is capable of aggregating image data from the X×Y sub-array module with image data received via the image data input circuitry from a separate sub-array module.

2. The X×Y sub-array module of claim 1, wherein X is 1.

3. The X×Y sub-array module of claim 1, wherein X and Y are each greater than 1.

4. The X×Y sub-array module of claim 1, wherein the arrangement of cameras are embodied within a single monolithic structure.

5. An M×N array camera comprising:
a plurality of X×Y sub-array modules, each comprising:
an X×Y arrangement of focal planes, wherein:
X and Y are each greater than or equal to 1;
each focal plane comprises a plurality of rows of pixels that also form a plurality of columns of pixels; and
each focal plane does not include pixels from another focal plane; and
an X×Y arrangement of lens stacks, the X×Y arrangement of lens stacks being disposed relative to the X×Y arrangement of focal planes so as to form an X×Y arrangement of cameras, each of which being configured to independently capture an image of a scene, wherein each lens stack has a field of view that is shifted with respect to the field-of-views of each other lens stack so that each shift includes a sub-pixel shifted view of the scene;
image data input circuitry that is capable of receiving image data from a separate sub-array module; and
image data output circuitry that is capable of aggregating image data from the sub-array module with image data received via the image data input circuitry from a separate sub-array module;
wherein the plurality of X×Y sub-array modules define at least some of the cameras in an M×N arrangement of cameras; and
a processor;
wherein the processor is configured to construct an image of the scene using image data generated by each of the sub-array modules.

6. The array camera of claim 5, wherein X is 1 and M is 1.

7. The array camera of claim 5, wherein the plurality of X×Y sub-array modules define an M×N arrangement of cameras.

8. The array camera of claim 5, further comprising circuitry that aggregates the image data generated by each of the sub-array modules into a single MIPI output, and provides the MIPI output to the processor.

9. The array camera of claim 5, further comprising a parallax disparity resolution module, wherein the parallax disparity resolution module is configured to receive image data captured by each sub-array module, implement a parallax detection and correction process on the received image data, and output the result for further processing.

10. The array camera of claim 9, further comprising circuitry that converts the output of the parallax disparity resolution module into a single MIPI output, and provides the MIPI output to the processor.

11. The array camera of claim 10, wherein the parallax disparity resolution module comprises a processor and memory, wherein the memory contains software to configure the processor to act as a parallax disparity resolution module.

12. The array camera of claim 10, wherein the parallax disparity resolution module is a hardware parallax disparity resolution module.

13. The array camera of claim 5, wherein M and N are each greater than or equal to 2.

14. The array camera of claim 5, wherein at least two of the plurality of sub-array modules are adjoined to the interconnects of a single substrate, and are each capable of outputting image data through the interconnects.

15. The array camera of claim 14, wherein each of the plurality of sub-array modules are adjoined to the interconnects of a single substrate, and are each capable of outputting image data through the interconnects.

16. The array camera of claim 15, wherein the substrate is optically transparent.

17. The array camera of claim 16, wherein the substrate is glass.

18. The array camera of claim 15, wherein the substrate is ceramic with through-holes that clear the optical path.

19. The array camera of claim 5, wherein at least one sub-array module is embodied within a single monolithic structure.

20. The array camera of claim 5, wherein each sub-array module is embodied within a single respective monolithic structure.

* * * * *